(12) United States Patent
Mizukura et al.

(10) Patent No.: US 10,275,904 B2
(45) Date of Patent: Apr. 30, 2019

(54) INFORMATION PROCESSING DEVICE AND METHOD, AND PROGRAM, FOR GAMUT CONVERSION OF CONTENT

(71) Applicant: Sony Corporation, Tokyo (JP)

(72) Inventors: Takami Mizukura, Kanagawa (JP); Naoya Katoh, Chiba (JP)

(73) Assignee: Sony Corporation (JP)

( * ) Notice: Subject to any disclaimer, the term of this patent is extended or adjusted under 35 U.S.C. 154(b) by 114 days.

(21) Appl. No.: 15/163,263

(22) Filed: May 24, 2016

(65) Prior Publication Data

US 2016/0307337 A1  Oct. 20, 2016

Related U.S. Application Data

(60) Division of application No. 14/605,361, filed on Jan. 26, 2015, now Pat. No. 9,390,518, which is a
(Continued)

(30) Foreign Application Priority Data

May 22, 2009  (JP) ............................... P2009-124246

(51) Int. Cl.
 *G06T 7/90* (2017.01)
 *H04N 1/00* (2006.01)
 (Continued)

(52) U.S. Cl.
 CPC ............... *G06T 7/90* (2017.01); *G06T 5/001* (2013.01); *G06T 11/001* (2013.01);
 (Continued)

(58) Field of Classification Search
 None
 See application file for complete search history.

(56) References Cited

U.S. PATENT DOCUMENTS 5,699,489 A   12/1997  Yokomizo
5,987,165 A   11/1999  Matsuzaki et al.
(Continued)

FOREIGN PATENT DOCUMENTS

EP       0579224 A1     1/1994
JP    05-298437 A      11/1993
(Continued)

*Primary Examiner* — Vu Nguyen
(74) *Attorney, Agent, or Firm* — Lerner, David, Littenberg, Krumholz & Mentlik, LLP

(57) ABSTRACT

An device, method and program may properly perform gamut conversion of content and be applied to a gamut conversion device. A restoration conversion state confirming unit performs confirmation such as gamut conversion state of image data read out from an optical disc and the existence or not of restoration metadata. An information exchange unit communicates with an output device via a communication unit and performs information exchange such as the existence or not of restoration processing functionality and gamut conversion functionality and the like. A determining unit determines whether or not restoration processing is performed with a playing device based on information obtained by the restoration conversion state confirming unit and the information exchange unit. Similarly, the determining unit determines whether or not to perform gamut conversion processing with the playing device based on information obtained by the restoration conversion state confirming unit and the information exchange unit.

20 Claims, 39 Drawing Sheets

Related U.S. Application Data continuation of application No. 13/320,081, filed as application No. PCT/JP2010/058080 on May 13, 2010, now Pat. No. 9,001,140.

(51) Int. Cl.
*H04N 1/333* (2006.01)
*H04N 1/60* (2006.01)
*G06T 11/00* (2006.01)
*G06T 5/00* (2006.01)
*H04N 1/32* (2006.01)

(52) U.S. Cl.
CPC ..... *H04N 1/00002* (2013.01); *H04N 1/00023* (2013.01); *H04N 1/00037* (2013.01); *H04N 1/33307* (2013.01); *H04N 1/6058* (2013.01); *H04N 1/32101* (2013.01); *H04N 2201/3242* (2013.01); *H04N 2201/3256* (2013.01); *H04N 2201/33314* (2013.01)

(56) References Cited

U.S. PATENT DOCUMENTS

| | | | |
|---|---|---|---|
| 6,335,983 | B1 | 1/2002 | McCarthy et al. |
| 7,130,462 | B2 | 10/2006 | Nakami |
| 2003/0012427 | A1* | 1/2003 | Martinez-Uriegas ............... G06T 11/001 382/162 |
| 2003/0185437 | A1 | 10/2003 | Nakami |
| 2005/0083344 | A1 | 4/2005 | Higgins |
| 2006/0170940 | A1 | 8/2006 | Kang et al. |
| 2006/0244982 | A1 | 11/2006 | Zeng |
| 2009/0153737 | A1* | 6/2009 | Glen ............... G09G 5/006 348/571 |
| 2009/0162029 | A1* | 6/2009 | Glen ............... H04N 5/44543 386/231 |
| 2010/0008427 | A1* | 1/2010 | Chiu ............... H04N 1/64 375/240.18 |
| 2010/0020106 | A1 | 1/2010 | Gil et al. |

FOREIGN PATENT DOCUMENTS

| | | |
|---|---|---|
| JP | 06-038032 A | 2/1994 |
| JP | 06-054176 A | 2/1994 |
| JP | 09-009082 A | 1/1997 |
| JP | 09-135360 A | 5/1997 |
| JP | 10-178534 A | 6/1998 |
| JP | 2000-354171 A | 12/2000 |
| JP | 2002-033936 A | 1/2002 |
| JP | 2003-060832 A | 2/2003 |
| JP | 2003-209706 A | 7/2003 |
| JP | 2005-007753 A | 1/2005 |

* cited by examiner

FIG. 34

Directory Entry FOR Tiff
RESTORATION METADATA

| ADDRESS | | ROLE |
|---|---|---|
| X | GamutMeta | NAME OF Tag |
| X + 2 | 7 (Undefined) | FORM OF VARIABLE MAKING UP Tag |
| X + 4 | 2 | NUMBER OF VARIABLES |
| X + 8 | α | REFERENCE OFFSET VALUE TO ADDRESS WHERE VARIABLES ARE STORED |

Value OF Directory Entry

| ADDRESS | | ROLE |
|---|---|---|
| Y + α | Double | FORM OF FIRST DATA |
| Y + α + 2 | 37 | NUMBER OF PIECES OF FIRST DATA |
| Y + α + 6 | Y-Cusp data | FIRST DATA MAIN UNIT |
| (Y + α + 6) + (8 × 36) | Double | FORM OF SECOND DATA |
| (Y + α + 6) + (8 × 36) + 2 | 37 | NUMBER OF PIECES OF SECOND DATA |
| ... | C-Cusp data | SECOND DATA MAIN UNIT |

FIG. 35

Directory Entry FOR Tiff RESTORATION METADATA

| ADDRESS | | | | ROLE |
|---|---|---|---|---|
| X | ReprocMeta | | | NAME OF Tag |
| X + 2 | 7 (Undefined) | | | FORM OF VARIABLE MAKING UP Tag |
| X + 4 | 4 | | | NUMBER OF VARIABLES |
| X + 8 | α | | | REFERENCE OFFSET VALUE TO ADDRESS WHERE VARIABLES ARE STORED |

Value OF Directory Entry

| ADDRESS | | ROLE |
|---|---|---|
| Y + α | Double | FORM OF FIRST DATA |
| Y + α + 2 | 37 | NUMBER OF PIECES OF FIRST DATA |
| Y + α + 6 | L table data | FIRST DATA MAIN UNIT |
| | Double | FORM OF SECOND DATA |
| | 37 | NUMBER OF PIECES OF SECOND DATA |
| (Y + α + 6) + (8 × 36) | U table data | SECOND DATA MAIN UNIT |
| | Double | FORM OF THIRD DATA |
| | 17 | NUMBER OF PIECES OF THIRD DATA |
| (Y + α + 6) + (8 × 36) + 2 | Reproc func data | THIRD DATA MAIN UNIT |
| ... | Double | FORM OF FOURTH DATA |
| | 37 | NUMBER OF PIECES OF FOURTH DATA |
| | Conv table data | FOURTH DATA MAIN UNIT |

INFORMATION PROCESSING DEVICE AND METHOD, AND PROGRAM, FOR GAMUT CONVERSION OF CONTENT

CROSS-REFERENCE TO RELATED APPLICATIONS

The present application is a division of U.S. application Ser. No. 14/605,361, filed on Jan. 26, 2015 which is a continuation of U.S. application Ser. No. 13/320,081, filed on Nov. 11, 2011, issued as U.S. Pat. No. 9,001,140, which is a National Phase Filing of PCT/JP2010/058080, filed on May 13, 2010, which claims the priority of Japanese Patent No. P2009-124246, filed on May 22, 2009, the disclosures of which are incorporated herein by reference.

TECHNICAL FIELD

The present invention relates to an information processing device and method and program, and in particular relates to an information processing device and method and program wherein gamut conversion of content can be performed more appropriately.

BACKGROUND ART

Conventionally, as a color space to indicate RGB data, there has been a method that uses sRGB color space which is a standard color space for monitors. For example, upon JPEG (Joint Photographic Experts Group) data which is commonly used is opened on a personal computer, the sYCC data recorded in the JPEG data is immediately converted to sRGB data. If data outside of the sRGB gamut exists in the sYCC data (i.e., negative value or value above 256 with an 8-bit value), natural clip to the sRGB color space occurs, and color phase shift can occur.

Natural clip indicates a phenomenon wherein a color outside the gamut of the image data supplied externally is forcibly expressed with a color within the gamut of the device. For example, in the case that only the R-component of a color shown with RGB is greater than the maximum value of the R-component of the gamut, the R-component of the color thereof is expressed with the maximum value of the R-component of the gamut (natural clip). At this time, the RGB balance of the original color is lost due to this natural clip, and the hue changes. This type of hue change is called color phase shift. That is to say, the color is expressed with a color different than the original color, so this sort of color phase shift occurrence is not favorable.

In order to prevent this, there is a method to perform gamut conversion which compresses the gamut of the image data into the sRGB gamut on the recording device side beforehand. With this gamut conversion, the original sYCC data has already been compressed within the sRGB gamut, so even if the JPEG data is opened and subjected to sRGB conversion, data outside the gamut is not generated. That is to say, the occurrence of color phase shift as described above can be suppressed.

However, while sRGB represents the gamut of a standard personal computer monitor, there are portions that are decisively narrow when compared with the gamut of a printing device or wide gamut liquid crystal television receiver (wide gamut liquid crystal TV) or the like.

FIG. 1 is a schematic diagram showing a comparison state of gamut ranges. As shown in the example in FIG. 1, a gamut 1 of a general inkjet printer is narrower than an sRGB gamut 2 in many hues, but many of the blue/green regions are wider. Also, a gamut 3 of a wide gamut liquid crystal TV is generally wider that the sRGB gamut 2 in all hues.

However, once the gamut of moving picture content is converted to the narrow sRGB gamut, information before compression that had been originally recorded is lost. This information is then unable to be expressed, regardless of the gamut of the output device. Expression is impossible, even with a wide gamut liquid crystal TV having a wide gamut. That is to say, with gamut conversion to a narrow gamut, image quality of the moving picture content may unnecessarily be deteriorated.

Therefore, various methods to restore the data that has once been compressed, and compress again into the gamut of the output device, have been proposed (e.g., PTL 1 and PTL 2).

PTL 1 discloses a method where barcode information showing profile data is printed onto paper along with the image, and by scanning the barcode information thereof in the event of printing with a separate printing device, gamut compression is performed again for the separate printing device.

Also, PTL 2 discloses a method where information before compression of the compressed RGB data (maximum/minimum values, compression table, and the like) is read in, image data is restored, and gamut compression is performed again for the final output device.

SUMMARY OF INVENTION

Technical Problem

However, in either PTL 1 or PTL 2, control of restoration processing or gamut conversion processing in a system made up of multiple devices are not disclosed. Therefore, for example, in the case of an information processing system wherein a recording device records content data to a recording medium, a playing device reads out the content data thereof from the recording medium and transfers this to an output device, and the output device outputs the content thereof, which processing is performed with which device is not defined, and gamut conversion processing and restoration processing may be performed unnecessarily. Thus, not only is the load increased unnecessarily, but image quality of the content can be reduced unnecessarily.

The present invention is proposed with consideration for such a situation, and enables gamut conversion of the content to be performed more properly.

Solution to Problem

A first aspect of the present invention is an information processing device that has restoration metadata generating means to generate restoration metadata that includes data referenced in restoration processing which returns at least a portion of the gamut of an image subjected to gamut conversion to the state before gamut conversion; and associating means to associate the restoration metadata generated with the restoration metadata generating means to the image.

The restoration metadata generating means can generate the restoration metadata in the case that the image is a high tone image that is higher than a predetermined tone.

A first aspect of the present invention is also an information processing method that has a restoration metadata generating step to generate restoration metadata that includes data referenced in restoration processing which returns at least a portion of the gamut of an image subjected to gamut conversion to the state before gamut conversion; and a step to associate the generated restoration metadata to the image.

A first aspect of the present invention is also a program that causes a computer to execute an information processing method that has a restoration metadata generating step to generate restoration metadata that includes data referenced in restoration processing which returns at least a portion of the gamut of an image subjected to gamut conversion to the state before gamut conversion; and a step to associate the generated restoration metadata to the image.

A second aspect of the present invention is an information processing device that has communication means to perform communication of the image subjected to gamut conversion between other information processing devices; confirming means to confirm determining conditions for controlling the execution of restoration processing that returns at least a portion of the gamut of the image to the state before gamut conversion; and control means to control execution of the restoration processing, based on the confirmation results by the confirming means.

The confirming means can confirm whether or not, as the determining condition, the information processing device itself and the other information processing devices are each able to execute the restoration processing.

In the case that only the information processing device itself is confirmed as able to execute the restoration processing, the control means can cause the information processing device itself to execute the restoration processing.

In the case that only the other information processing device is confirmed as able to execute the restoration processing, the control means can cause the other information processing device to execute the restoration processing.

In the case that both of the information processing device itself and the other information processing device are confirmed as unable to execute the restoration processing, the control means can omit the restoration processing.

In the case that both of the information processing device itself and the other information processing device are confirmed as able to execute the restoration processing, the control means can further confirm a selection condition for selecting a favorable device to perform the restoration processing.

The confirming means confirm whether or not, as the selection condition, the manufacturing source of the other information processing device matches the information processing device; and wherein, in the case confirmation is made that the manufacturing source of the other information processing device matches the information processing device, the control means can cause the other information processing device to execute the restoration processing, and in the case confirmation is made that the manufacturing source of the other information processing device does not match the information processing device, the control means can cause the information processing device itself to execute the restoration processing.

The confirming means confirm whether or not, as the selection condition, the algorithm of the restoration processing of the other information processing device is newer than the algorithm of the restoration processing of the information processing device; and wherein, in the case confirmation is made that the algorithm of the restoration processing of the other information processing device is newer than the algorithm of the restoration processing of the information processing device, the control means cause the other information processing device to execute the restoration processing; and in the case confirmation is made that the algorithm of the restoration processing of the other information processing device is not newer than the algorithm of the restoration processing of the information processing device, the control means can cause the information processing device itself to execute the restoration processing.

The confirming means confirm whether or not, as the selection condition, the other information processing device is able to execute the restoration processing as to a high-tone image that is higher than a predetermined tone; and wherein, in the case confirmation is made that the other information processing device is able to execute the restoration processing as to the high-tone image, the control means cause the other information processing device to execute the restoration processing; and in the case confirmation is made that the other information processing device is not able to execute the restoration processing as to the high-tone image, the control means can cause the information processing device itself to execute the restoration processing.

The confirming means confirm whether or not, as the selection condition, restoration metadata exists which includes information necessary for the restoration processing of the image; and wherein in the case confirmation is made that the restoration metadata of the image exists, the control means can cause the information processing device itself or the other information processing device to execute the restoration processing.

The confirming means further confirm a selection condition to select a favorable device for performing gamut conversion processing to convert the gamut of the image to a desired gamut; and wherein the control means can control execution of the gamut conversion processing, based on confirmation results by the confirmation means.

The confirming means confirm whether or not, as the selection condition, the manufacturing source of the other information processing device matches that of the information processing device, whether or not the algorithm of the gamut conversion processing of the other information processing device is newer than the algorithm of the gamut conversion processing of the information processing device, or whether or not the other information processing device is able to execute the gamut conversion processing as to a high-tone image that is higher than a predetermined tone; wherein in the case confirmation is made that the manufacturing source of the other information processing device matches that of the information processing device, in the case confirmation is made that the algorithm of the gamut conversion processing of the other information processing device is newer than the algorithm of the gamut conversion processing of the information processing device, or in the case confirmation is made that the other information processing device is able to execute the gamut conversion processing as to the high-tone image; and wherein in the case confirmation is made that the manufacturing source of the other information processing device does not match that of the information processing device, in the case confirmation is made that the algorithm of the gamut conversion processing of the other information processing device is not newer than the algorithm of the gamut conversion processing of the information processing device, or in the case confirmation is made that the other information processing device is unable to execute the gamut conversion processing as to the high-tone image, the control means can cause the information processing device itself to execute the gamut conversion processing.

The information processing device further has playing means to read out the image from a recording medium, wherein the confirming means confirm a determining condition for controlling execution of the restoration processing as to the image read out from the recording medium by the playing means; wherein the control means control the execution of the restoration processing as to aid image read out from the recording medium by the playing means, based on confirmation results by the confirmation means; and wherein the communication means can transmit the image read out from the recording medium by the playing means or an image subjected to control by the control means and the restoration processing, to the other information processing device.

The information processing device further has output means to output the image, wherein the communication means receive the image transmitted from the other information processing device; wherein the confirmation means confirm determining conditions for controlling the execution of the restoration processing as to the image received by the communication means; wherein the control means control the execution of the restoration processing as to the image received by the confirmation means, based on confirmation results by the confirmation means; and wherein the output means can output the image received by the communication means or the image controlled by the control means and subjected to the restoration processing.

A second aspect of the present invention is an information processing method that has a step to perform communication of an image subjected to gamut conversion between other information processing devices; a step to confirm determining conditions for controlling the execution of restoration processing which returns at least a portion of the gamut of the image to the state before gamut conversion; and a step to confirm execution of the restoration processing based on the confirmation results.

A second aspect of the present invention is a program to cause a computer to execute an information processing method that has a step to perform communication of an image subjected to gamut conversion between other information processing devices; a step to confirm determining conditions for controlling the execution of restoration processing which returns at least a portion of the gamut of the image to the state before gamut conversion; and a step to confirm execution of the restoration processing based on the confirmation results.

According to the first aspect of the present invention, restoration metadata, including data that is referenced in the restoration processing that returns at least a portion of the gamut of the image subjected to gamut conversion to the state before gamut conversion, is generated, and the generated restoration metadata is associated to the image.

According to the second aspect of the present invention, communication is performed between other information processing devices about the image subjected to gamut conversion, a defining condition for controlling execution of the restoration processing to return at least a portion of the image gamut to the state before gamut conversion is confirmed, and based on the confirmation results, execution of the restoration processing is confirmed.

Advantageous Effects of Invention

According to the present invention, information can be processed. Particularly, gamut conversion of content can be performed more properly.

BRIEF DESCRIPTION OF THE DRAWINGS

FIG. 34 is a diagram illustrating an example of a recording format of gamut metadata.

FIG. 35 is a diagram illustrating an example of a recording format of restoration metadata.

DESCRIPTION OF EMBODIMENTS

Modes for carrying out the invention (hereafter called embodiments) will be described below. Note that description will be made in the following order.
1. First embodiment (control of playing device leading)
2. Second embodiment (control of output device leading)
3. Third embodiment (control of only gamut conversion)
4. Fourth embodiment (main compression data control)
5. Fifth embodiment (gamut conversion processing and restoration processing)
6. Sixth embodiment (personal computer)

1. First Embodiment

[Device Configuration]

Figure 1:
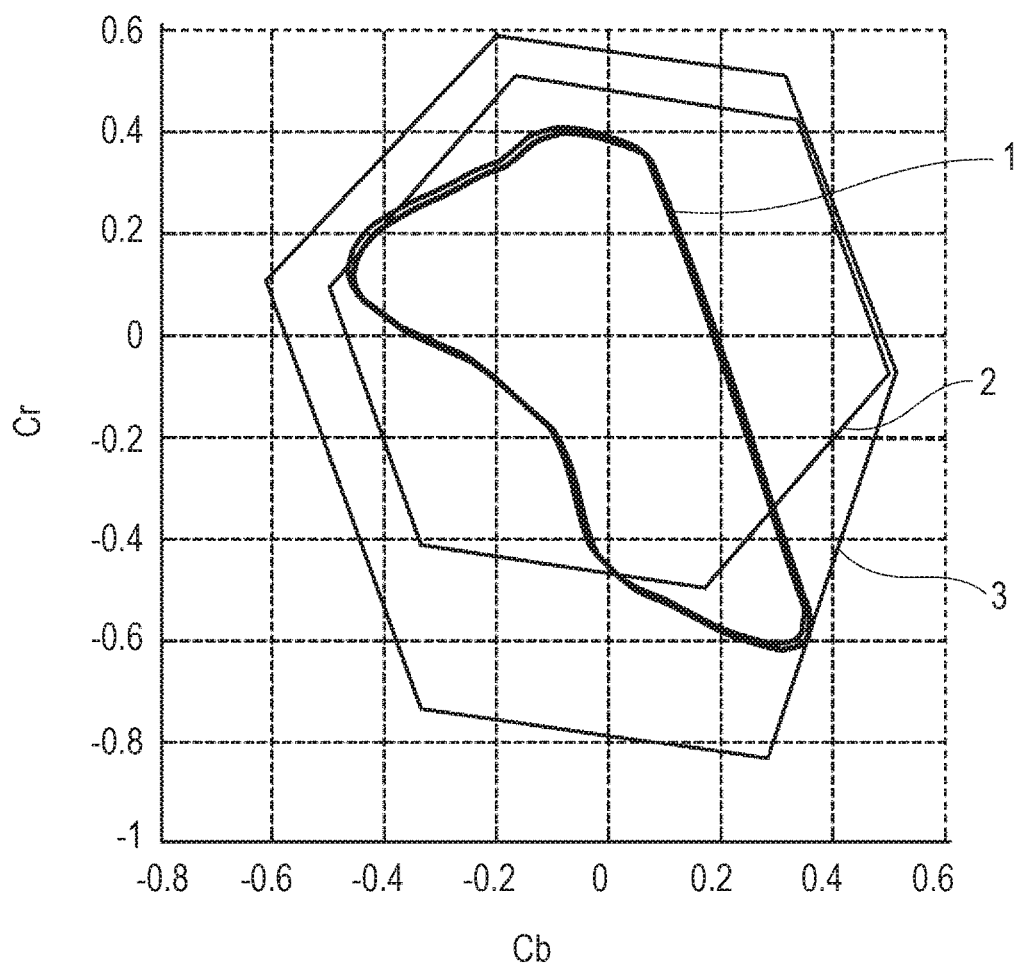
FIG. 1 is a schematic diagram illustrating a comparison state of gamut ranges.
Figure 2:
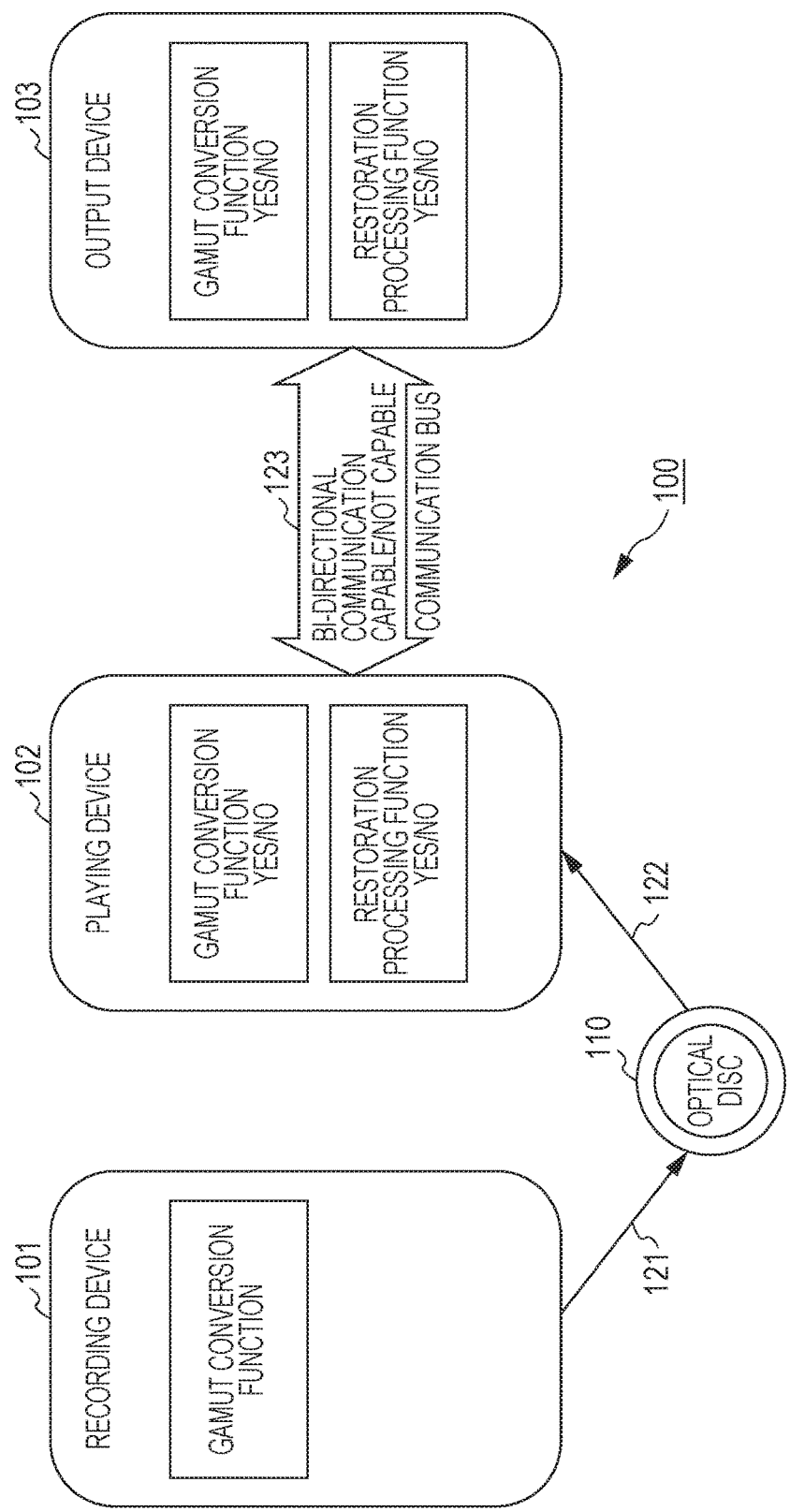
FIG. 2 is a diagram illustrating a configuration example of an information processing system to which the present invention is applied.

FIG. 2 is a diagram illustrating a configuration example of an information processing system to which the present invention has been applied.

An information processing system 100 shown in FIG. 2 is a system executes various types of processing relating to content (image data), such as generating image data by imaging or the like (or obtaining image data from outside of the system), recording image data serving as the content thereof to a recording medium, reading out (playing) image data from the recording medium, and displaying (output) images of the played image data, and together with these processes, more reliably and properly performs restoration and gamut conversion of the image data serving as content.

The information processing system 100 has a recording device 101, playing device 102, and output device 103.

The recording device 101 records the image data obtained by imaging for example or from outside of the system, as content data, together with metadata and so forth to an optical disc 110 which is a recording medium (arrow 121). For example, the recording device means a device which images a subject with an image sensor such as a CCD (Charge Coupled Device), CMOS (Complementary Metal Oxide Semiconductor), or the like, and records onto a recording medium such as a memory card, magnetic tape, or DVD or the like. For example, a digital still camera, video camera, film scanner, and cellular phone with camera function or the like correspond to the this recording device.

The playing device 102 read out the content data recorded in the optical disc 110 which is a recording medium (arrow 122), and supplies the read out content data to the output device 103 (arrow 123). The playing device 102 means a device having the function to play moving pictures recorded on some type of recording medium. For example, a video tape player, DVD player, Blu-ray disc player, and a digital still camera, video camera, and cellular phone or the like having a playing function corresponds thereto.

The output device 103 displays the image of the image data supplied form the playing device 102. The output device 103 means a device having a function to output a moving picture signal with some sort of method. For example, a television receiver, projector, printer, and a digital still camera, video camera, and cellular phone or the like having a monitor corresponds thereto.

The information processing system 100 is a system to more properly perform gamut conversion and restoration of image data, by coordination between devices, in processing relating to image data such as in the above.

The range of the gamut that can be displayed by the output device 103 displaying a image is limited. Accordingly, in a normal case, gamut conversion processing which matches the gamut of the image data to the output device 103 is needed. For example, a portion of the image data gamut that is wider than the gamut of the output device 103 may result in the occurrence of color phase shift. Conversely, a portion of the image data gamut that is narrower than the gamut of the output device 103 is not drawing out the capability of the output device 103 to the maximum. That is to say, matching the gamut of the image data to a gamut to which the output device can correspond is desirable.

The recording device 101 has a gamut conversion function to convert the image data gamut as shown in FIG. 2. The playing device 102 and output device 103 will not necessarily have these functions, so in order to suppress the occurrence of color phase shift resulting from natural clip, in the event of recording image data on the optical disc 110, the recording device 101 converts the image data gamut beforehand to a predetermined gamut having a limited range.

At this time, the recording device 101 can convert the image data gamut into the gamut of when the image is output by the output device 103, i.e. the final gamut (main compression), or can convert into another gamut (temporary compression). In the case of the temporary compression, the image data gamut is basically subjected to gamut conversion of the gamut of the output device 103 (main compression). Thus, the recording device 101 adds metadata for the gamut conversion processing thereof (gamut metadata) to the image data and records this on the optical disc 110.

Cases may be considered where the gamut of the output device 103 cannot be identified at the point in time of recording the image data on the optical disc 110. Accordingly, the image data gamut may result in being narrower than the gamut of the output device 103 from the gamut conversion by the recording device 101.

Now, the recording device 101 generates metadata (restoration metadata) for the restoration processing to restore the gamut to before the image data gamut conversion, adds this to the image data, and records on the optical disc 110.

Note that gamut restoration is the processing to return a portion or all of the image data gamut to the state before the gamut conversion. Note that in the case that the gamut before gamut conversion is infinitely wide, as with the image data obtained by imaging, "completely" restoring the gamut is difficult, but at least partially restoring (the portions actually usable) is possible.

Also, various devices are applicable to the playing device 102 and output device 103, as described above, and functions that the devices have are also varied. Accordingly, as shown in FIG. 2, the playing device 102 and output device 103 each have cases having, and cases not having, gamut conversion functions that subject the image data gamut to main compression. Also, the playing device 102 and output device 103 each have cases having, and cases not having, restoration processing function to restore the gamut to the gamut before image data gamut conversion.

Accordingly, when each of the playing device 102 and output device 103 independently perform gamut conversion processing or restoration processing without planning, unnecessary processing can be generated such as omission or duplication of processing, and this can lead to unnecessary image quality deterioration. Also, restoration processing and gamut conversion processing can be executed with an improper device.

Now, the playing device 102 and output device 103 perform bi-directional communication (arrow 123), confirm mutual functions with each other, thereby controlling execution of gamut conversion processing and restoration processing, selects with which device the processing thereof will be executed, properly performs the processing with the selected device, and suppresses execution of unnecessary processing and inefficient processing.

Also, for example, cases may be considered wherein bi-directional communication thereof is not possible, such as cases where the device to serve as the communication partner does not have communication functions, or in cases where communication environment is not arranged. With such cases also, the playing device 102 and output device 103 perform execution control for gamut conversion processing and restoration processing, respectively, so that content gamut conversion can be more properly performed.

The recording device 101, playing device 102, and output device 103 may be configured as mutually different devices, or the recording device 101 and playing device 102 may be configured as one device (integrated device) that is separate from the output device 103. For example, a general video camera or digital still camera has a function serving as the recording device 101 to image a subject and record the image data thereof on a recording medium, and a function serving as the playing device 102 to read out the image data recorded on the recording medium and output to another device.

In such a case, we can consider the integrated device thereof to be a recording device 101 at the time of imaging operation mode, and a playing device 102 at the time of image playing mode.

The optical disc 110 is an example of a recording medium (storage medium) to record image data, and may be any sort if a recording medium that is writable (writing or rewriting). For example, there is a CD-R (Compact Disc-Recordable) and CD-RW (Compact Disc-Rewritable). Also, for example, there is a DVD±R (Digital Versatile Disc±Recordable) or DVD±RW (Digital Versatile Disc±Rewritable). Further, for example, there is a DVD-RAM (Digital Versatile Disc Random Access Memory), BD-R (Blu-ray Disc Recordable), or BD-RE (Blu-ray Disc-Rewritable). If the recording device 101 and playing device 102 are corresponding thereto, it goes without saying that an optical disc (recording medium) other than these standards may be used.

Also, instead of the optical disc 110, a flash memory, hard disk, or tape device may be used. Further, a flexible removable medium is not required and a built-in recording medium may be used. It goes without saying that this recording medium may be configured as a separate device from the recording device 101 and playing device 102, such as a peripheral device or server or the like.

Note that gamut conversion is processing to modify the gamut range. Accordingly, this includes cases of narrowing the gamut and cases of widening the gamut. For example, narrowing a certain portion of the gamut and widening another portion is also included. However, generally, gamut conversion mostly involves cases of gamut compression to narrow the gamut. Accordingly, in the description below, description will basically be given with a case of gamut compression as an example. However, the description below can basically be applied to gamut expansion which widens the gamut.

Figure 3:
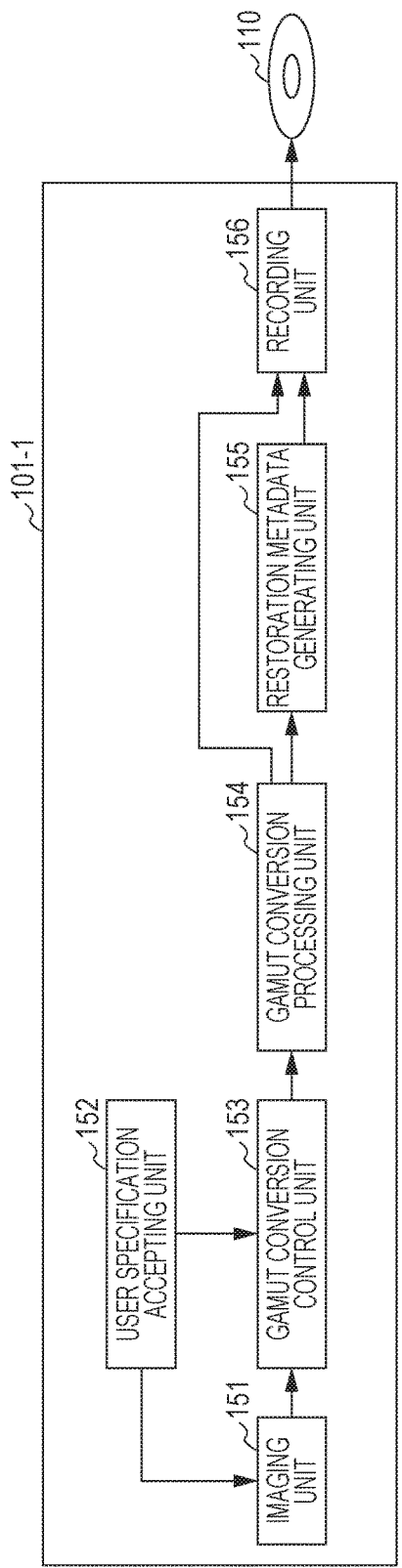
FIG. 3 is a block diagram illustrating a configuration example of the recording device in FIG. 2.

FIG. 3 is a block diagram illustrating a primary configuration example of the recording device 101 in FIG. 2. As shown in FIG. 3, the recording device 101 has an imaging unit 151, user specification accepting unit 152, gamut conversion control unit 153, gamut conversion processing unit 154, restoration metadata generating unit 155, and recording unit 156.

The imaging unit 151 images a subject based on user instructions received by the user instruction accepting unit 152, generates the image data thereof, and supplies this to the gamut conversion control unit 153. The user specification accepting unit 152 has a user interface such as switches and buttons for example, and via these accepts specifying (instructing) operations from a user. The user specification accepting unit 152 supplies the input user specifications to the imaging unit 151 and gamut conversion control unit 153.

The gamut conversion control unit 153 selects an optimal method for gamut conversion, based on the user specifications and various types of setting values and so forth. The gamut conversion processing unit 154 converts the image data gamut and generates gamut metadata indicating the gamut after conversion, based on the controls of the gamut conversion control unit 153 thereof (with the selected method).

In the case of being controlled by the gamut conversion control unit 153 to generate the restoration metadata, the restoration metadata generating unit 155 obtains the image data subjected to gamut conversion and the gamut metadata from the gamut conversion processing unit 154, then based on the image data thereof, generates the restoration metadata for restoring the gamut before gamut conversion. The restoration metadata generating unit 155 supplies the image data, gamut metadata, and restoration metadata to the recording unit 156.

In the case of being controlled by the gamut conversion control unit 153 so as to not generate the restoration metadata, the gamut conversion processing unit 154 supplies the image data and gamut metadata to the recording unit 156 without going via the restoration metadata generating unit 155.

The recording unit 156 shows a writing function of a drive on which the optical disc 110 is mounted, for example. The recording unit 156 records the image data and gamut metadata supplied from the gamut conversion processing unit 154, or image data, gamut data, and restoration metadata supplied from the restoration metadata generating unit 155, as content to the optical disc 110 mounted on the drive.

Figure 4:
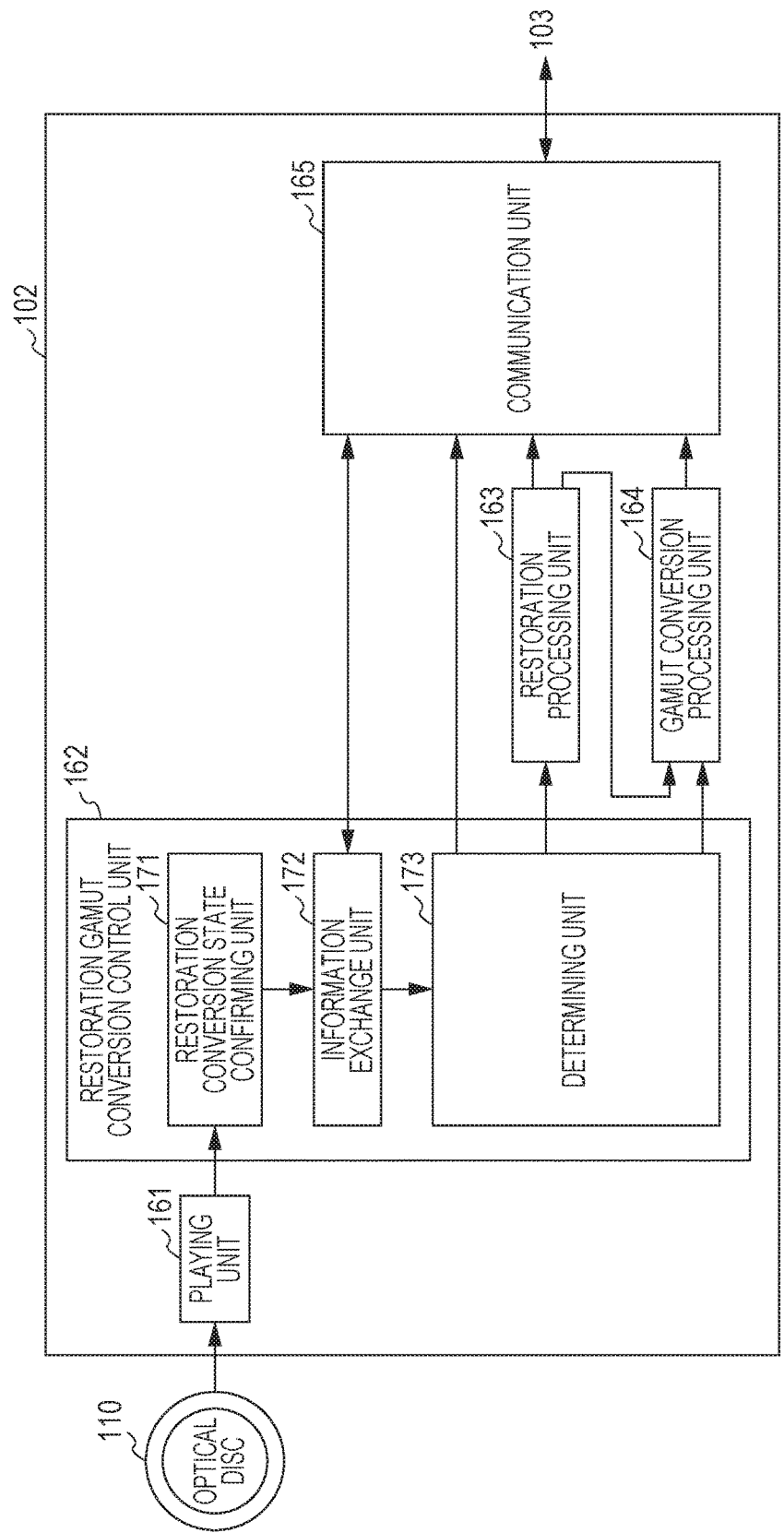
FIG. 4 is a block diagram illustrating a configuration example of the playing device in FIG. 2.

FIG. 4 is a block diagram showing a primary configuration example of the playing device 102 in FIG. 2.

As shown in FIG. 4, the playing device 102 has a playing unit 161, restoration gamut conversion control unit 162, restoration processing unit 163, gamut conversion processing unit 164, and communication unit 165.

The playing unit 161 shows a readout function of the drive to which the optical disc 110 is mounted, for example. The playing unit 161 reads out the content from the optical disc 110 mounted on the drive (e.g., image data, gamut metadata, and restoration metadata) and supplies this to the restoration gamut conversion control unit 162.

The restoration gamut conversion control unit 162 performs processing control relating to restoration and gamut conversion as to the image data read out by the playing unit 161 (and the gamut metadata and restoration metadata). For example, the restoration gamut conversion control unit 162 selects whether or not the read out image data will be subjected to performing restoration or gamut conversion or not, and in the case of performing, whether to perform this with this playing device or with an output device 103 at a later stage, and so forth.

The restoration gamut conversion control unit 162 has a restoration conversion state confirming unit 171, an information exchange unit 172, and a determining unit 173. The restoration conversion state confirming unit 171 performs confirmation of the gamut conversion state of the image data read out from the optical disc 110 and whether or not there is any restoration metadata and the like. For example, the restoration conversion state confirming unit 171 references the gamut of the image data read out from the optical disc 110, and confirms whether this is image data that has been subject to temporary compression (temporary compression data) or is image data that has been subject to main compression (main compression data). Further, the restoration conversion state confirming unit 171 references whether or not there is any restoration metadata, and also confirms whether restoration is possible.

The information exchange unit 172 communicates with the output device 103 via the communication unit 165, and performs an exchange of information, such as the existence of a restoration processing function and gamut conversion function. The determining unit 173 determines whether or not to perform restoration processing with this playing device 102, based on the information obtained from the restoration conversion state confirming unit 171 and information exchange unit 172. Similarly, the determining unit 173 determines whether or not to perform gamut conversion processing with this playing device 102, based on the information obtained from the restoration conversion state confirming unit 171 and information exchange unit 172.

The restoration processing unit 163 is controlled by the restoration gamut conversion control unit 162, and performs restoration processing of the gamut of the temporary compression data read out from the optical disc 110. The restoration processing unit 163 supplies the image data subjected to restoration processing to the gamut conversion processing unit 164.

The gamut conversion processing unit 164 is controlled by the restoration gamut conversion control unit 162, and performs gamut conversion (main compression) of the temporary compression data read out from the optical disc 110 from the playing unit 161 to the gamut of the output device 103. Also, the gamut conversion processing unit 164 is controlled by the restoration gamut conversion control unit 162, and performs gamut conversion (main compression) of the image data of which the gamut before temporary compression has been restored with the restoration processing unit 163, to the gamut of the output device 103. The gamut conversion processing unit 164 supplies the image data subjected to main compression (main compression data) to the communication unit 165. At this time, the gamut conversion processing unit 164 supplies the gamut metadata and restoration metadata of the image data, together with the main compression data as needed, to the communication unit 165.

Also, in the case that the image data read out from the optical disc 110 is main compression data, the determining unit 173 supplies this to the communication unit 165 without performing restoration processing or gamut conversion processing. Note that even in the case of performing restoration processing and gamut conversion processing with the output device 103, the determining unit 173 supplies the image data read out from the optical disc 110 and the metadata thereof to the communication unit 165.

Note that the restoration processing unit 163 and gamut conversion processing unit 164 can each be omitted. In this case, the playing device 102 cannot perform the restoration processing and gamut conversion processing that corresponds to the omitted processing unit, so the determining unit 173 performs control so as to omit the processing thereof, as appropriate.

The communication unit 165 performs communication with the output device 103, and exchanges information relating to restoration processing and gamut conversion, and supplies image data (and gamut metadata and restoration metadata) to the output device 103.

Figure 5:
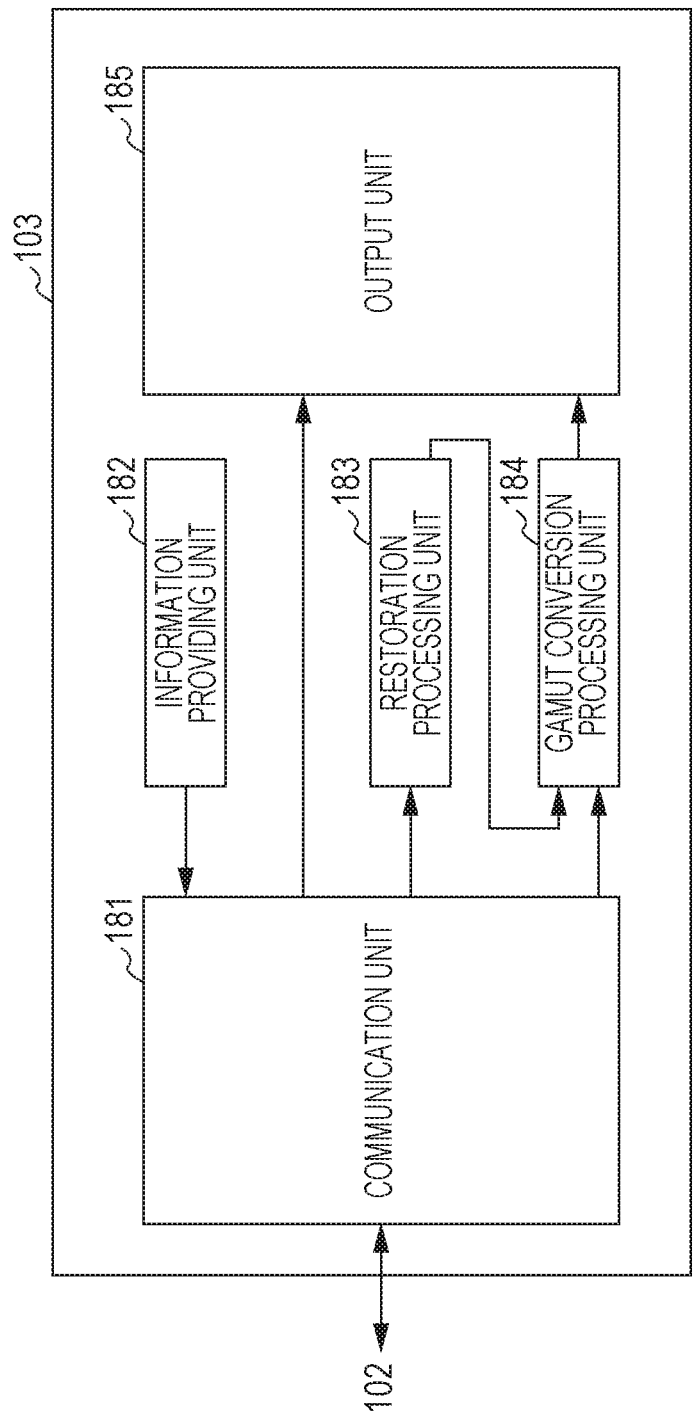
FIG. 5 is a block diagram illustrating a configuration example of the output device in FIG. 2.

FIG. 5 is a block diagram showing a primary configuration example of the output device 103 in FIG. 2.

As shown in FIG. 5, the output device 103 has a communication unit 181, information providing unit 182, restoration processing unit 183, gamut conversion processing unit 184, and output unit 185. The communication unit 181 performs communication with the playing device 102, and exchanges information relating to gamut conversion processing and restoration processing, and obtains image data (and gamut metadata and restoration metadata) supplied from the playing device 102.

Also, in accordance with control by the playing device 102, the communication 181 supplies the obtained image data and so forth to one of the restoration processing unit 183, gamut conversion processing unit 184, and output unit 185. For example, in the case of performing restoration processing with the output device 103, the communication unit 181 supplies the image data and so forth to the restoration processing unit 183. Also, for example, in the case that restoration processing is not performed with the output device 103 but gamut conversion processing is performed, the communication unit 181 supplies the image data and so forth to the gamut conversion processing unit 184. Further, for example, in the case that neither restoration processing nor gamut conversion processing is performed with the output device 103, the communication unit 181 supplies the image data to the output unit 185.

The information providing unit 182 has information relating to restoration processing and gamut conversion, to be provided to the playing device 102 via the communication unit 181, and supplies the information thereof to the communication unit 181 as appropriate.

The restoration processing unit 183 performs restoration processing of the gamut of the temporary compression data supplied via the communication unit 181. The restoration processing unit 183 supplies the image data subjected to restoration processing to the gamut conversion processing unit 184.

The gamut conversion processing unit 184 performs gamut conversion processing (main compression) that convert the gamut of the temporary compression data supplied via the communication unit 181 or the image data which is restored to the gamut before gamut conversion with the restoration processing by the restoration processing unit 183, into a gamut that the output unit 185 can express. The gamut conversion processing unit 184 supplies the main compression data to the output unit 185.

The output unit 185 has monitor such as an LCD (Liquid Crystal Display), PDP (Plasma Display Panel), or organic EL display (OELD (Organic Electroluminescence Display)) and printer and so forth, and displays and prints (i.e., outputs) the images of the image data.

Next, the flow of processing executed with each device will be described.

[Flow of Processing of Recording Device]

First, the flow of processing executed with the recording device 101 will be described. The recording device 101 executes recording control processing in the event of recording the image data obtained by imaging a subject or the like onto the optical disc 110, and performs gamut conversion of the image data. An example of flow of the recording control processing will be described with reference to the flowchart in FIG. 6.

Upon the recording control processing starting, in step S101 the gamut conversion control unit 153 determines whether or not a standard target gamut in the information processing system 100 has been specified, based on user specification accepted by the user specification accepting unit 152, the user specification accepted beforehand and stored, various types of setting values that have been updated by the user specifications thereof, or other various types of setting values or the like. The standard target gamut is a gamut that has been predefined as a standard value of the target gamut which is a final gamut of the image data in the information processing system 100. Generally, a relatively narrow gamut such as sRGB is applied to this standard target gamut.

The gamut conversion control unit 153 determines whether or not the standard target gamut has been specified as the gamut after conversion. In the case determination is made that the standard target gamut has been specified, the flow advances to step S102. In step S102, the gamut conversion processing unit 154 performs main compression as to the image data gamut with the standard target gamut.

Now, main compression is to convert the gamut of the image data into the gamut at the time of image output, i.e., the final gamut. For example, the image gamut at the time of imaging is sufficiently large and the same as being infinite. However, in this case, the colors expressed with the playing device 102 and output device 103 may fail, so gamut conversion of the image data is performed. At this time, converting to a gamut in the event that the image is output with the output device 103 is called main compression. In a normal case, the target gamut for main compression is the standard target gamut. Causing the gamut to be unnecessarily narrow is meaningless, so generally the gamut is the narrowest target gamut at the time of main compression.

In step S103, the storage unit 156 records the main compression data obtained by main compression with the gamut conversion processing unit 154, together with the gamut metadata thereof (standard target gamut metadata), onto the optical disc 110 and ends the recording control processing.

Also, in the case determination is made in step S101 that the standard target gamut has not been specified, the processing advances to step S104. In step S104, the gamut conversion processing unit 154 is controlled by the gamut conversion control unit 153 and performs temporary compression with the temporary target gamut specified by the user specifications accepted with the user specification accepting unit 152.

Temporary compression is compression other than main compression. There is no limit to the target gamut in this temporary compression. However, in many cases, a gamut that is wider than the target gamut at time of main compression is used for the target gamut. At the point in time that the image data is recorded onto the optical disc 110, from what sort of output device 103 the image data will be output is unclear. Thus, with the gamut conversion processing unit 154, for safety purposes (so that problems do not occur at later stages), the image data gamut is converted to a temporary target gamut defined based on user specifications, and the image data after the gamut conversion thereof is recorded onto the optical disc 110. Such gamut conversion is called temporary compression.

Upon temporary compressing ending, the gamut conversion control unit 153 determines in step S105 whether or not predetermined restoration metadata adding conditions hold. In the case determination is made that the restoration metadata adding conditions are satisfied, the processing is advanced to step S106.

In step S106, the restoration metadata generating unit 155 generates restoration metadata to be referenced in the event of restoration processing. In step S107, the recording unit 156 records the temporary compression data obtained by temporary compression, together with the gamut metadata (temporary target gamut metadata) and the restoration metadata generated by the processing in step S106, onto the optical disc 110, and ends the recording control processing.

Also, in step S105, in the case determination is made that the restoration metadata adding conditions are not satisfied, the flow is advanced to step S108. In step S108, the recording unit 156 records the temporary compression data obtained by the temporary compression, together with the gamut metadata (temporary target gamut metadata) onto the optical disc 110, and ends the recording control processing. That is to say, in this case, the restoration metadata is not added.

With the above recording control processing, the restoration metadata adding conditions in step S105 are conditions to be satisfied in order to add the restoration metadata. The content of these conditions is basically optional.

For example, a restoration metadata adding condition may be that the user specifies the attaching of the restoration metadata. That is to say, in this case, whether or not the restoration metadata is added is determined by user specification.

In the case determination is made in step S105 that the user has specified the attaching of the restoration metadata, the flow is advanced to step S106. That is to say, restoration metadata is generated, and attached to the image data and recorded. The playing device 102 or output device 103 can execute the restoration processing using the restoration metadata thereof. Conversely, in the case determination is made in step S105 that the user has not specified the attaching of the restoration metadata, the flow is advanced to step S108. That is to say, restoration metadata is not generated. Accordingly, the playing device 102 and output device 103 cannot execute restoration processing.

Also, for example, a restoration metadata adding condition may be that the word length of the compression data to be recorded is at least a predetermined length (e.g., 9-bit) (is a high tone image).

Generally the word length of image data is 8-bit or less, but some image data exists for high tone images wherein the word length is 9-bit or greater.

In the case that the word length of the image data is smaller than 9-bit, even if the restoration metadata is attached and restoration performed, there is a great possibility that tone jumping will occur in the image data restored with insufficient precision of image data, where tone continuity is lost. To counter this, methods to reduce the tone jumping by using an error dispersion method in the vicinity where the tone jumping occurs may be considered even when precision is insufficient, but processing becomes complex so this is often not used. Generally, restoration processing is often used in cases only where simple data decompression is performed for each pixel. Accordingly, even if 8-bit data is restored, usable restoration data may not be obtained.

Now, restoration metadata is generated so that restoration processing can be executed only in the case of a high-tone image that is higher than a predetermined tone (e.g. the word length is 9-bit or greater), and added to the image data.

Note that a case may be considered wherein, in the event of performing image processing, for the image processing thereof, a low-tone image that is lower than a predetermined tone is processed to have a higher tone, and returned to the original tone after the image processing. For example, there is a method wherein the tone of the image data having a word length of 8-bit is increased to 9-bit and signal processing is performed, then returned to 8-bit. More specifically, for example, the recording device 101 recording onto the optical disc 110 after increasing the tone of a low tone image and after gamut conversion, and the playing device 102 reading out the high tone image thereof and performing restoration processing and gamut conversion processing, then decreasing the tone and outputting this to the output device 103, may also be considered.

Thus, even if the image is originally low tone, if the high tone at the time of gamut restoration processing, the gamut can be restored with sufficient precision. Accordingly, images with tone thus increased are included in the above-mentioned high tone images.

In the case determination is made in step S105 that the word length of the image data is 9-bit or greater (is a high tone image), the flow is advanced to step S106. That is to say, restoration metadata is generated, attached to the image data, and recorded. The playing device 102 or output device 103 can execute the restoration processing using the restoration metadata thereof. Conversely, in the case determination is made in step S105 that the word length of the image data is 8-bit or less (not a high tone image), the flow is advanced to step S108. That is to say, restoration metadata is not generated. Accordingly, the playing device 102 and output device 103 cannot execute the restoration processing.

Note that the bit length to be set as a threshold of whether high tone or not is arbitrary. For example, this may be 10-bit or 12-bit and so forth, or may be 6-bit and so forth. Also an arrangement may be made wherein the user can arbitrary set this.

Also, cases may be considered wherein the word length of the image data is determined based on other conditions such as the format or the image data and so forth. For example, in the case of a bit map (BMP) format or a JPEG (Joint Photographic Experts Group) format, the word length for a still image is 8-bit.

Accordingly, determination may be made, at the point in time that the image data is generated with the imaging unit 151, as to whether or not restoration metadata will be added. In such a case, the processing in step S105 is skipped, and either one of the various processing in steps S106 and step S107, or the processing in step S108, is executed.

As shown above, when the gamut conversion control unit 153 determines the target gamut specified by the user, the gamut conversion processing unit 154 converts the image data to the specified gamut thereof, and further, in the case of temporary compression, predetermined restoration metadata adding conditions are satisfied, the restoration metadata generating unit 155 generates and attaches the restoration metadata.

By performing recording control processing in this way, the gamut conversion control unit 153 can control whether or not to enable the playing device 102 or output device 103 to execute restoration processing. That is to say, the recording device 101 can cause the playing device 102 or output device to perform control of restoration processing and gamut conversion processing with consideration for situations at the time of recording such as user specification and image data word length.

Note that in the above, description is made such that determination is made in step S101 as to whether or not a standard target gamut has been specified, but cases wherein a gamut to be a target (target) is defined beforehand may also be considered.

For example, in the case that the image data is data of a still image, and the format thereof is bitmap format (BMP) or PNG format, the sRGB gamut becomes the target gamut. Also, for example, in the case that the image data is moving image data, and the image thereof is SD (Standard-Definition), the BT601 gamut having the same width as the sRGB gamut becomes the target gamut, and in the case that the image is HD (High-Definition), the BT709 gamut having the same width as the sRGB gamut becomes the target gamut.

In the case that the format of the image data is defined beforehand as these formats, a gamut corresponding to the format is selected as the target gamut. That is to say, the gamut thereof (sRGB gamut, BT601 gamut, BT709 gamut) are set as the standard target gamut, and main compression is performed. That is to say, in this case, the determining processing in step S101 is skipped, and the processing in step S102 and step S103 are performed.

Also, a gamut serving as the target (goal) may be defined by the imaging mode, for example. For example, in the case that the mode at time of imaging by the imaging unit 151 is a standard (standard) mode, the target gamut may be set as the sRGB gamut. In this case, at the point in time that the user selects standard mode at time of imaging, sRGB gamut is selected as the target gamut. That is to say, this sRGB gamut is set as the standard target gamut, and main compression is performed. That is to say, in this case, the determining processing in step S101 is skipped, and the processing in step S102 and step S103 are performed.

[Flow of Processing of Playing Device]

Figure 7:
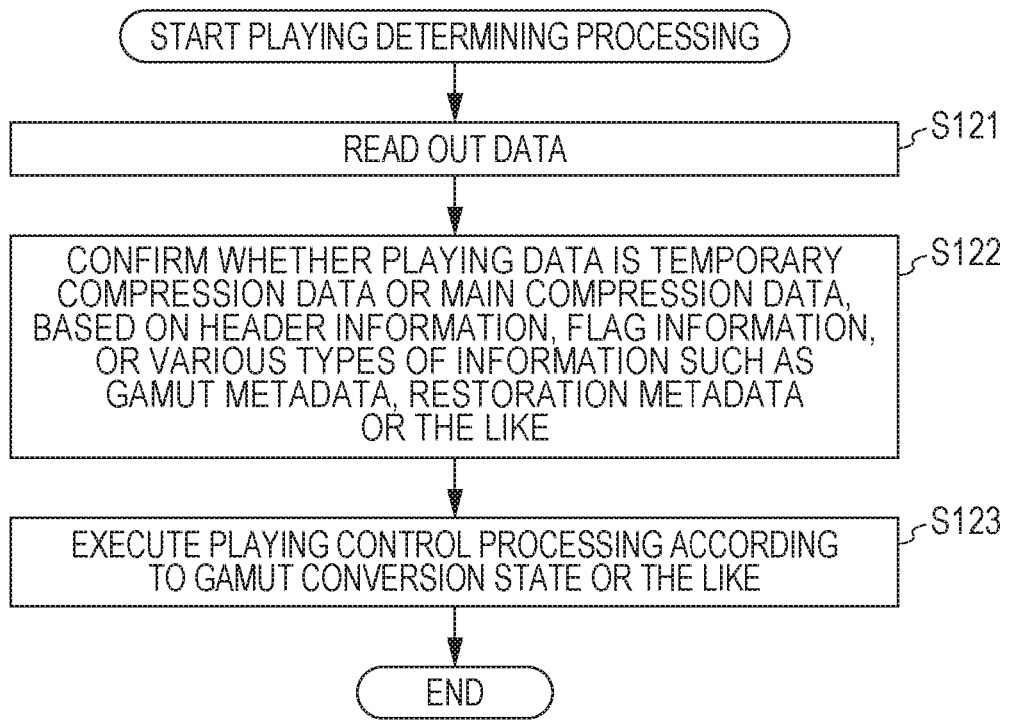
FIG. 7 is a flowchart describing an example of the flow of playing determining processing.

Next, processing to be executed with the playing device 102 will be described. The playing device 102 executes playing determining processing in the event of reading out content data such as image data or the like from the optical disc 110. An example of flow of the playing determining processing thereof will be described with reference to the flowchart in FIG. 7.

Upon the playing determining processing starting, in step S121 the playing unit 161 reads out the image data to be played, and the metadata thereof, from the optical disc 110. In step S122 the restoration conversion state confirming unit 171 confirms whether the image data to be played (playing data) has been temporarily compression (temporary compression data) or has been main-compressed (main compression data), based on various types of information such as image data header information, flag information, gamut metadata, or restoration metadata or the like.

In step S123, the various processing units of the information exchange unit 172 and determining unit 173, and the restoration processing unit 163 through the communication unit 165 execute playing control processing to perform restoration processing and gamut conversion processing in accordance with the gamut conversion state and the like.

Upon the playing control processing having ended, the playing determining processing is ended.

Next, the playing control processing and so forth will be described. First, a case will be described wherein the image data read out from the optical disc 110 is temporary compression data, and restoration metadata and gamut metadata are both attached thereto, i.e., in the case that the processing in step S108 is performed in the recording control processing described with reference to the flowchart in FIG. 6.

An example of flow of the playing control processing will be described with reference to FIG. 8.

Upon the playing control processing having started, in step S141 the information exchange unit 172 confirms the communication with the output device 103, and in step 142 determines whether or not the communication with the output device 103 is possible. In the case that communication is possible, the flow is advanced to step S143.

In step S143, the determining unit 173 determines whether or not restoration processing can be executed with the playing device 102, i.e., whether or not the playing device 102 has a restoration processing unit 163 and gamut conversion processing unit 164. In the case determination is made that the playing device 102 can execute restoration processing, the flow is advanced to step S144.

In step S144, the information exchange unit 172 performs an inquiry about the restoration processing function to the output device 103, confirms the restoration processing capability of the output device 103, and in step S145 determines whether or not the restoration processing can be executed with the output device 103. In the case that the output device 103 does not have a restoration processing unit 183, and is determined to be unable to execute the restoration processing with the output device 103, the flow is advanced to step S146.

In step S146, the information exchange unit 172 accesses the output device 103, and obtains the gamut information of the output device 103. In step S147 the restoration processing unit 163 is controlled by the restoration gamut conversion control unit 162, and using the gamut information of the output device 103 obtained by the processing in step S146, compares the gamut of the image data read out from the optical disc 110 (image data gamut) and the gamut of the output device 103 (output gamut).

In step S148 the restoration processing unit 163 determines whether or not the output gamut is "completely" small as to the image data gamut. In the case that portions outside the image data gamut are included in the output gamut, and the output gamut is not "completely" small as to the image data gamut, the flow is advanced to step S149.

In step S149, the restoration processing unit 163 performs restoration processing using the restoration metadata attached to the image data, and restores the gamut to before gamut conversion of the image data.

That is to say, in this case, restoration processing cannot be performed with the output device 103 (the output device does not have restoration processing functionality), and restoration processing is necessary (portions outside the image data gamut are included in the output gamut), so the playing device 102 itself performs restoration processing.

Upon the restoration processing having ended, in step S150 the information exchange unit 172 performs confirmation of the device conditions for gamut conversion processing with the output device 103, via the communication unit 165. Based on the confirmation results thereof, the determining unit 173 determines in step S151 whether or not the output device 103 satisfies the device conditions.

The device condition for the gamut conversion processing is a condition in order to select a more favorable device for executing the gamut conversion processing, and the content thereof is optional as long as this is the purpose thereof. For example, the device condition may be that the manufacturing source of the playing device 102 and output device 103 are the same. Generally, in the case that the manufacturing sources match, the gamut of the output device 103 is often known by the playing device 102. Also, in many cases the algorithms and so forth of the restoration processing and gamut conversion processing mutually correspond. Accordingly, in the case that the manufacturing source of the output device 103 matches the manufacturing source of the playing device 102, the temporary compression data can be handed over to the output device 103 without change, and this is relatively safe.

Also, a device condition may be that the version of the gamut conversion algorithm is higher for the output device (perform gamut conversion processing with a newer algorithm than the playing device 102). In the case that the gamut conversion algorithm version is higher for the output device, the gamut conversion processing is controlled so as to be performed with the output device 103.

It goes without saying that an arrangement may be used other than these. For example, the gamut conversion algorithm can subject the image data having a predetermined data length (e.g., 8-bit) to gamut conversion. Also, an arrangement may be made wherein a longer data length can be processed.

In the case determination is made that the device condition for the gamut conversion processing as described above does not hold, the flow is advanced to step S152. In step S152, the gamut conversion processing unit 164 performs main compression using the gamut information of the output device 103. In step S153 the communication unit 165 supplies the main compression data generated in step S152 to the output device 103, and ends the playing control processing.

Also, in the case determination is made in step S151 that the device condition holds for the gamut conversion processing, the flow is advanced to step S154. In step S154, the communication unit 165 supplies the image data, the gamut of which is restored to before gamut conversion, together with the gamut metadata to the output device 103, and ends the playing control processing.

That is to say, in this case, it is desirable for the gamut conversion processing to be executed with the output device 103, so the playing device 102 causes the output device 103 to perform gamut conversion processing.

Also, in the case determination is made in step S148 that the gamut of the output device 103 is completely small, the flow is advanced to step S152.

That is to say, in this case, restoration processing is unnecessary, so the processing in step S149 and so forth are skipped, and the flow is advanced to step S152. That is to say, main compression is performed with the playing device 102.

In the case determination is made in step S145 that the output device 103 can execute the restoration processing, the flow is advanced to step S155. In step S155 the information exchange unit 172 exchanges information with the output device 103, and confirms the device conditions for the restoration processing as to the output device 103. Based on the confirmation results thereof, the determining unit 173 determines in step S156 whether or not the output device 103 satisfies the device conditions.

The device condition for the restoration processing is a condition in order to select a more favorable device for executing the restoration processing, and the content thereof is optional as long as this is the purpose thereof. For example, the device condition may be that the manufacturing source of the playing device 102 and output device 103 are the same. Generally, in the case that the manufacturing sources match, this is relatively safe, so the restoration processing is controlled to be performed with the output device 103.

Also, a device condition may be that the version of the restoration processing algorithm is higher for the output device (perform restoration processing with a newer algorithm than the playing device 102). In the case that the restoration algorithm version is higher for the output device 103, the restoration processing is controlled so as to be performed with the output device 103.

It goes without saying that an arrangement may be made other than these. For example, the restoration algorithm can restore the gamut of the image data having a predetermined data length (e.g., 8-bit). Also, an arrangement may be made wherein a longer data length can be processed.

In the case determination is made in step S156 that the device condition for the restoration processing such as described above does not hold, the flow is returned to step S146. That is to say, in this case, control is performed so that when restoration processing is necessary, this is executed with the playing device 102.

Also, in the case determination is made in step S156 that the device condition for the restoration processing holds, the flow is advanced to step S157.

In step S157 the determining unit 173 supplies the temporary compression data together with the gamut metadata and restoration metadata to the output device 103, and ends the playing control processing. In other words, in this case, control is performed so that when restoration processing is necessary, this is executed with the output device 103.

Also, in the case determination is made in step S143 that restoration processing is impossible with the playing device 102, the flow is advanced to step S158. In step S158, the information exchange unit 172 confirms the restoration processing capability of the output device 103, and the determining unit 173 determines whether or not the output device 103 can execute the restoration processing, based on the confirmation results thereof.

In the case determination is made that the output device 103 can execute the restoration processing, the flow is returned to step S157. That is to say, in this case, execution of the restoration processing with the playing device 102 is impossible, and execution of the restoration processing with the output device 103 is possible, whereby control is performed so that the restoration processing is performed with the output device 103.

Also, in the case determination is made in step S159 that execution of the restoration processing with the output device 103 is impossible, the flow is advanced to step S160.

In step S160, the various parts of the playing device 102 executes the gamut conversion control processing to control processing relating to gamut conversion. That is to say, in this case, restoration processing cannot be performed with the playing device 102 and with the output device 103. Thus, gamut conversion control processing is executed so that the various units of the playing device 102 can perform at least the gamut conversion processing. Details of the gamut conversion control processing will be described later.

Upon the gamut conversion processing having ended, the playing control processing is ended.

Also, in the case determination is made in step S142 that bi-directional communication with the output device 103 cannot be performed, the flow is advanced to step S161. In step S161, the restoration gamut conversion control unit 162 causes the various units to execute error processing, and ends the playing control processing. That is to say, since bi-directional communication between the playing device and output device cannot be performed (necessary information exchange cannot be made for the restoration processing and gamut conversion), the output of image data is stopped.

An example of flow of the gamut conversion control processing executed with in step S160 in FIG. 8 will be described with reference to the flowchart in FIG. 9.

Upon the gamut conversion control processing starting, in step S181 the determining unit 173 determines whether or not gamut conversion is possible with the playing device 102, i.e., whether or not the playing device 102 has a gamut conversion processing unit 164. In the case determination is made that gamut conversion is possible, the flow is advanced to step S182.

In step S182, the information exchange unit 172 inquires to the output device 103, and confirms the gamut conversion capability of the output device 103. Based on the confirmation results thereof, the determining unit 173 determines in step S183 whether or not gamut conversion is possible with the output device 103. In the case determination is made that gamut conversion is impossible, the flow is advanced to step S184.

In step S184, the gamut conversion processing unit 164 is controlled by the restoration gamut conversion control unit 162 to obtain gamut information of the output device 103. In step S185, the gamut conversion processing unit 164 performs main compression. In step S186, the communication unit 165 is controlled by the restoration gamut conversion control unit 162, and provides the main compression data obtained with the processing in step S185 to the output device 103. At this time, the communication unit 165 supplies the standard target gamut, together with the main compression data, to the output device 103 as needed.

Also, in the case determination is made in step S183 that gamut conversion can be executed with the output device 103, the flow is advanced to step S187. In step S187, the information exchange unit 172 exchanges information with the output device 103, and confirms the device conditions for the gamut conversion processing. The device conditions are similar to the device conditions in the case of step S151 in FIG. 8, so the description thereof will be omitted. In step S188 the determining unit 173 determines whether or not the device conditions hold. In the case determination is made that the device conditions do not hold for the gamut conversion processing, the flow is returned to step S184.

That is to say, in this case, gamut conversion can be performed with both the playing device 102 and the output device 103, but performing gamut conversion with the playing device 102 is more desirable, so control is performed so that gamut conversion is performed with the playing device 102.

Also, in the case determination is made in step S188 that the device conditions for the gamut conversion processing holds, the flow is advanced to step S189. In step S189, the communication unit 165 supplies the temporary compression data, together with the gamut metadata, to the output device 103. That is to say, in this case, gamut conversion can be performed with both the playing device 102 and the output device 103, but performing gamut conversion with the output device 103 is more desirable, so control is performed so that gamut conversion is performed with the output device 103.

Upon the image data having been supplied to the output device 103, the gamut conversion control processing is ended.

Also, in the case determination is made in step S181 that execution of gamut conversion by the playing device 102 is impossible, the flow is advanced to step S190. In step S109 the information exchange unit 172 confirms the gamut conversion capability of the output device 103. In step S191 the determining unit 173 determines whether or not gamut conversion can be executed with the output device 103, based on the confirmation results thereof. In the case determination is made that gamut conversion is possible with the output device 103, the flow is advanced to step S189. In this case, control is performed so that the output device 103 does not perform main compression. In the case determination is made that the output device also cannot perform gamut conversion, the flow is advanced to step S192.

In step S192 the restoration gamut conversion control unit 162 causes the various units to execute error processing, and ends the gamut conversion control processing. That is to say, in this case, neither the playing device 102 nor the output device 103 can perform gamut conversion, so the output of the image data is stopped.

The playing device 102 controls restoration processing and gamut conversion processing by executing processing such as described above.

[Flow of Processing of Output Device]

Next, processing to be executed with the output device 103 will be described. The output device 103 executes output control processing as to the control processing of the playing device 102 described above, and responds to requests from the playing device 102. An example of the flow of output control processing thereof will be described with reference to the flowchart in FIG. 10.

Upon output control processing starting, in step S211 the communication unit 181 confirms communication with the playing device 102, and in step S212 determines whether or not bi-directional communication is possible. In the case determination is made that bi-directional communication is possible, the flow is advanced to step S213.

In step S213, the various units of the output device 103 link with the playing device 102, and executes restoration conversion control processing which appropriately controls the execution of the restoration processing and gamut conversion processing. Details of the restoration conversion control processing will be described later.

In step S214, the information providing unit 182 determines whether or not the output control processing has ended. Until determination is made in step S214 that output control processing has been ended, the restoration conversion control processing in step S213 is repeatedly executed.

In the case determination is made in step S214 that output control processing is to be ended, the flow is advanced to step S215. In step S215, the output unit 185 outputs the main compression data created with the restoration conversion control processing, and ends the output control processing.

Also, as described above, in the case bi-directional communication is impossible, the output of image data is stopped, so in step S212, in the case determination is made that bi-directional communication is impossible, the output control processing is ended.

Next, a detailed example of the flow of restoration conversion control processing executed in step S213 will be described with reference to the flowchart in FIG. 11.

Upon the restoration conversion control processing starting, in step S231 the information providing unit 182 determines whether or not restoration processing capability is confirmed from the playing device 102. In the case determination is made that the restoration processing capability has been confirmed via the communication unit 181, the flow is advanced to step S232. In step S232, the information providing unit 182 notifies the playing device 102 of the restoration processing capability of the output device 103, via the communication unit 181.

Upon notification ending, the flow is advanced to step S233. Also, in step S231, in the case determination is made that restoration processing capability is not confirmed, the processing in step S232 is skipped, and the flow is advanced to step S233.

In step S233, the information providing unit 182 determines whether or not gamut conversion capability has been confirmed from the playing device 102. In the case determination is made that gamut conversion capability has been confirmed via the communication unit 181, the flow is advanced to step S234. In step S234 the information providing unit 182 notifies the playing device 102 of the gamut conversion capability of the output device 103, via the communication unit 181.

Upon notification ending, the flow is advanced to step S235. Also, in the case determination is made in step S233 that gamut conversion capability is not confirmed, the processing in step S234 is skipped, and the flow is advanced to step S235.

In step S235, the information providing unit 182 determines whether or not the information (gamut information) showing the gamut of the output device 103 has been requested from the playing device 102. In the case determination is made that the gamut information has been requested, the flow is advanced to step S236. In step S236, the information providing unit 182 supplies the gamut information showing the gamut of the output device 103 to the playing device 102, via the communication unit 181.

Upon gamut information being supplied, the flow is advanced to step S237. Also, in the case determination is made in step S235 that gamut information has not been requested, the information providing unit 182 skips the processing in step S236 and advances to step S237.

In step S237, the communication unit 181 determines whether or not main compression data has been supplied from the playing device 102. In the case determination is made that main compression data has been supplied, the flow is advanced to step S238. In step S238, the communication unit 181 obtains the main compression data thereof, and supplies this to the output unit 185.

Upon main compression data having been supplied to the output unit 185, the flow is advanced to step S239. Also, in the case determination is made in step S237 that main compression data has not been supplied, the processing in step S238 is skipped, and the flow is advanced to step S239.

In step S239 the information providing unit 182 determines whether or not the device conditions for the restoration processing has been confirmed from the playing device 102. An example of the device conditions for the restoration processing is as described with reference to FIG. 8.

In the case determination is made that device conditions for the restoration processing have been confirmed via the communication unit 181, the flow is advanced to step S240. In step S240, the information providing unit 182 notifies the confirmation results of the device conditions for restoration processing of the output device 103, via the communication unit 181.

Upon ending notification, the flow is advanced to step S241. Also, in the case determination is made in step S239 that device conditions for the restoration processing have not been confirmed, the processing in step S240 is skipped, and the flow is advanced to step S241.

In step S241, the information providing unit 182 determines whether or not the device conditions for the gamut conversion processing has been confirmed by the playing device. The example of device conditions for the gamut conversion processing is as described with reference to FIG. 8.

In the case determination is made that device conditions for the gamut conversion processing have been confirmed via the communication unit 181, the flow is advanced to step S242. In step S242, the information providing unit 182 notifies the confirmation results of the device conditions for the gamut conversion processing of the output device 103, via the communication unit 181.

Upon notification ending, the flow is advanced to step S243. In the case determination is made in step S241 that device conditions for the gamut conversion processing have not been confirmed, the processing in step S242 is skipped, and the flow is advanced to step S243.

In step S243, the communication unit 181 determines whether or not the temporary compression data has been supplied together with the gamut metadata thereof from the playing device 102. In the case determination is made that the temporary compression data has been supplied together with the gamut metadata thereof, the flow is advanced to step S244. In step S244 the communication unit 181 obtains the temporary compression data and gamut metadata supplied from the playing device 102. In step S245 the gamut conversion processing unit 184 uses the gamut information of the output device 103 and the gamut metadata of the temporary compression data to perform main compression of the temporary compression data.

Upon the main compression ending, the flow is advanced to step S246. Also, in the case determination is made in step S243 that the temporary compression data has not been supplied together with the gamut metadata thereof, the processing in step S244 and step S245 are skipped, and the flow is advanced to step S246.

In step S246, the communication unit 181 determines whether or not the temporary compression data has been supplied together with the gamut metadata thereof and restoration metadata from the playing device 102. In the case determination is made that the temporary compression data, gamut metadata, and restoration metadata have been supplied from the playing device 102, the flow is advanced to step S247.

In step S247, the communication unit 181 obtains the temporary compression data, gamut metadata, and restoration metadata from the playing device 102. In step S248, the communication unit 181 uses the gamut information of the output device 103 itself and the gamut metadata of the temporary compression data, and compares the gamut of the temporary compression data (image data gamut) and the gamut of the output device 103 (output gamut). In step S249, as a result of the comparison thereof, the communication unit 181 determines whether or not the gamut of the output device 103 (output gamut) is "completely" smaller than the gamut of the temporary compression data (image data gamut).

Now, the gamut being "completely" small means that the output gamut for all of the hues is included within the image data gamut. In the case determination is made in step S249 that the output gamut includes regions outside of the image data gamut, and is not "completely" small, the flow is advanced to step S250. In step S250, the restoration processing unit 183 performs restoration processing, using the restoration metadata as to the temporary compression data.

Upon restoration processing ending, the flow is advanced to step S251. Also, in the case determination is made in step S249 that the output gamut is "completely" smaller than the image data gamut, the processing in step S250 is skipped, and the flow is advanced to step S251.

In step S251, the gamut conversion processing unit 184 performs main compression using gamut metadata as to the image data (temporary compression data or image data subjected to restoration processing), and supplies the obtained main compression data to the output unit 185. Upon the processing in step S251 ending, the restoration conversion control processing is ended, the flow is returned to step S213 in FIG. 10, and the processing in step S213 and thereafter is performed.

Figure 10:
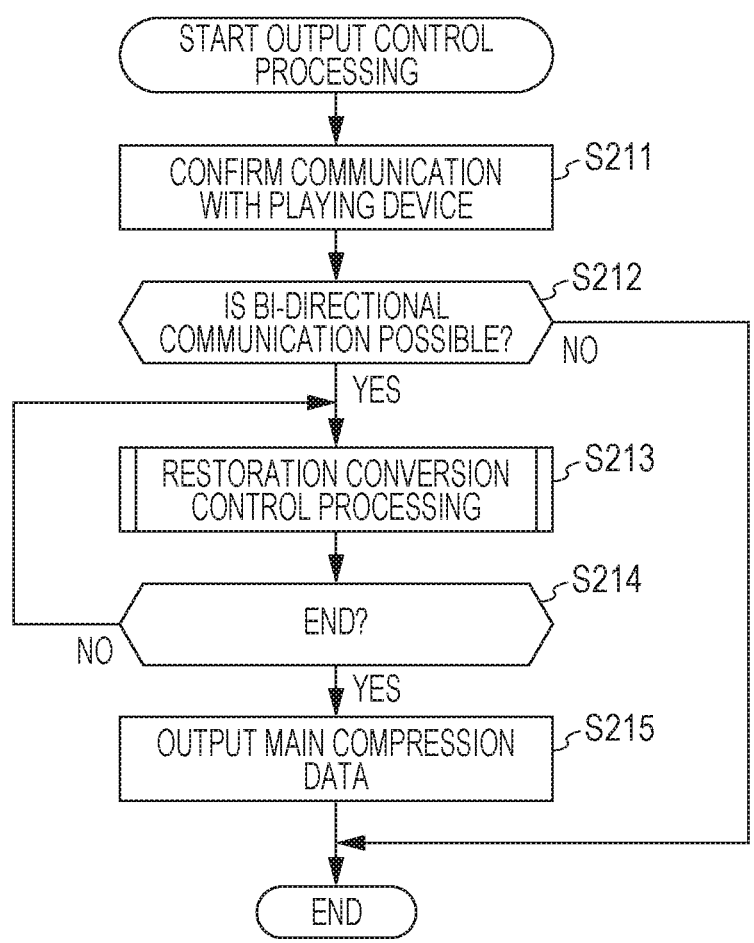
FIG. 10 is a flowchart describing an example of the flow of output control processing.
Figure 11:
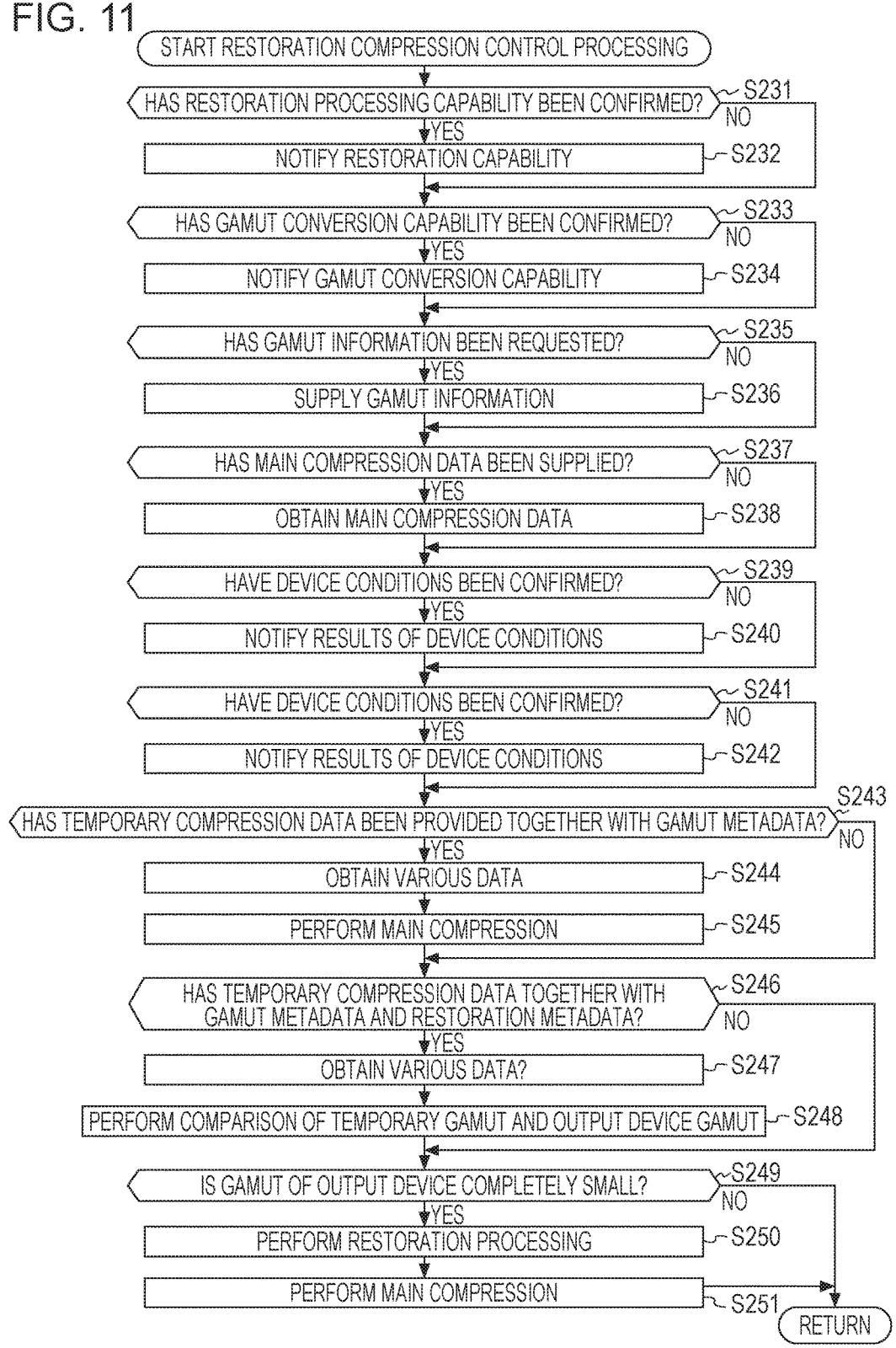
FIG. 11 is a flowchart describing an example of the flow of restoration conversion control processing.

Also, in step S246 in FIG. 11, in the case determination is made that the temporary compression data, gamut metadata, and restoration metadata are not supplied, the various processing in step S247 through step S251 are skipped, the restoration conversion control processing is ended, the flow is returned to step S213 in FIG. 10, and the processing in step S214 and thereafter is performed.

As described above, by performing control of the restoration processing and gamut conversion processing according to various conditions, even in a case of handling content with multiple devices, the playing device 102 and output device 103 can suppress unnecessary execution of restoration processing and gamut conversion processing, and execution of restoration processing and gamut conversion processing by inefficient methods, and can perform restoration and gamut conversion of content more reliably and properly.

2. Second Embodiment

[Device Configuration]

Note that according to the first embodiment, for control of the restoration processing and gamut conversion processing with the playing device 102 and output device 103, description is given such as the playing device 102 takes the lead to perform control, but should not be limited to this, and the output device 103 can have the lead for control.

According to a second embodiment, description will be made of a case that the output device 103 has the lead for control. In this case, as opposed to the case in the first embodiment, the output device 103 performs a request as to the playing device 102, and the playing device 102 responds to the request from the output device 103. That is to say, basically, each configuration and processing content of the playing device 102 and output device 103 of the first embodiment are mutually switched.

Figure 12:
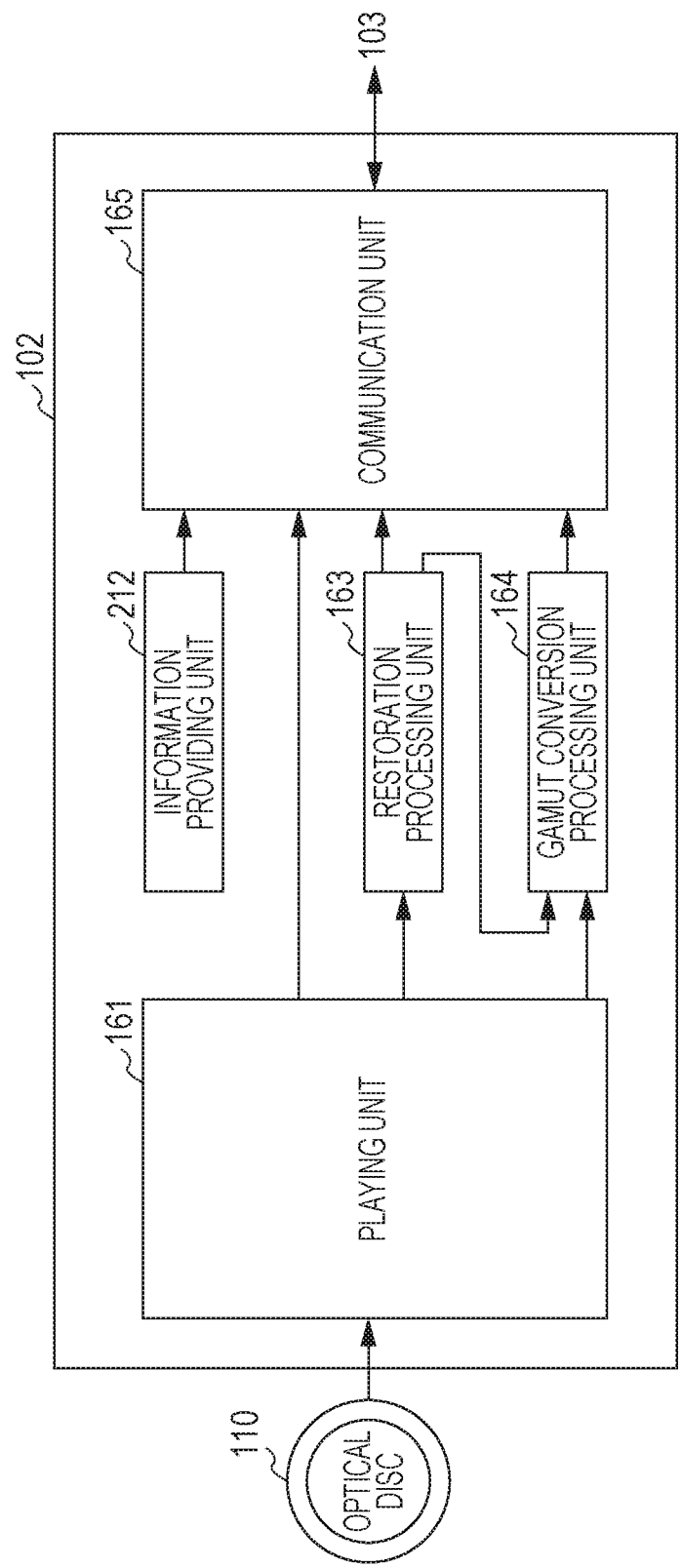
FIG. 12 is a block diagram illustrating another configuration example of the playing device in FIG. 2.

FIG. 12 is a block diagram showing a configuration example of the playing device 102 in this case. As shown in FIG. 12, in this case, the playing device 102 has an information providing unit 212 instead of the restoration gamut conversion control unit 162. The information providing unit 212 is similar to the information providing unit 182 of the output device 103 in FIG. 5 and has information relating to the playing device 102, and supplies information relating to the playing device 102 to the partner device (in this case, the output device) via the communication unit 165, based on the request from the output device 103.

Figure 13:
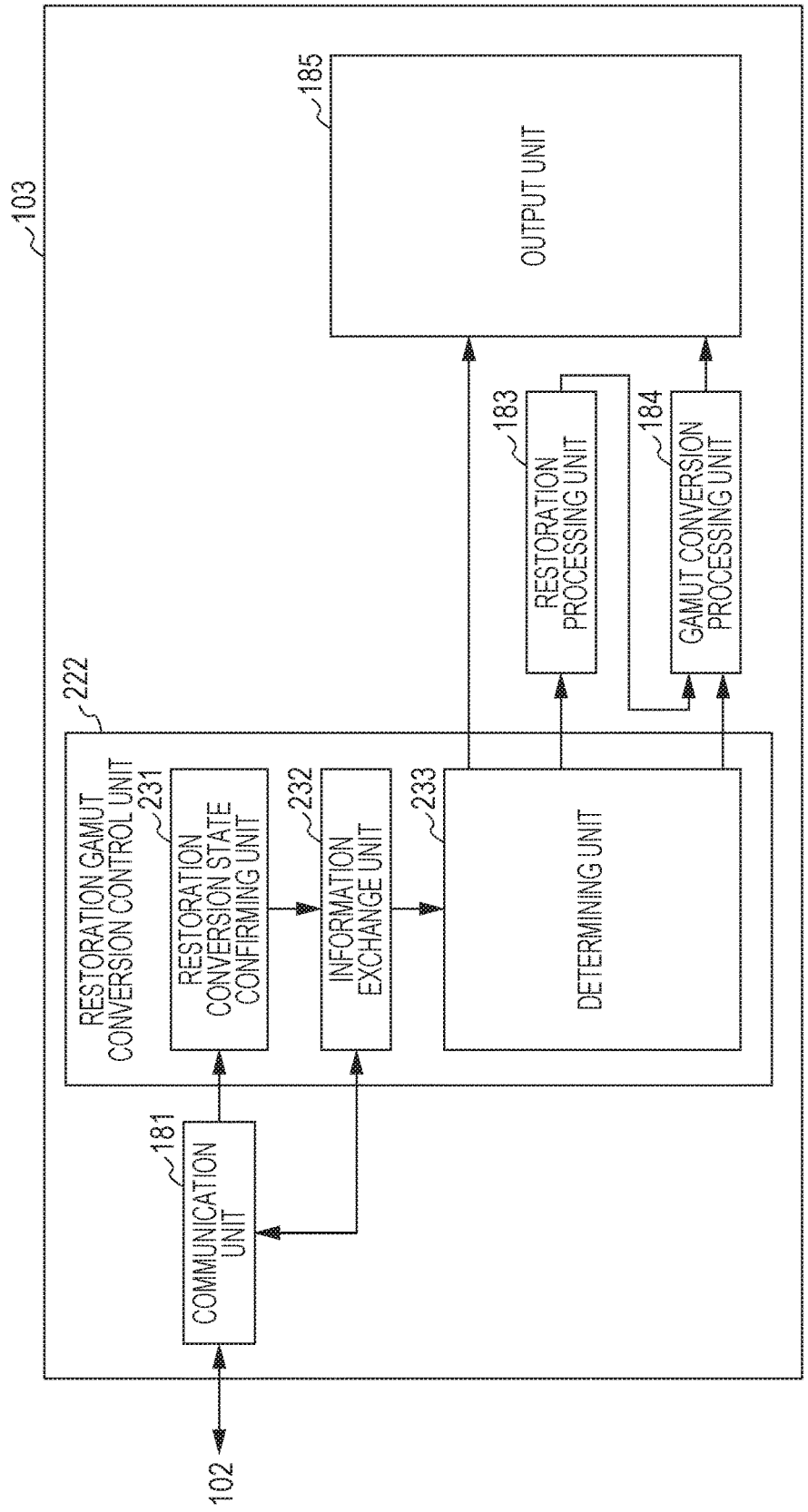
FIG. 13 is a block diagram illustrating another configuration of the output device in FIG. 2.

FIG. 13 is a block diagram showing a configuration example of the output device 103 in this case. As shown in FIG. 13, in this case the output device 103 has a restoration gamut conversion control unit 222 instead of the information providing unit 182 in FIG. 5. The restoration gamut conversion control unit 222 performs control processing of the restoration processing and gamut conversion processing, similar to the restoration gamut conversion control unit 162 in FIG. 4. However, the restoration gamut conversion control unit 222 performs control processing of the restoration processing and gamut conversion processing from the output device 103 side. The restoration gamut conversion control unit 222 has a restoration conversion state confirming unit 231, information exchange unit 232, and determining unit 233. These correspond respectively to the restoration conversion state confirming unit 171, information exchange unit 172, and determining unit 173 in FIG. 4. Other than whether or not the device itself if the playing device 102 or the output device 103 is basically the same.

[Flow of Processing of Output Device]

Figure 8:
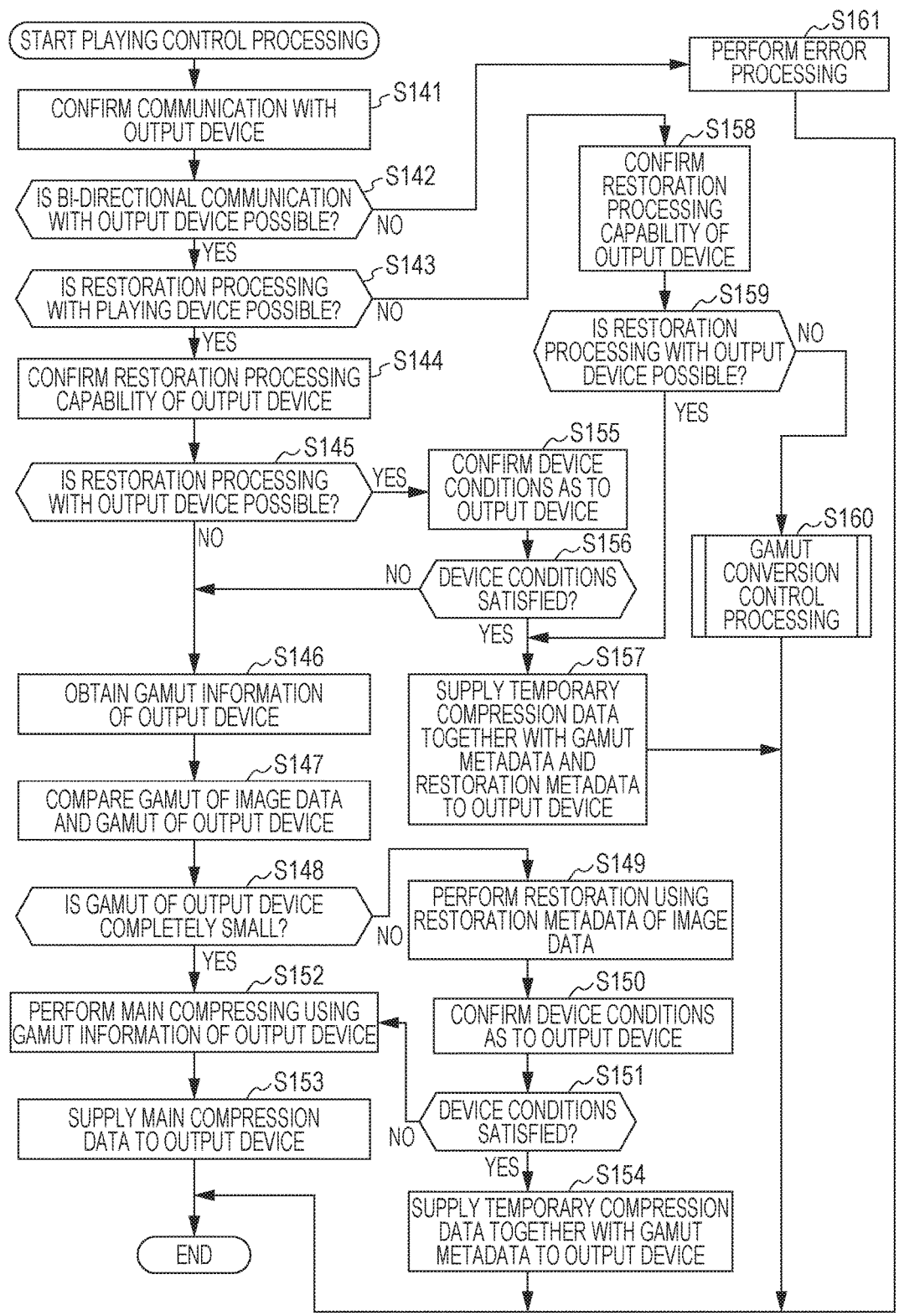
FIG. 8 is a flowchart describing an example of the flow of playing control processing.
Figure 9:
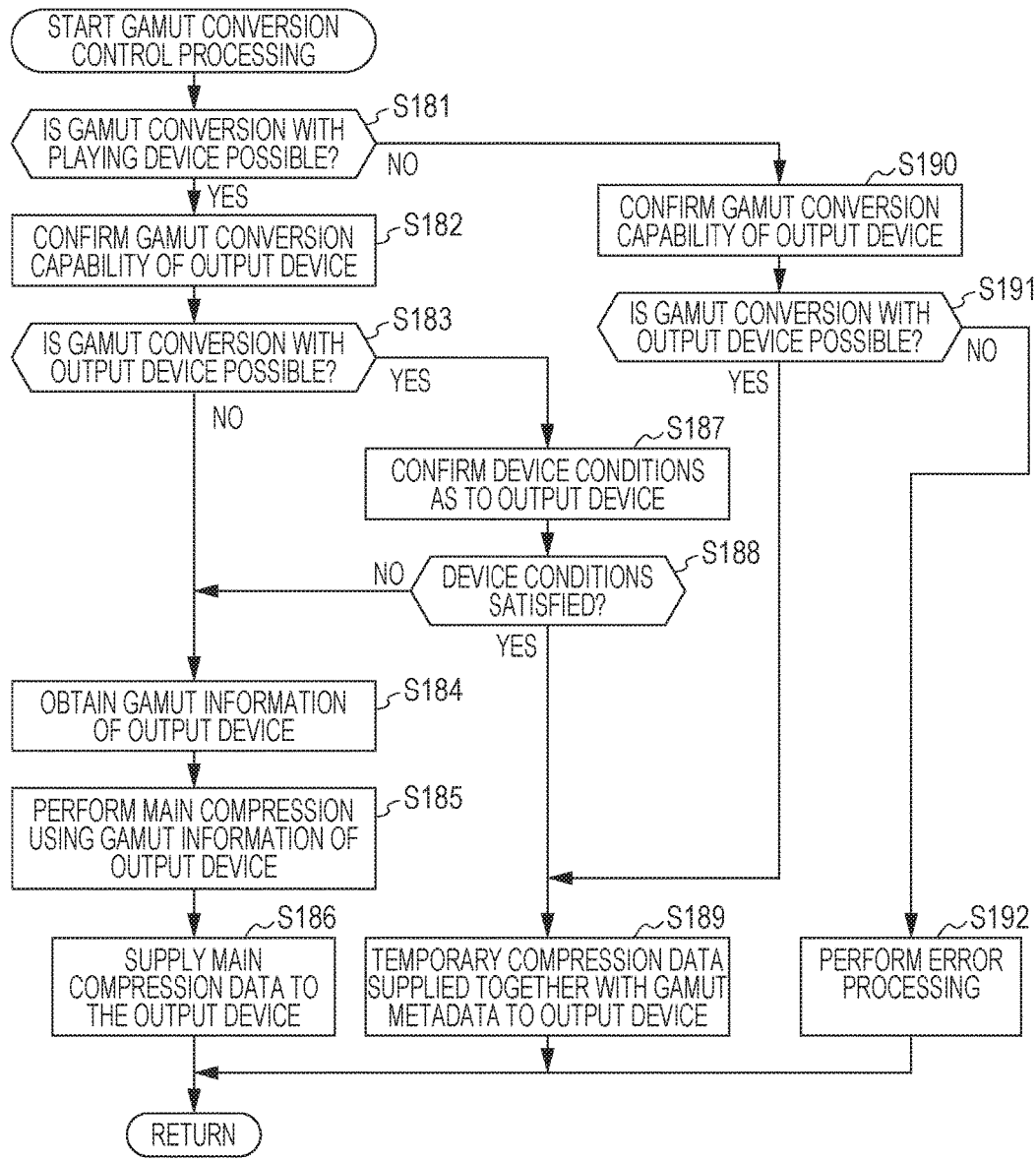
FIG. 9 is a flowchart describing an example of the flow of gamut conversion control processing.

In this case, the output device 103 executes output control processing that is basically similar to the playing control processing executed by the playing device 102 in the first embodiment (FIG. 8).

An example of flow of the output control processing executed by the output device 103 will be described with reference to the flowchart in FIG. 14.

Upon output control processing starting, in step S301 the information exchange unit 232 confirms communication with the playing device 102, and in step S302 determines whether or not bi-directional communication with the playing device 102 is possible. In the case determination is made that bi-directional communication is possible, the flow is advanced to step S303.

In step S303, the information exchange unit 232 performs an inquiry to the playing device 102 about restoration processing functionality, confirms the restoration processing capability of the playing device 102, and in step S304 determines whether or not restoration processing can be executed with the playing device 102. In the case that the playing device 102 has a restoration processing unit 163 and determination is made that restoration processing can be executed with the playing device 102, the flow is advanced to step S305.

In step S305 the determining unit 233 determines whether or not restoration processing can be executed with the output device 103, i.e. whether or not the output device 103 has a restoration processing unit 183 and a gamut conversion processing unit 184. In the case determination is made that the output device 103 cannot execute restoration processing, the flow is advanced to step S306.

In step S306, the information exchange unit 232 accesses the playing device 102, and supplies gamut information of the output device to the playing device 102. In step S307, the information exchange unit 232 accesses the playing device 102, and causes the playing device 102 to execute a comparison (gamut comparison) of the gamut of the image data read out from the optical disc 110 (image data gamut) and the gamut of the output device 103 (output gamut).

In step S308 the determining unit 233 obtains the comparison results thereof, and determines whether or not the output gamut is "completely" small as to the image data gamut. In the case that a portion outside of the image data gamut is included in the output gamut, and the output gamut is not "completely" small as to the image data gamut, the flow is advanced to step S309.

In step S309, the information exchange unit 232 access the playing device 102, causes the playing device 102 to perform restoration processing using the restoration metadata attached to the image data, and restores the gamut before gamut conversion of the image data.

That is to say, in this case, restoration processing cannot be performed with the output device 103 (the output device 103 does not have restoration processing functionality), and restoration processing is needed (portions outside of the image data gamut are included in the output gamut), so the output device 103 causes the playing device 102 to execute restoration processing.

Upon the restoration processing ending, in step S310 the information exchange unit 232 access the playing device 102, and performs confirmation of the device conditions for gamut conversion processing to the playing device 102. Based on the confirmation results thereof, the determining unit 233 determines in step S311 whether or not the playing device 102 satisfies the device conditions.

The device conditions for the gamut conversion processing is similar to the case of the first embodiment, so the description thereof will be omitted.

In the case determination is made that the device conditions for the gamut conversion processing do not hold, the flow is advanced to step S312. That is to say, for example, in the case that the manufacturing source of the playing device 102 and output device 103 mutually differ, or the version of gamut conversion algorithm is higher for the playing device 102, the flow is advanced to step S312.

In step S312, the information exchange unit 232 access the playing device 102, and causes the playing device 102 to execute main compression. In step S313 the communication unit 165 obtains the main compression data generated in step S312 from the playing device 102. Upon obtaining the main compression data, the flow is advanced to step S322.

Also, in the case determination is made in step S311 that the device conditions for the gamut conversion processing holds, the flow is advanced to step S314. That is to say, for example, in the case that the manufacturing source for the playing device 102 and output device 103 are the same, or the version of the gamut conversion algorithm is higher for the output device 103, the flow is advanced to step S314.

In step S314 the communication unit 181 obtains the image data subjected to restoration processing (restored data) and the gamut metadata thereof from the playing device 102. Upon obtaining the restored data, the flow is advanced to step S321.

That is to say, in this case, it is more desirable for the gamut conversion processing to be executed with the output device 103, so the output device 103 obtains the image data of which the gamut has been restored from the playing device 102.

Also, in the case determination is made in step S308 that the gamut of the output device 103 is completely small, the flow is advanced to step S312. That is to say, in this case, restoration processing is unnecessary, so the processing in step S309 and so forth is skipped, and the flow is advanced to step S312. That is to say, main compression is performed with the playing device 102.

In the case determination is made in step S305 that the output device 103 can execute the restoration processing, the flow is advanced to step S315. In step S315 the information exchange unit 232 exchanges information with the playing device 102, and confirms the device conditions for the restoration processing as to the playing device 102. Based on the confirmation results thereof, the determining unit 233 determines in step S316 whether or not the playing device 102 satisfies the device conditions.

The device conditions for the restoration processing are similar to the case of the first embodiment, so the description thereof will be omitted.

In the case determination is made in step S316 that device conditions for the restoration processing as described above do not hold, the flow is returned to step S306. That is to say, for example, in the case that the manufacturing source of the playing device 102 and output device 103 mutually differ, or the version of restoration algorithm is higher for the playing device 102, the flow is returned to step S306. In this case, control is performed such that, when restoration processing is necessary, this is executed by the playing device 102.

Also, in the case determination is made in step S316 that device conditions for the restoration processing hold, the flow is advanced to step S317. That is to say, for example, in the case that the manufacturing source for the playing device 102 and output device 103 are the same, or the version of the restoration algorithm is higher for the output device 103, the flow is advanced to step S317.

In step s317 the communication unit 181 obtains the temporary compression data, together with the gamut metadata and restoration metadata, from the playing device 102. Upon the temporary compression data being obtained, the flow is advanced to step S318.

In step S318, the determining unit 233 performs a gamut comparison of the image data gamut and output gamut. In step s319 the determining unit 233 determines whether or not the gamut of the output device 103 (output gamut) is completely small as to the image data gamut.

In the case determination is made that the output gamut includes a region outside of the image data gamut, and is not completely small, the flow is advanced to step S320. In step S320 the restoration processing unit 183 executes restoration processing using restoration metadata, and restores the gamut of the temporary compression data to before gamut conversion. Upon the gamut being restored, the flow is advanced to step S321.

Also, in step S319, in the case determination is made that the output gamut is included in the image data gamut for all of the hues and is completely small, the flow is advanced to step S321 without performing restoration processing.

That is to say, in this case, control is performed such that, when restoration processing is necessary, this is executed by the output device 103.

In step S321 the gamut conversion processing unit 184 subject the gamut of the image data (temporary compression data or image data of which the gamut has been restored) is subjected to main compression to the output gamut. Upon main compression ending, the flow is advanced to step S322.

In step S322, the output unit 185 outputs the main compression data, and ends the output control processing.

Also, in step S304, in the case determination is made that restoration processing by the playing device 102 is impossible, the flow is advanced to step S323. The determining unit 233 determines in step S323 whether or not the output device 103 can execute the restoration processing.

In the case determination is made that restoration processing can be executed with the output device 103, the flow is returned to step S317. That is to say, in this case, execution of restoration processing with the playing device 102 is impossible, and execution of restoration processing is possible with the output device 103, so control is performed such that the restoration processing is performed with the output device 103.

Also, in the case determination is made in step S323 that execution of restoration processing by the output device 103 is impossible, the flow is advanced to step S324.

In step S324, the various units of the output device 103 executes the gamut conversion control processing that controls the processing relating to gamut conversion. That is to say, in this case, restoration processing cannot be performed with either the playing device 102 or the output device 103. Thus, the various units of the output device 103 execute the gamut conversion control processing so that at least gamut conversion processing can be performed. Details of this gamut conversion processing will be described later.

Upon gamut conversion processing ending, the output control processing is ended.

Also, in the case determination is made in step S302 that bi-directional communication cannot be performed with the playing device 102, the flow is advanced to step S325. In step S325, the restoration gamut conversion control unit 222 causes the various units to execute error processing, and ends the output control processing. That is to say, in this case, bi-directional communication cannot be performed between the playing device and output device (information necessary for restoration processing and gamut conversion cannot be exchanged), and the output of the image data is stopped.

Next, an example of flow of gamut conversion control processing that is executed in step S324 in FIG. 14 will be described with reference to the flowchart in FIG. 15.

Upon the gamut conversion control processing starting, in step S341 the information exchange unit 232 inquires with the playing device 102 via the communication unit 181, and confirms the gamut conversion capability of the playing device 102. In step S342 the determining unit 233 determines whether or not gamut conversion is possible with the playing device 102, i.e. whether or not the playing device 102 has a gamut conversion processing unit 164, based on the confirmation results thereof. In the case determination is made that gamut conversion is possible, the flow is advanced to step S343.

In step S343, the determining unit 233 determines whether or not gamut conversion is possible with the output device 103. In the case determination is made that gamut conversion is impossible, the flow is advanced to step S344.

In step S344 the information exchange unit 232 transmits gamut information of the output device 103 to the playing device 102, via the communication unit 181. In step S345 the information exchange unit 232 accesses the playing device 102 and causes the playing device 102 to execute main compression. In step S346 the communication unit 181 obtains the main compression data obtained with the playing device 102. Upon obtaining the main compression data, the flow is advanced to step S351.

Also, in the even determination is made in step S343 that gamut conversion can be executed with the output device 103, the flow is advanced to step S347. In step S347 the information exchange unit 232 exchanges information with the playing device 102, and confirms the device conditions for gamut conversion processing. The device conditions are similar to the device conditions described above, so the description thereof will be omitted. In step S348 the determining unit 233 determines whether or not the device conditions hold.

In the case determination is made that the device conditions for the gamut conversion processing do not hold, the flow is returned to step S344. That is to say, for example, in the case that the manufacturing source for the playing device 102 and output device 103 mutually differ, or the version of the gamut conversion algorithm is higher for the playing device 102, the flow is returned to step S344.

In this case, gamut conversion can be performed by both the playing device 102 and output device 103, but it is more desirable for the playing device 102 to perform the gamut conversion, so controls are performed such that gamut conversion is performed by the playing device 102.

Also, in the case determination is made in step S348 that the device conditions for the gamut conversion processing hold, the flow is advanced to step S349. That is to say, for example, in the case that the manufacturing source for the playing device 102 and output device 103 are mutually the same, or the version of the gamut conversion algorithm is higher for the output device 103, the flow is advanced to step S349.

In this case, gamut conversion can be performed by both the playing device 102 and output device 103, but it is more desirable for the output device 103 to perform the gamut conversion, so controls are performed such that gamut conversion is performed by the output device 103.

In step S349, the communication unit 181 obtains temporary compression data, together with the gamut metadata, from the playing device 102. In step S350, the gamut conversion processing unit 184 uses the gamut metadata to subject the gamut of the obtained temporary compression data to the output gamut. Upon main compression ending, the flow is advanced to step S351.

Figure 14:
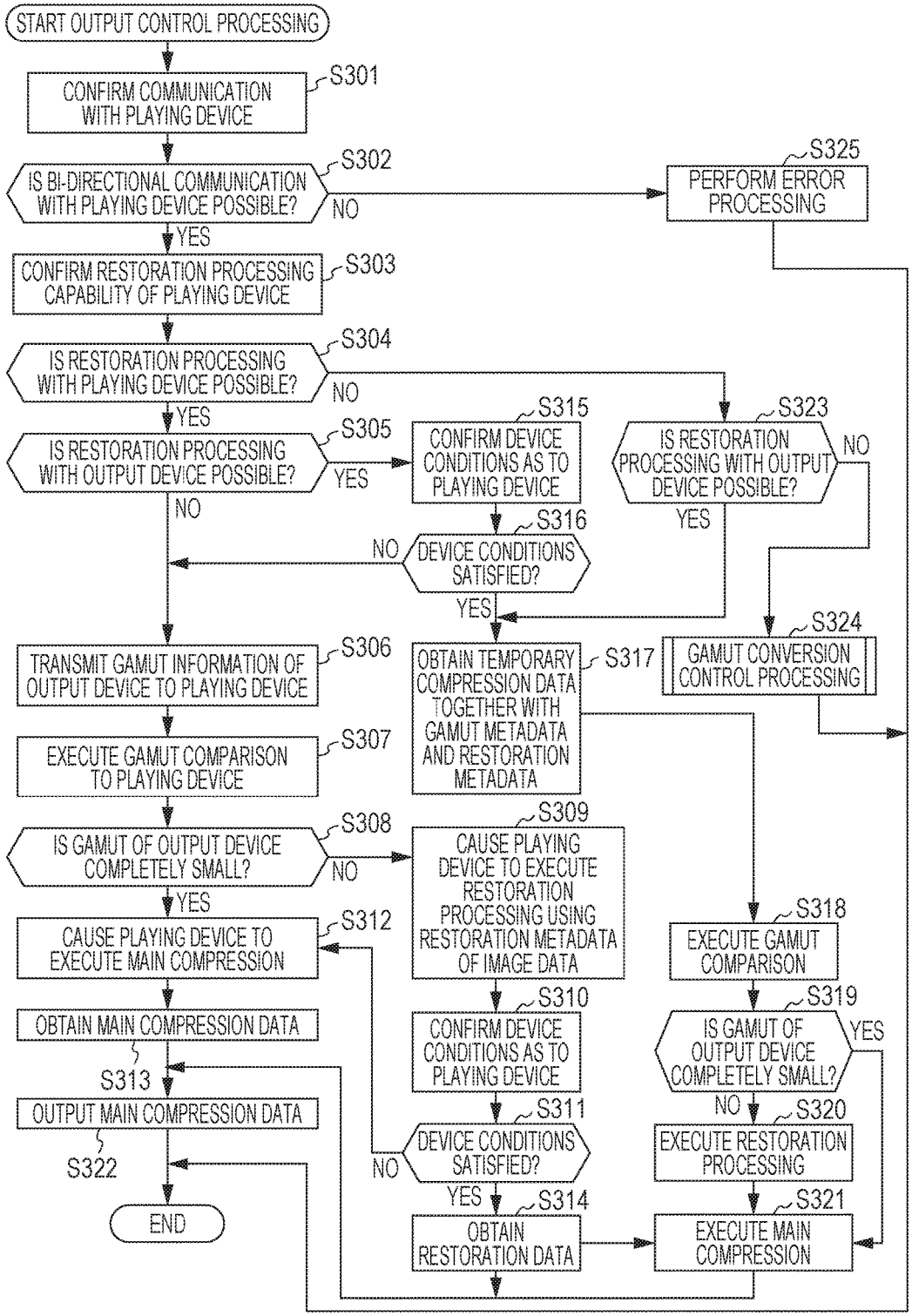
FIG. 14 is a flowchart describing another example of the flow of output control processing.
Figure 15:
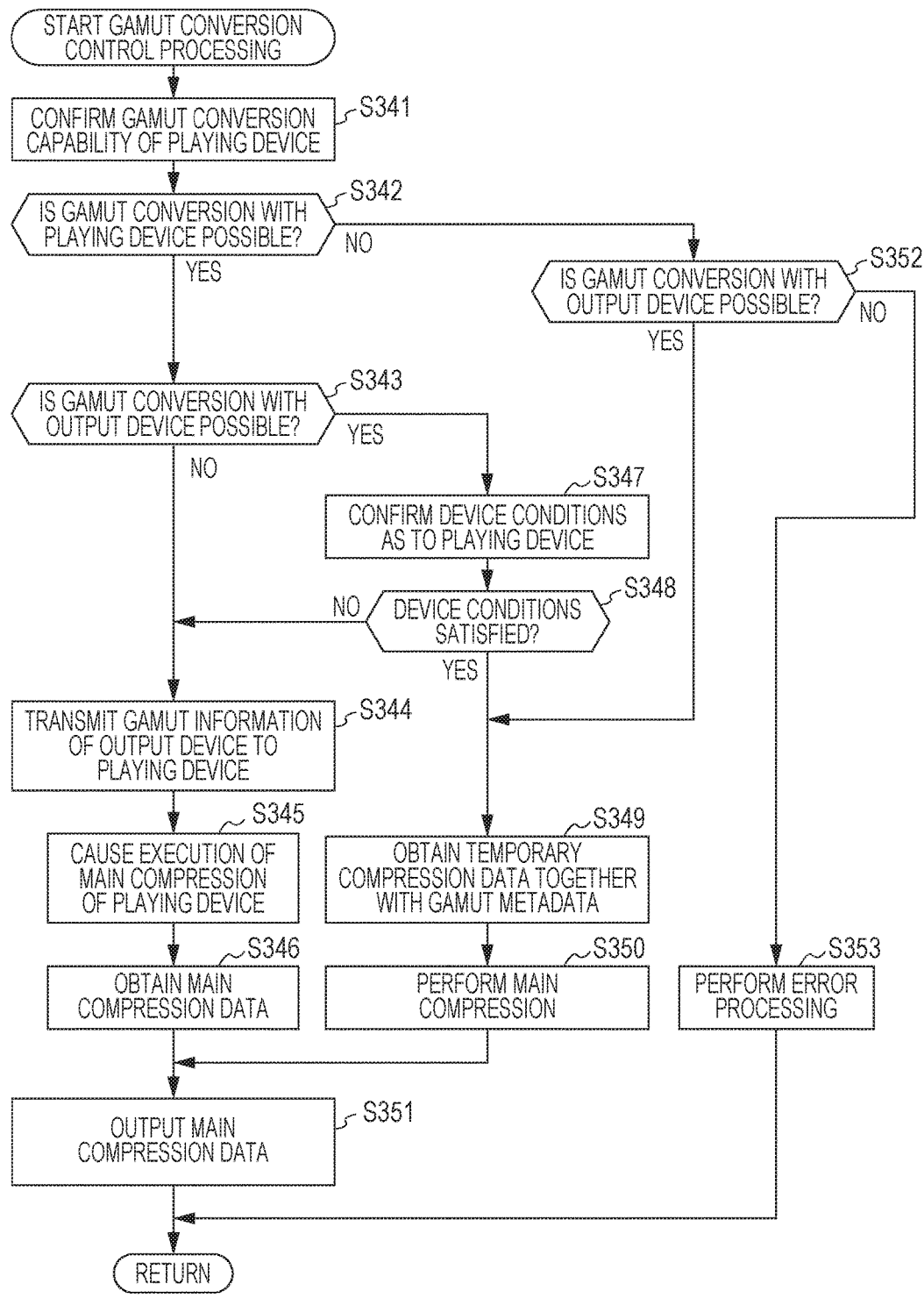
FIG. 15 is a flowchart describing another example of the flow of gamut conversion control processing.

In step S351 the output unit 185 outputs the main compression data, ends the gamut conversion control processing, returns to step S324 in FIG. 14, and ends the output control processing.

Also, in the case determination is made in step S342 that execution of gamut conversion by the playing device 102 is impossible, the flow is advanced to step S352. In step S352 the determining unit 233 determines whether or not gamut conversion can be executed with the output device 103. In the case determination is made that gamut conversion with the output device 103 is possible, the flow is returned to step S349. In this case, controls are performed so that main compression is performed with the output device 103.

In the case determination is made in step S352 that the output device 103 also cannot perform gamut conversion, the flow is advanced to step S353. In step S353 the restoration gamut conversion control unit 222 causes the various units to execute error processing, ends the gamut conversion control processing, returns to step S324 in FIG. 14, and ends the output control processing. That is to say, in this case, since neither the playing device 102 nor output device 103 can perform gamut conversion, output of the image data is stopped.

By executing processing such as described above, the output device 103 controls the restoration processing and gamut conversion processing.

[Flow of Processing of Playing Device]

Next, processing to be executed with the playing device 102 will be described. The playing device 102 executes playing control processing as to the control processing of the output device 103 described above, and responds to requests from the output device 103. An example of flow of the playing control processing will be described with reference to the flowchart in FIG. 16.

Upon the playing control processing starting, in step S371 the communication unit 165 confirms communication with the output device 103, and in step S372 determines whether or not bi-directional communication is possible. In the case determination is made that bi-directional communication is possible, the flow is advanced to step S373.

In step S373 the various units of the playing device 102 execute restoration conversion control processing to link with the output device 103 and execute restoration conversion control processing to properly control the execution of the restoration processing and gamut conversion processing. Details of the restoration conversion control processing will be described later.

In step S374 the information providing unit 212 determines whether to end the playing control processing. Until the playing control processing is ended in this step S374, the restoration conversion control processing in step S373 is repeatedly executed.

In the case determination is made in step S374 to end the playing control processing, the output control processing is ended. Also, in the case that bi-directional communication is impossible, output of the image data is stopped, so in the case determination is made in step S372 that bi-directional communication is impossible, the restoration conversion control processing is omitted and the output control processing is ended.

Next, a detailed example of flow of the restoration conversion control processing executed in step S373 in FIG. 16 will be described with reference to the flowchart in FIG. 17.

Upon restoration conversion control processing starting, the information providing unit 212 determines in step S391 whether restoration processing capability has been confirmed from the output device 103. In the case determination is made that restoration processing capability is confirmed via the communication unit 165, the flow is advanced to step S392. In step S392, the information providing unit 212 notifies the restoration processing capability of the playing device 102 to the output device 103, via the communication unit 165.

Upon notification ending, the flow is advanced to step S393. Also, in the case determination is made in step S391 that restoration processing capability has not been confirmed, the processing in step S392 is skipped, and the flow is advanced to step S393.

In step S393 the information providing unit 212 determines whether or not gamut conversion capability has been confirmed from the output device 103. In the case determination is made that gamut conversion capability has been confirmed via the communication unit 165, the flow is advanced to step S394. In step S394, the information providing unit 212 notifies the gamut conversion capability of the playing device 102 to the output device 103, via the communication unit 165.

Upon notification ending, the flow is advanced to step S395. Also, in the case determination is made in step S393 that gamut conversion capability has not been confirmed, the processing in step S394 is skipped, and the flow is advanced to step S395.

In step S395 the information providing unit 212 determines whether or not the device conditions for the restoration processing have been confirmed form the output device 103. An example of a device condition for restoration processing is as described above.

In the case determination is made that device conditions for the restoration processing have been confirmed via the communication unit 165, the flow is advanced to step S396. In step S396 the information providing unit 212 notifies the confirmation results of the device conditions for restoration processing of the playing device 102 to the output device 103, via the communication unit 165.

Upon ending the notification, the flow is advanced to step S397. Also, in the case determination is made in step S395 that the device conditions for the restoration processing have not been confirmed, the processing in step S396 is skipped, and the flow is advanced to step S397.

In step S397 the information providing unit 212 determines whether or not the device conditions for the gamut conversion processing have been confirmed from the output device 103. An example of a device condition for gamut conversion processing is as described above.

In the case determination is made that device conditions for the gamut conversion processing have been confirmed via the communication unit 165, the flow is advanced to step S398. In step S398 the information providing unit 212 notifies the output device 103 of the confirmation results of the device conditions for gamut conversion processing of the playing device 102.

Upon the notification ending, the flow is advanced to step S399. Also, in the case determination is made in step S397 that device conditions for the gamut conversion processing have not been confirmed, the processing in step S398 is skipped, and the flow is advanced to step S399.

In step S399, the information providing unit 212 determines whether or not a gamut comparison has been requested by the output device 103 via the communication unit 165. In the case determination is made that a gamut comparison has been requested, the flow is advanced to step S400. In step S400 the information providing unit 212 obtains the gamut information of the output device via the communication unit 165, uses the gamut information thereof to perform a comparison of the image data gamut and output gamut, and notifies the comparison results thereof to the output device 103 via the communication unit 165.

Upon the notification ending, the flow is advanced to step S401. Also, in the case determination is made in step S399 that a gamut comparison has not been requested from the output device 103, the processing in step S400 is skipped, and the flow is advanced to step S401.

In step S401 the information providing unit 212 determines whether or not restoration processing has been requested from the output device 103 via the communication unit 165. In the case determination is made that restoration processing has been requested, the flow is advanced to step S402. In step S402 the information providing unit 212 causes the restoration processing unit 163 to perform restoration processing of the temporary compression data, and supplies the restored data obtained by the restoration processing thereof to the output device 103.

Upon the restoration data having been supplied, the flow is advanced to step S403. Also, in the case determination is made in step S401 that restoration processing has not been requested, the processing in step S402 is skipped, and the flow is advanced to step S403.

In step S403, the information providing unit 212 determines whether or not main compression has been requested from the output device 103 via the compression unit 165. In the case determination is made that main compression has been requested, the flow is advanced to step S404. In step S404 the information providing unit 212 obtains the gamut information of the output device from the output device 103 via the communication unit 165, causes the gamut conversion processing unit 164 to perform main compression, and supplies the main compression data obtained with the main compression thereof to the output device 103.

Note that at this time, in the case that restoration processing is necessary, the information providing unit 212 causes the restoration processing unit 163 to perform restoration processing, and subsequently causes the gamut conversion processing unit 164 to perform main compression, as appropriate.

Figure 16:
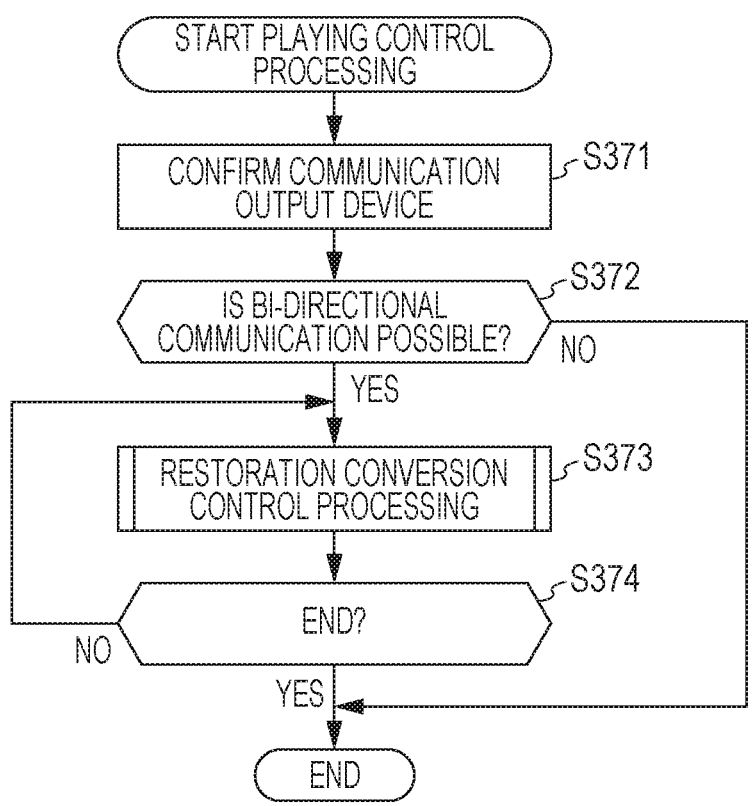
FIG. 16 is a flowchart describing another example of the flow of playing control processing.
Figure 17:
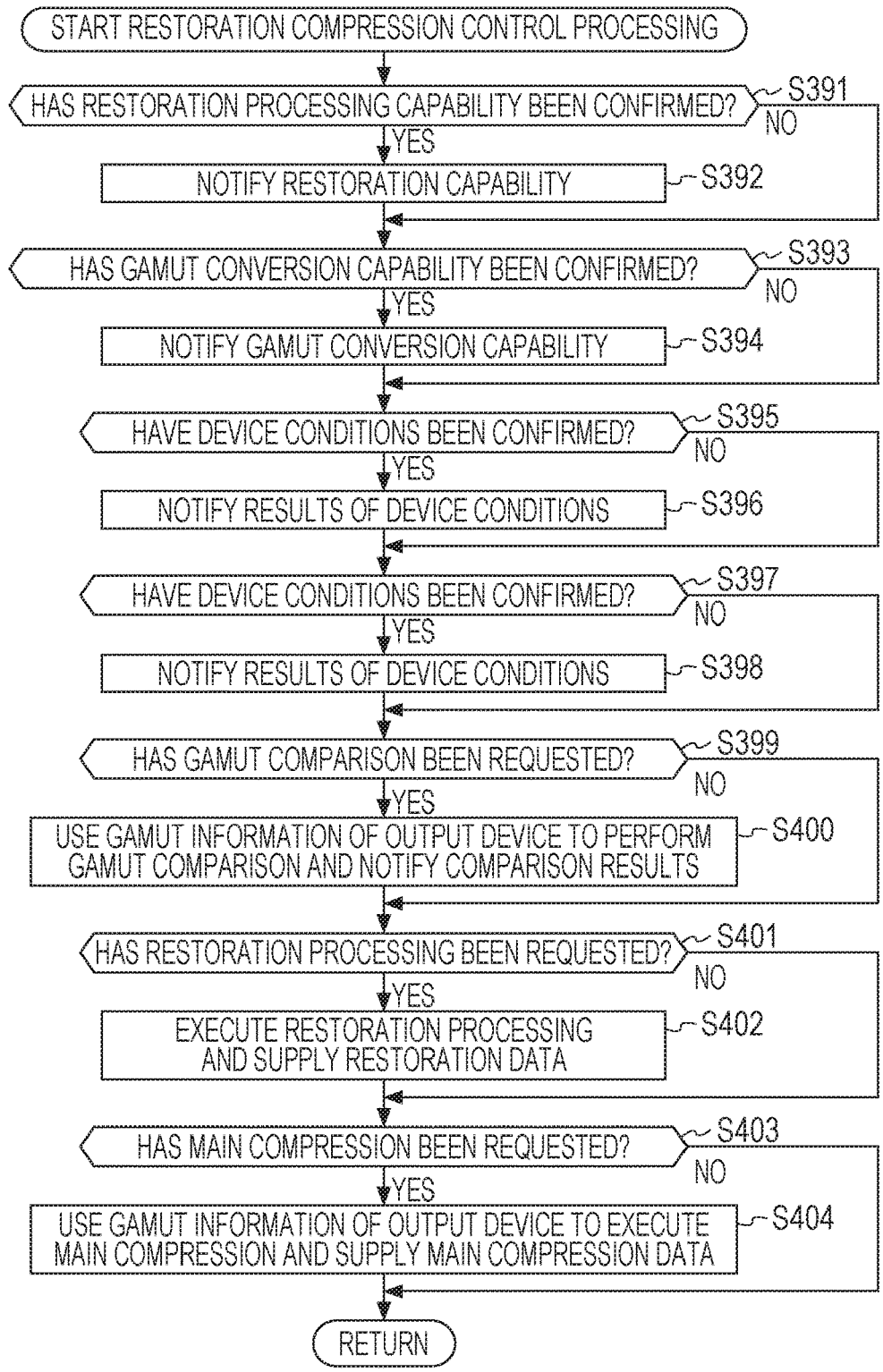
FIG. 17 is a flowchart describing another example of the flow of restoration conversion control processing.

Upon main compression data having been supplied, the restoration conversion control processing is ended, the flow is returned to step S373 in FIG. 16, and the processing in step S374 and thereafter is performed.

Also, in the case determination is made in step S403 that main compression has not be requested, the processing in step S404 is skipped, the restoration conversion control processing is ended, the flow is returned to step S373 in FIG. 16, and the processing in step S374 and thereafter is performed.

As described above, by performing control of the restoration processing and gamut conversion processing according to various conditions, even in a case of handling content with multiple devices, the playing device 102 and output device 103 can suppress unnecessary execution of restoration processing and gamut conversion processing, and execution of restoration processing and gamut conversion processing by inefficient methods, and can perform restoration and gamut conversion of content more reliably and properly.

3. Third Embodiment

[Gamut Conversion Control]

Figure 6:
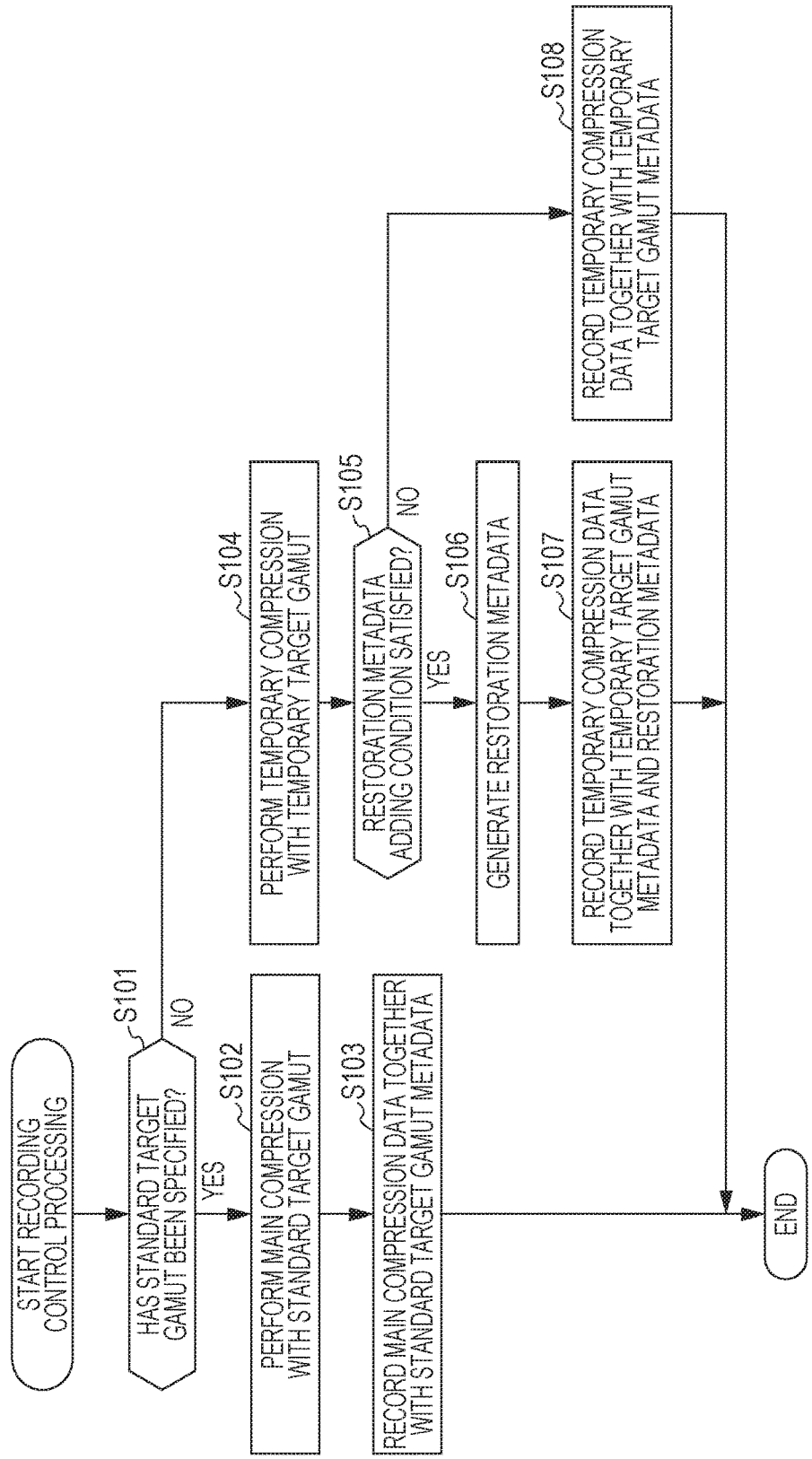
FIG. 6 is a flowchart describing an example of the flow of recording control processing.

Next, processing of the playing device 102 and output device 103 in the case that the playing data is temporary compression data and only gamut metadata is attached (i.e., in the case that the processing in step S108 is performed in the recording control processing in FIG. 6) will be described.

In this case, control relating to restoration processing is not performed, and the processing controls only the gamut compression. That is to say, as in the first embodiment, in the case that the playing device 102 has the lead, the playing device 102 executes the gamut conversion control processing described with reference to the flowchart in FIG. 9. The output control processing of the output device 103 corresponding thereto is basically similar to the case in the first embodiment. However, control relating to the restoration processing is omitted.

Also, as in the second embodiment, in the case that the output device 103 has the lead, the output device 103 executes the gamut conversion control processing described with reference to the flowchart in FIG. 15. The playing control processing of the playing device 102 corresponding thereto is basically similar to the second embodiment. Note however, control relating to the restoration processing is omitted.

As described above, by performing control of the restoration processing and gamut conversion processing according to various conditions, even in a case of handling content with multiple devices, the playing device 102 and output device 103 can suppress unnecessary execution of restoration processing and gamut conversion processing, and execution of restoration processing and gamut conversion processing by inefficient methods, and can perform restoration and gamut conversion of content more reliably and properly.

4. Fourth Embodiment

[Main Compression Data Control]

Next, processing of the playing device 102 and output device 103 in the case that the playing data is main compression data (i.e., in the case that the processing in step S103 is performed in the recording control processing in FIG. 6) will be described.

Figure 18:
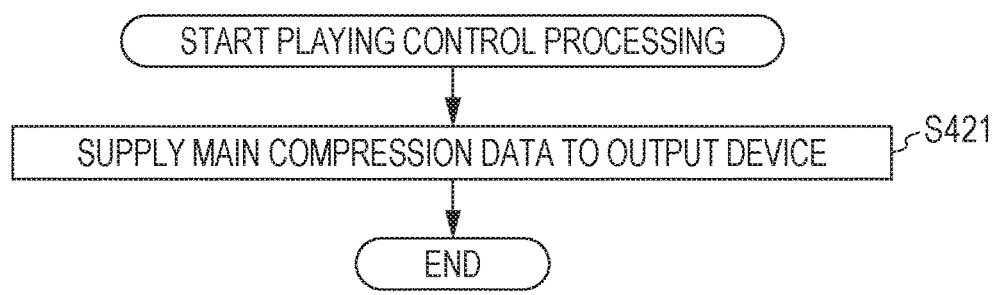
FIG. 18 is a flowchart describing yet another example of the flow of playing control processing.

An example of flow of the playing control processing in the case that the playing data is main compression data will be described with reference to the flowchart in FIG. 18.

In this case, upon the playing control processing starting, in step S421 the determining unit 173 of the playing device 102 (FIG. 4) supplies the main compression data read out from the optical disc 110 to the communication unit 165. Upon the main compression data having been transmitted, the playing control processing is ended.

Figure 19:
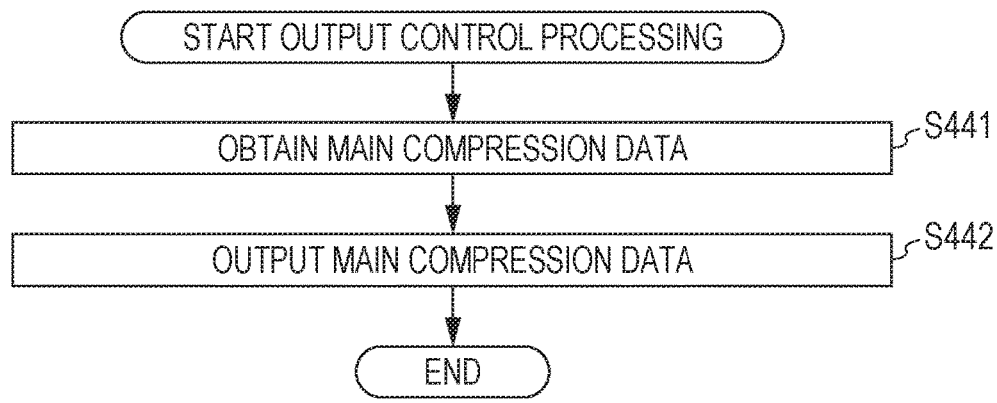
FIG. 19 is a flowchart describing yet another example of the flow of output control processing.

Next, an example of flow of the playing control processing in the case that the output data is main compression data will be described with reference to the flowchart in FIG. 19.

In this case, upon the output control processing having started, in step S441 the communication unit 181 of the output device 103 (FIG. 5) obtains the main compression data supplied from the playing device 102. The communication unit 181 supplies the obtained main compression data to the output unit 185. In step S442 the output unit 185 outputs the main compression data thereof.

Upon the main compression data having been output, the output control processing is ended.

As described above, by performing playing control processing and output control processing, the playing device 102 and output device 103 can properly output without performing unnecessary gamut conversion processing and restoration processing and the like as to the image data subjected to main compression.

5. Fifth Embodiment

[Specific Configuration Example of Information Processing System]

Figure 20:
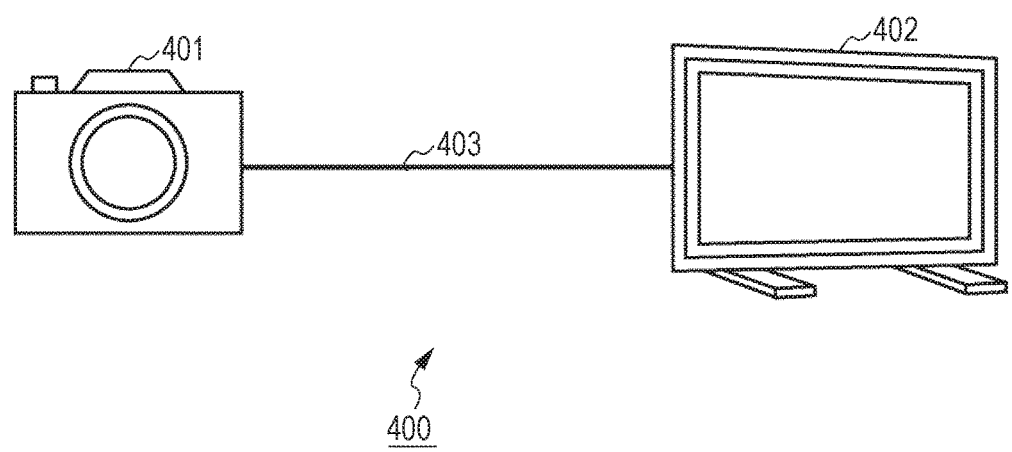
FIG. 20 is a diagram illustrating a specific example of an information processing system to which the present invention is applied.

Next, a specific example of the information processing system described above and various processes will be described. First, a specific example of a information processing system 100 will be described. FIG. 20 is a diagram showing a specific configuration example of the information processing system. An information processing system 400 shown in FIG. 20 has a monitor 402 connected to a digital still camera 401 digital still camera 401 via an HDMI (High-Definition Multimedia Interface) cable 403.

The digital still camera 401 images a subject and generates image data (content). The digital still camera 401 records the image data thereof on a recording medium such as a built-in hard disk or flash memory or the like. The digital still camera 401 further reads out and plays the image data recorded on the recording medium thereof, supplies this to the monitor 402 via the HDMI cable 403, and displays the image thereof.

In the case of this example, the digital still camera 401 corresponds to the recording device 101 and playing device 102, and the monitor 402 corresponds to the output device 103. The HDMI cable 403 is a communication bus that connects the playing device and output device, and corresponds to the optical disc 110.

That is to say, for example, the digital still camera 401 has a configuration such as shown in FIG. 3 and FIG. 4, and the monitor 402 has a configuration such as shown in FIG. 5.

The information processing system 400 performs image data gamut conversion and restoration as appropriate, as with the information processing system 100. That is to say, the digital still camera 401 and monitor 402 mutually exchange information, appropriately determine which device will perform the restoration processing and gamut conversion processing, and control the execution of the processing thereof.

[Gamut Conversion Overview]

Figure 21:
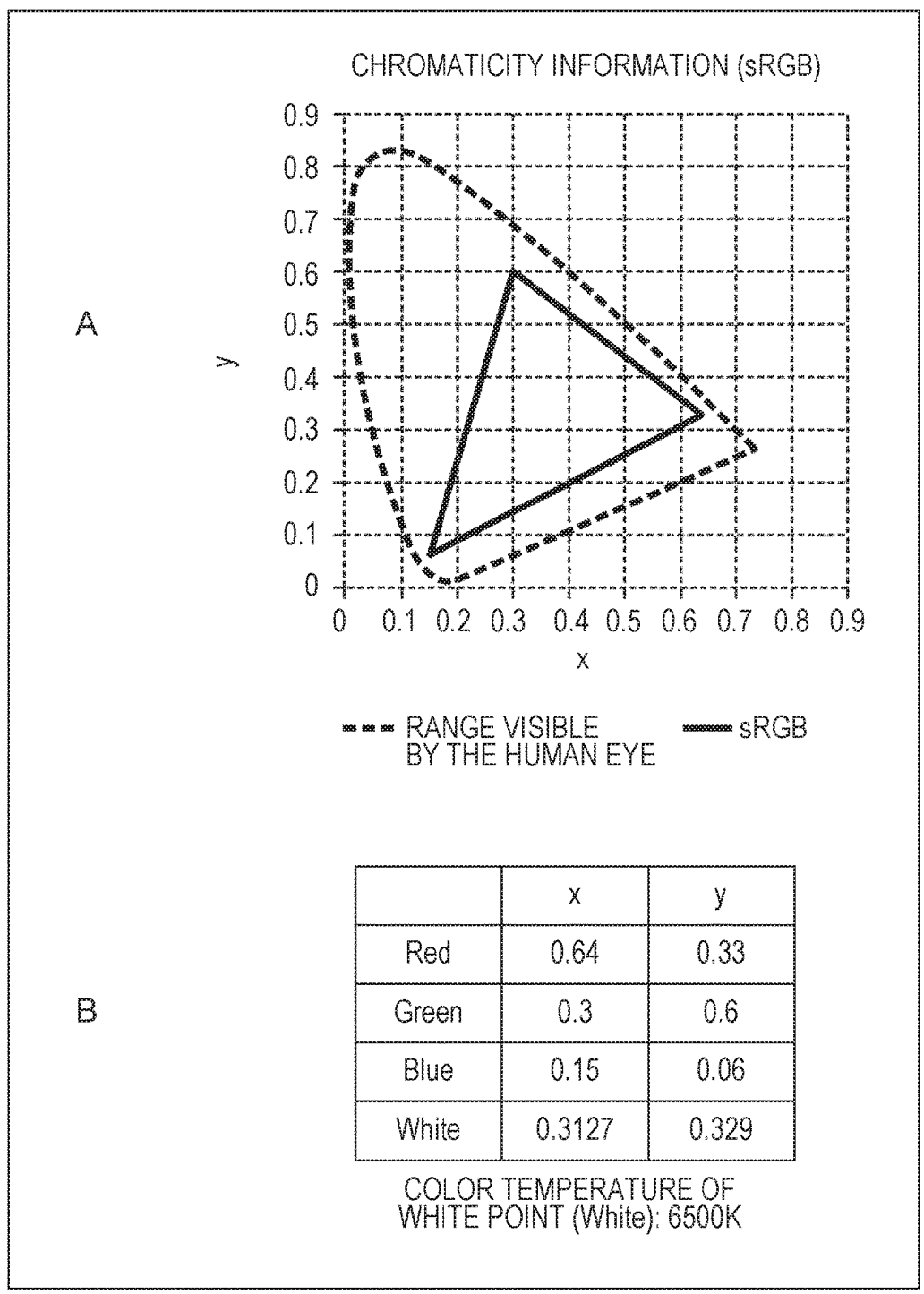
FIG. 21 is a diagram illustrating an example of a format of chromaticity information.

Next, an overview of gamut conversion will be described. FIG. 21 is a diagram showing an example of a format of chromaticity information.

Still images that are imaged with the digital still camera 401 are recorded in a saturation/color difference signal space called a sYCC color-space. sYCC is established by IEC (International Electrotechnical Commission) (International Electrotechnical Commission), and is a color-space for still image recording which is an international standards definition of IEC 61966-2-1 AMD (support documentation of sRGB). 95% or more of the colors that humans can perceive can be recorded thereby, and it has a gamut sufficient to record colors that digital still cameras for consumer use can sense. In this embodiment, recorded moving picture content becomes a still image, and recorded device gamut information becomes sYCC.

A first gamut conversion is performed at the time of hard disk recording. The temporary output device gamut of this compression is an sRGB space, and the chromaticity information thereof is as in the graph shown in FIG. 21A and in the table shown in FIG. 21B. sRGB (Standard RGB) is a color-space specified by IEC as colors for a standard display observed in a certain standard viewing environment. This is a still image recording color-space having an international standards definition of IEC 61966-2-1.

Figure 22:
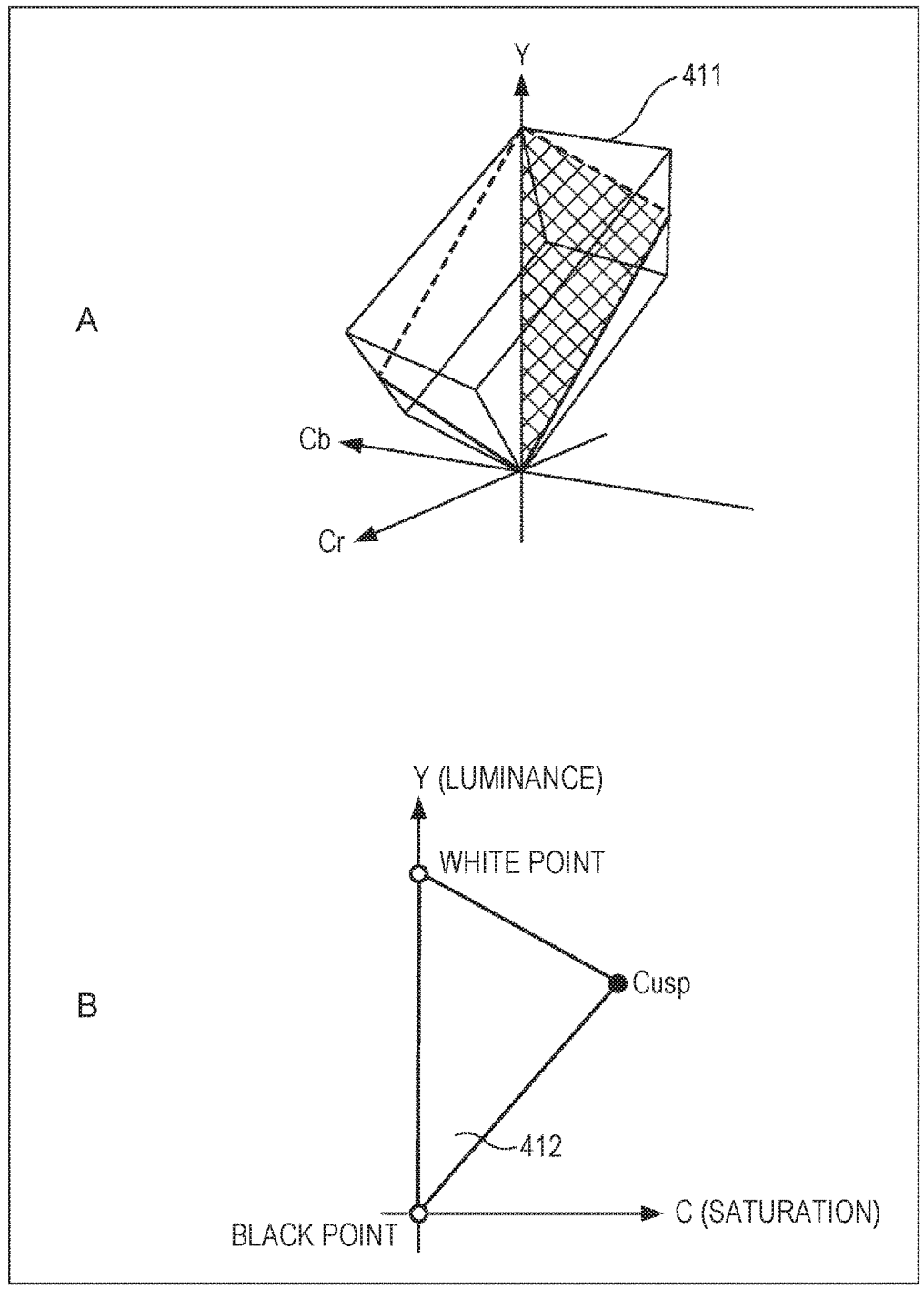
FIG. 22 is a schematic diagram illustrating an example of a gamut.

As shown in FIG. 22A, when the gamut of a certain device is expressed with the YCC (Y, Cb, Cr) space (gamut 411), a cross-sectional plane that is cross-cut with a same hue plane, as shown in FIG. 22B, can be expressed with a YC2 dimensional plane having luminance Y as the vertical axis and saturation C as the horizontal axis (gamut 412). The gamut form on this plane can be approximated with a triangle that links a white point, black point, and Cusp point, as in the gamut 412 shown in FIG. 22, if the YC coordinates of the maximum saturation points (Cusp) can be obtained. Using this nature, by holding the YC coordinates of the Cusp points (Cusp information) on several representative hue faces (H) in a numerical value table, the gamut 411 of the device can be approximately defined. A table of the YC coordinates (Cusp information) of the maximum saturation points (Cusp) of the representative hues is called a Cusp table.

Figure 23:
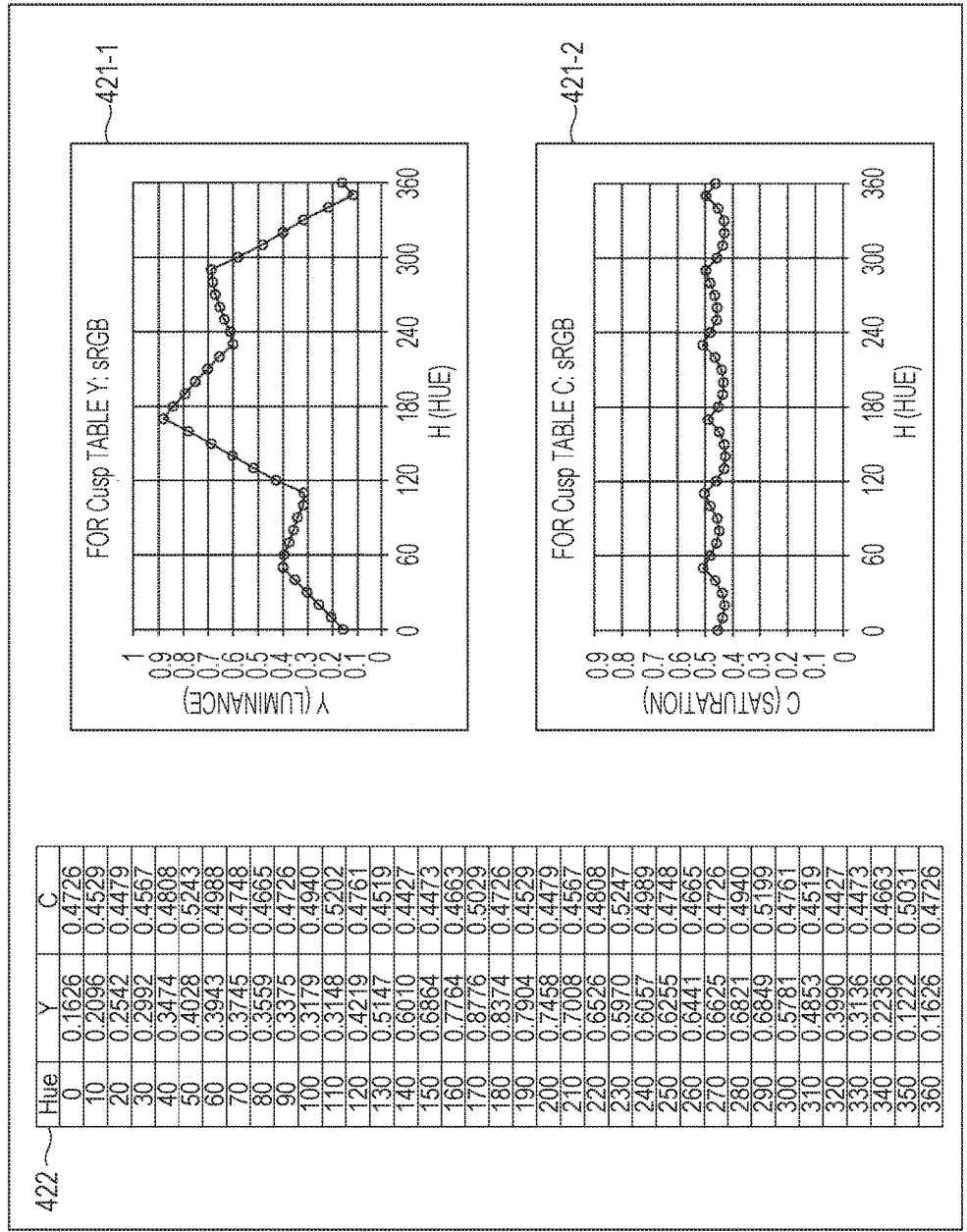
FIG. 23 is a diagram illustrating an example of a Cusp table.

FIG. 23 is a diagram showing an example of the Cusp table thereof. The Cusp table in FIG. 23 has converted the format of the chromaticity information shown in FIG. 21, and shows an sRGB color-space, similar to the chromaticity information in FIG. 21.

The graph 421-1 has graphed the luminance (Y) of the Cusp points for each hue (H). The graph 421-2 has graphed the saturation (C) of the Cusp points for each hue (H). Also, the table 422 has formed the values of the luminance (Y) and saturation (C) of representative hues (H) into a table. Performing interpolation processing using the values in the table 422 and obtaining the luminance and saturation between the representative hues (intermediate hues) can also be readily performed, whereby the graph 421-1 and graph 421-2 and table 422 have approximately equivalent information. Thus, the Cusp table only has to show the YC coordinates of the Cusp points for at least each representative hue, and the format thereof is optional.

[Gamut Conversion]

The gamut conversion processing unit 164 of the digital still camera 401 and the gamut conversion processing unit 184 of the monitor 402 perform gamut conversion (main compression or temporary compression) using a Cusp table such as described above. Details of the gamut conversion processing will be described below. A case wherein the gamut conversion processing unit 164 performs gamut conversion using the gamut (sRGB) shown in the Cusp table in FIG. 23 as the gamut after conversion (target gamut) will be described below as an example. Even in the case that the target gamut is another gamut, or in the case that the gamut conversion processing unit 194 performs gamut conversion, the gamut conversion processing basically is executed similarly.

Figure 24:
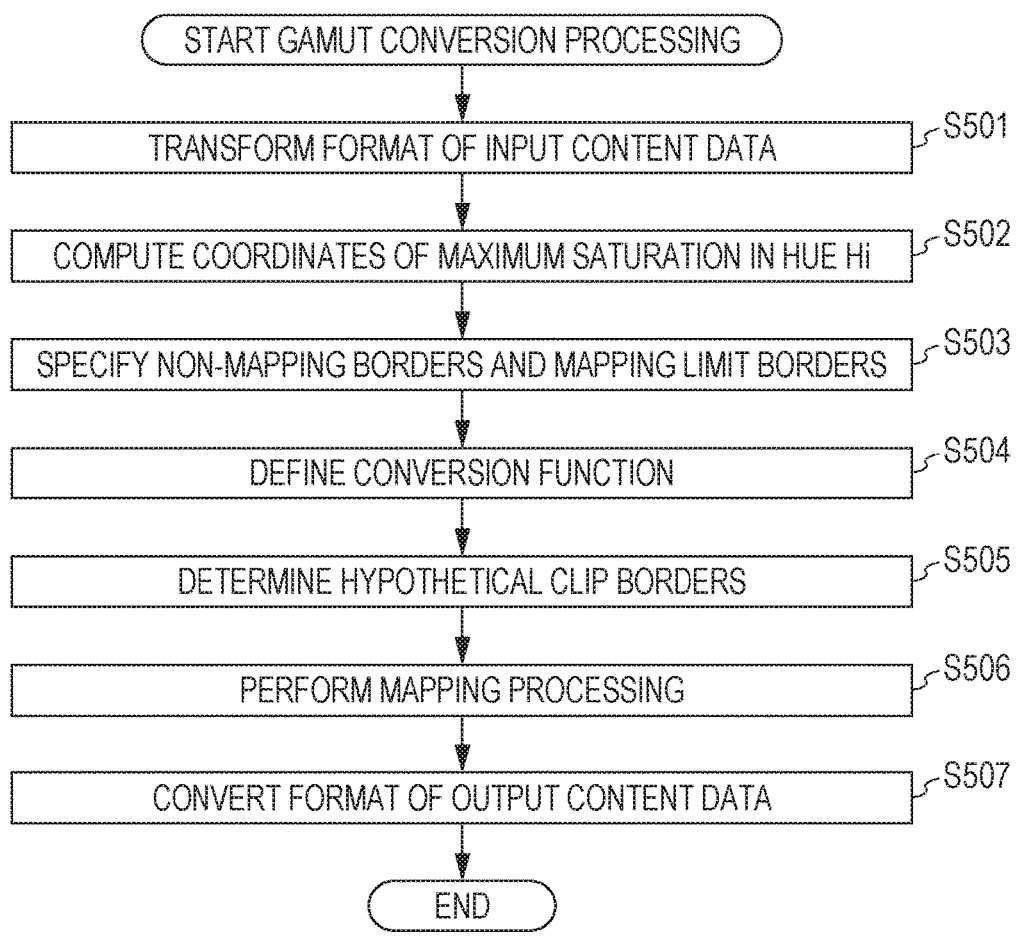
FIG. 24 is a flowchart describing an example of the flow of gamut conversion processing.

An example of the flow of gamut conversion processing will be described with reference to the flowchart in FIG. 24.

Upon the gamut conversion processing starting, the gamut conversion processing unit 164 performs calculation such as those shown below in Expression (1) through Expression (3), for example, so that . . . does not occur due to the gamut conversion, and converts the format of the input content data from YCC (Yi, Cbi, Cri) to YCH (Yi, Ci, Hi), for example (converts the coordinates system from YCC coordinates to YCH coordinates).

[Mathematical Expression 1]

$$Yi = Yi \quad (1)$$

$$Ci = \sqrt{Cbi^2 + Cri^2} \quad (2)$$

$$\begin{cases} \text{if } Cri > 0 \\ Hi = \arctan\left(\frac{Cri}{Cbi}\right) \cdot \frac{180}{\pi} \\ \text{else} \\ Hi = \arctan\left(\frac{Cri}{Cbi}\right) \cdot \frac{180}{\pi} + 360 \end{cases} \quad (3)$$

Upon the format having been converted, in step S502 the gamut conversion processing unit 164 computes the YC coordinates information (Ycp, Ccp) of the maximum saturation point (Cusp point) for each hue Hi, of the targeted gamut. Note that the target gamut is defined at the point in time that the gamut conversion processing is started (i.e., the gamut information is also held), whereby the YC coordinates information of the Cusp point can be obtained from the target gamut information (e.g. YCC data).

In step S503, the gamut conversion processing unit 164 specifies a non-mapping border and mapping limit border.

Figure 25:
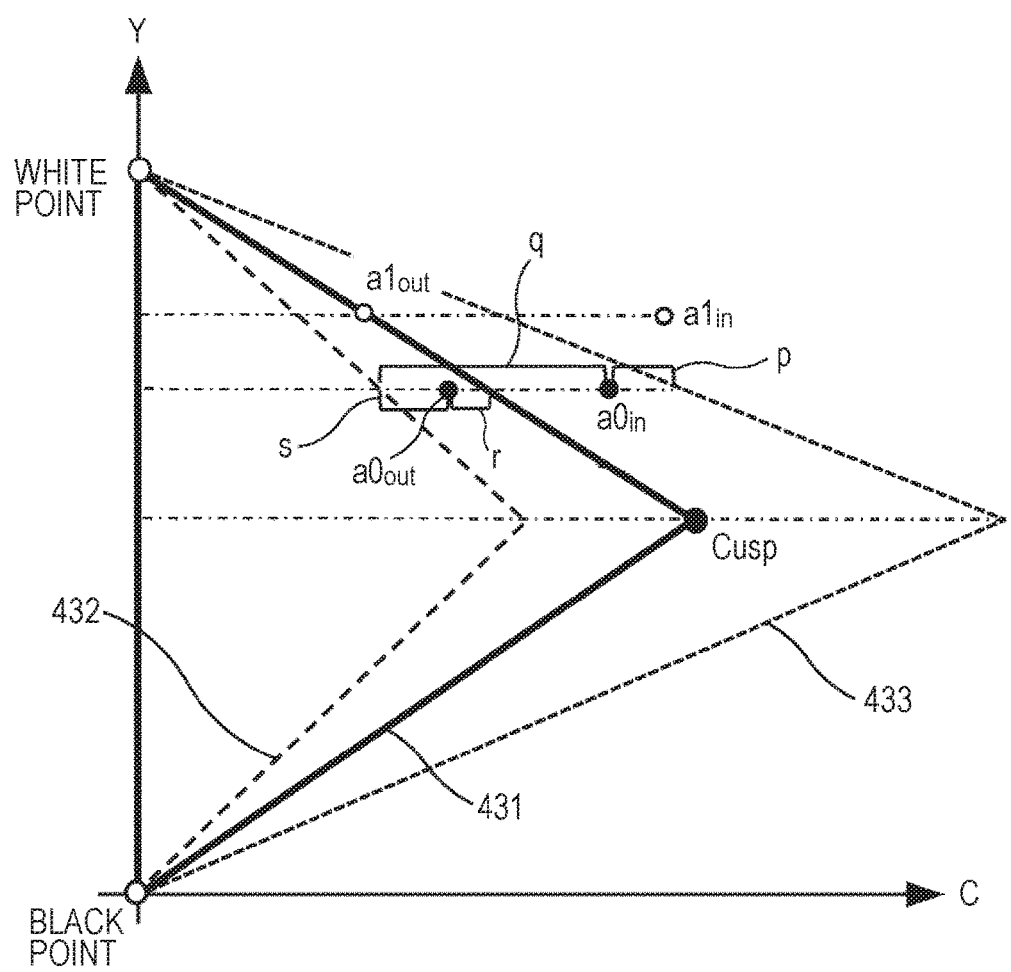
FIG. 25 is a diagram illustrating an example of a state of gamut conversion.

FIG. 25 is a diagram showing an example of a state of gamut conversion. In FIG. 25, the region surrounded by a thick line (region surrounded by a triangle having the white point, black point, and Cusp point as the vertex) is the final conversion destination region (Target compressed area), i.e., the target gamut. A T-boundary (Target boundary) 431 is the edge (border) other than the Y-axis of the target region. Using this T-boundary 431 as a standard, the border line that is smaller in the saturation direction a small amount is a non-mapping border (U-boundary (Uncompressed boundary)) 432. The region surrounded by the Y-axis and the U-boundary 432 is a non-mapping region, and the pixels included herein are not subjected to gamut conversion (coordinate movement). Next, which amount of the region should be converted to the conversion destination region needs to be specified. The border line for specifying how much the color of the moving picture content is spread out over the gamut is a mapping limit border (L-boundary (Limited boundary)) 433. In gamut conversion, the L-boundary 433 is border line expanded farther in the saturation direction than the T-boundary 431. That is to say, gamut conversion means to compress the region surrounded by the U-boundary 432 and L-boundary 433 into a region (gray portion) surrounded by the U-boundary 432 and T-boundary 431.

To express only regarding the saturation direction, with gamut conversion, the coordinates a0in in FIG. 25 is moved to a0out, for example. Note that the colors having higher saturation that the L-boundary 433 are all clipped by the T-boundary 431 (coordinates moved to above the T-boundary 431). For example, the coordinate of a1in in FIG. 25 is moved to about.

Figure 26:
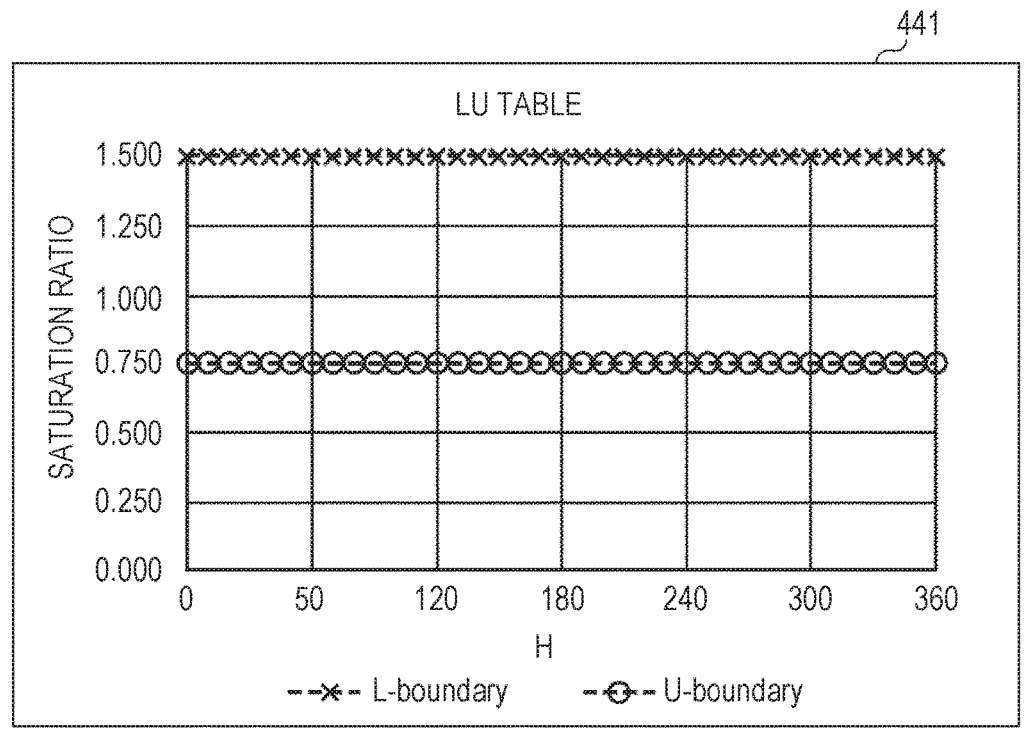
FIG. 26 is a diagram illustrating an example of an LU table.

FIG. 26 is a diagram showing an example of an LU table. The LU table 441 shown in FIG. 26 is a ratio (saturation ratio) of the saturation of the specified non-mapping border (U-boundary 432) and mapping limit border (L-boundary 433), using the T-boundary 431 as a standard, and is table information shown for each hue. In FIG. 26, the saturation ratio of the L-boundary and U-boundary for all of the hues is fixed (L-boundary is 1.5, U-boundary is 0.75), but these values may be changed for each hue (H).

The determining method for the saturation ratio of the L-boundary and U-boundary is optional. For example, the gamut conversion processing unit 164 can hold an LU table 441 such as shown in FIG. 26 beforehand, or can obtain one externally.

Returning to FIG. 24, in step S504, the gamut conversion processing unit 164 defines the conversion coefficient.

Figure 27:
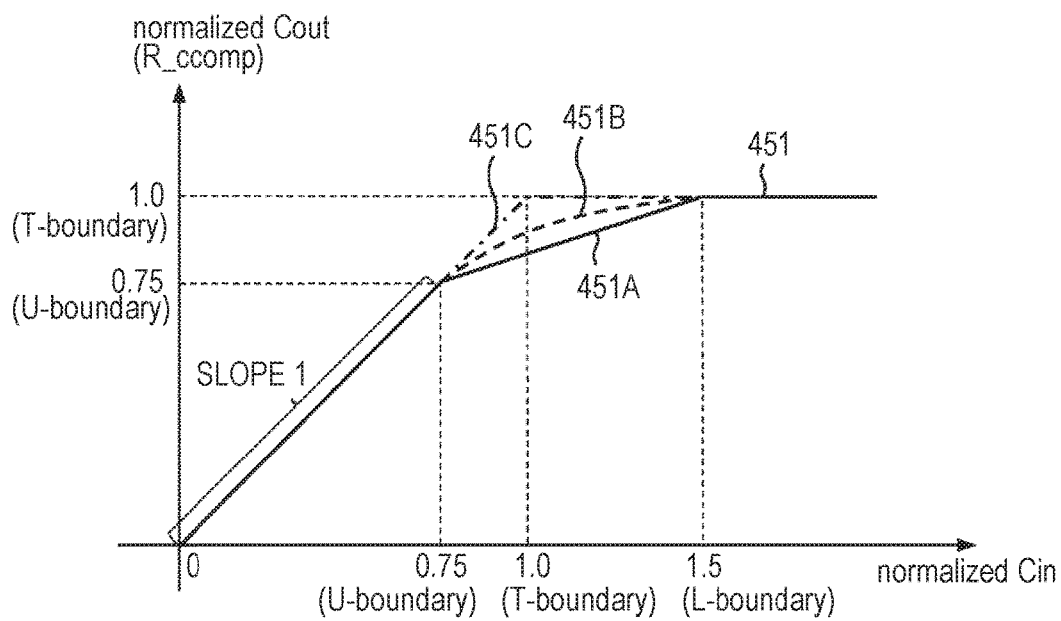
FIG. 27 is a diagram illustrating an example of a conversion function.

If we express the state of compression with a function when the saturation ratio of the U-boundary 432 is "0.75" and the saturation ratio of the L-boundary 433 is "1.5", this can be shown with a curve 451 as shown in FIG. 27, for example. This curve 451 is called a mapping function. A range having a slope of "1" shows a non-mapping region. The gamut conversion indicates that the range surrounded by the U-boundary 432 and L-boundary 433 on the horizontal axis is compressed into a region surrounded by the U-boundary 432 and T-boundary 431 on the vertical axis. Converting methods at this time are optional, and various methods may be considered. For example, solid line 451A indicates linear compression. Broken line 451B is an example of smoothly bending a function and gradually compressing. Dashed-dotted line 451C is not compression, and indicates gamut clip to the T-boundary 431.

That is to say, depending on the form of the curve 451 of this range, for example in FIG. 25, the ratio of the distance to the T-boundary 431 of a0out which is the movement destination of a0in and the distance to the U-boundary 432 (r:s) is determined, wherein the ratio of the distance to the L-boundary 433 and the distance to the U-boundary 432 is p:q. In other words, the function shown with the curve 451 (conversion function) shows the compression rate (R_c-comp) in the saturation direction of a pixel targeted for a certain processing, and from the output values of this function, a virtual clip border for the pixel targeted for processing is determined.

The mapping function is determined by depending on the values of the L-boundary 433 and U-boundary 432, so if the values of the L-boundary 433 and U-boundary 432 change for each hue, the mapping functions also will change.

Returning to FIG. 24, in step S505 the gamut conversion processing unit 164 determines the virtual clip border.

Figure 28:
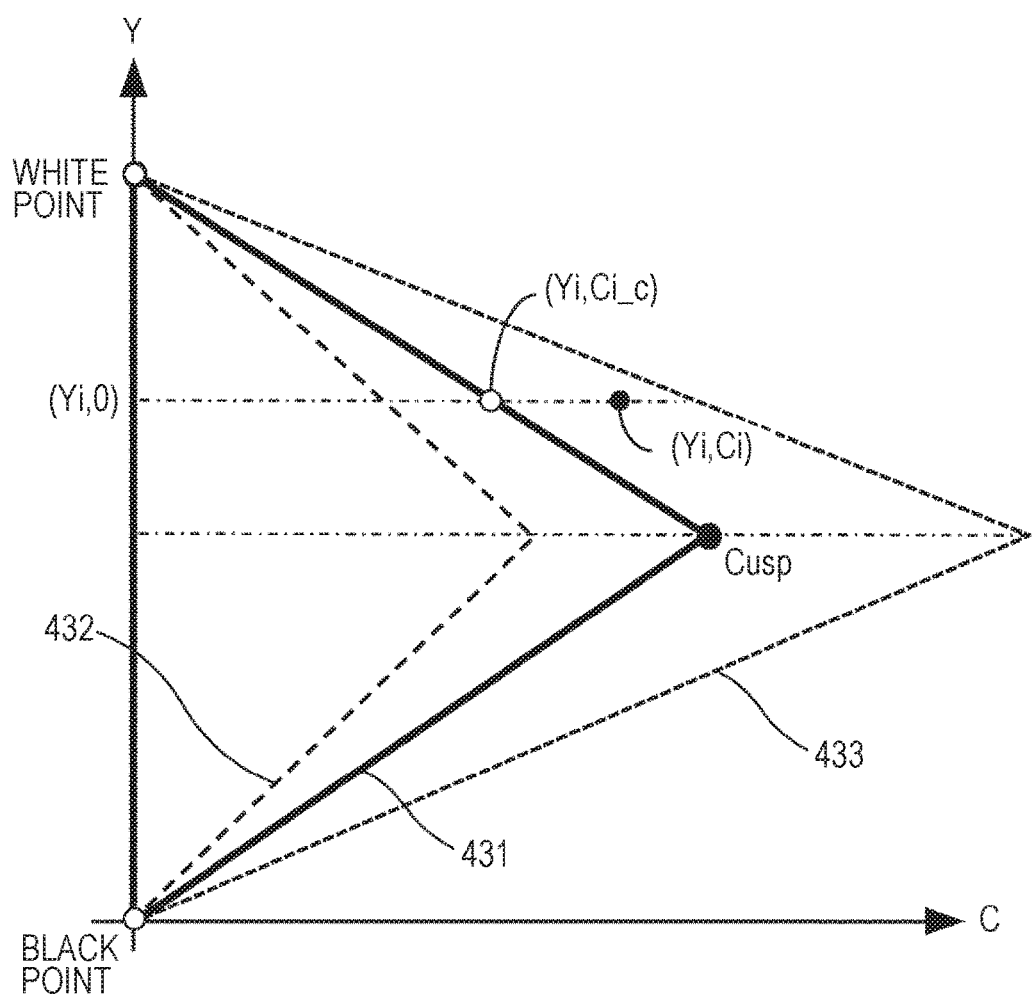
FIG. 28 is a diagram illustrating an example of a saturation computing method.

The gamut conversion processing unit t164 uses the saturation Ci of the pixel targeted for processing, and references the conversion function defined in the processing in step S504. However, the conversion function is a value wherein the saturation in the T-boundary 431 is normalized to "1" so the saturation Ci_c in the T-boundary 431 having the same luminance as the pixel targeted for processing needs to be found. If we say that the YC coordinates of the pixel targeted for processing (processing target pixel) is (Yi, Ci), then the saturation Ci_c, in the T-boundary 431 having the same luminance as the pixel targeted for processing as shown in FIG. 28, for example, can be found as the saturation of the intersection of the line linking the white point and Cusp point and the line linking the processing target pixel (Yi, Ci) and luminance point (Yi, 0) of the processing target pixel on the Y-axis.

Using the intersection of the saturation Ci_c and the saturation Ci of the processing target pixel, the saturation Ci_norm for referencing the conversion function can be computed as shown in Expression (4) below.

[Mathematical Expression 2]

$$Ci\_norm = \frac{Ci}{Ci\_c} \qquad (4)$$

For example, the gamut conversion processing unit 164 determines the saturation direction compression rate R_ccomp of the processing target pixel, referencing the conversion function shown with the curve 451 in FIG. 27 using the saturation Ci_norm. Upon the R_ccomp having been determined, a virtual clip border of the processing target pixel (V-boundary (Virtual clip boundary)) can be determined. Thus, by determining the virtual clip border (V-boundary), the gamut conversion can be considered as processing that repeatedly performs the gamut clip as to the virtual clip border.

Figure 29:
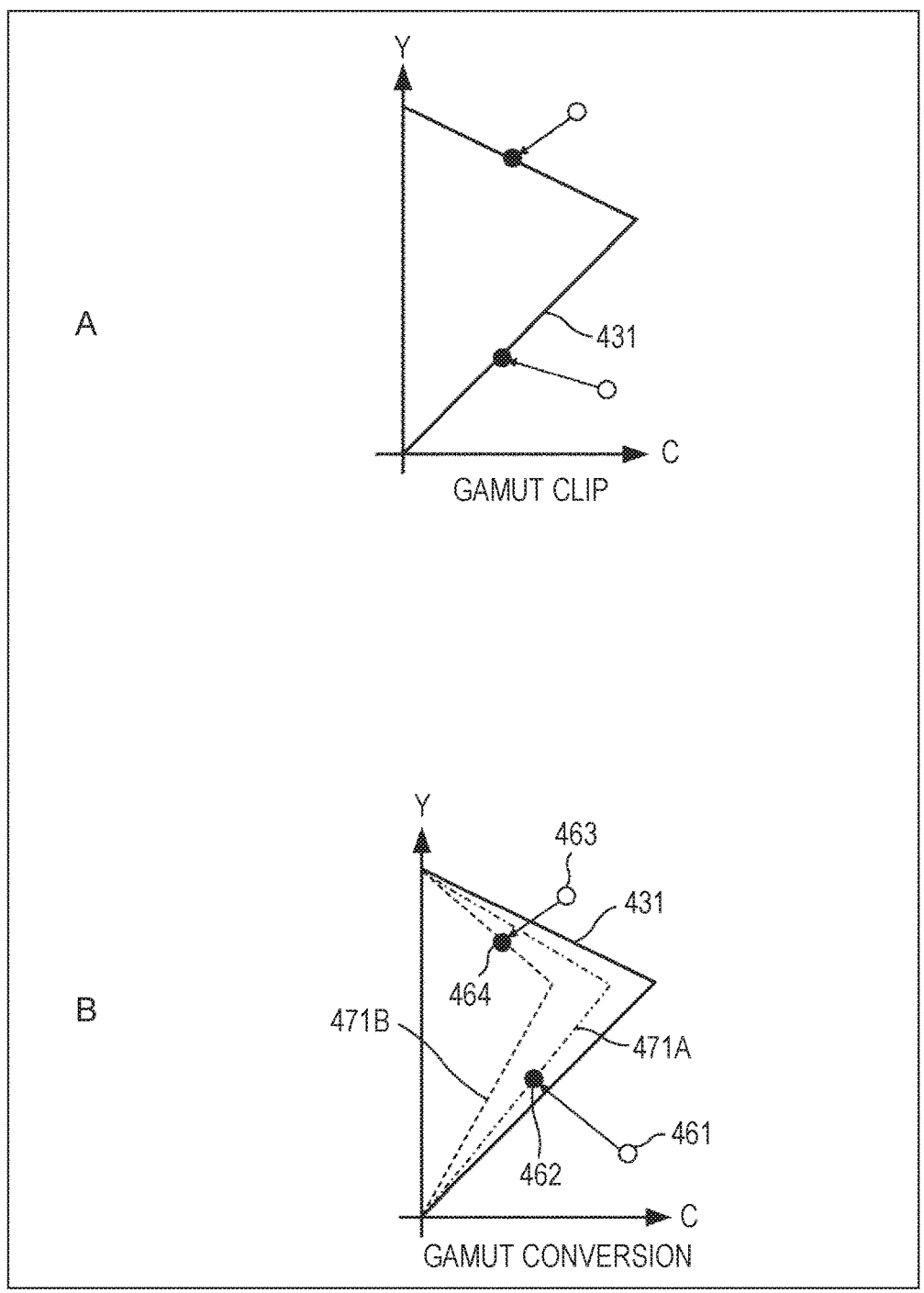
FIG. 29 is a diagram to compare a gamut clip and the state of gamut conversion.

FIG. 29 is a diagram to compare the state of gamut clip and gamut conversion. FIG. 29A is a schematic diagram showing the state of gamut clip. Gamut clip indicates moving a color that is outside the target gamut onto the T-boundary 431 which is the target gamut border (clips to the T-boundary 431), as shown in FIG. 29A. For example, in FIG. 29A, the coordinates of the processing target pixel shown with a white circle is moved to the clip point on the T-boundary 431, which is shown with a black circle.

FIG. 29B is a schematic diagram showing the state of gamut conversion. As described above, gamut conversion is to move the processing target pixel onto a virtual clip border (V-boundary) corresponding to the processing target pixel. For example, in FIG. 29B, the coordinates of the processing target pixel 461 is moved to the clip point 464 on the V-boundary 471B. That is to say, gamut conversion can be considered as equivalent to performing similar processing as in the case of the gamut clip in FIG. 29A for each processing target pixel.

For example, to describe the Cusp point, the YC coordinates (Ycp, Ccp_V) of the clip point Cusp_V of the Cusp point having YC coordinates (Ycp, Ccp) can be computed as in the Expression (5) below, using the saturation direction compression rate R_ccomp.

[Mathematical Expression 3]

$$Cusp\_V=(Ccp\_V,Ycp)=(R\_ccomp \times Ccp, Ycp) \qquad (5)$$

Figure 30:
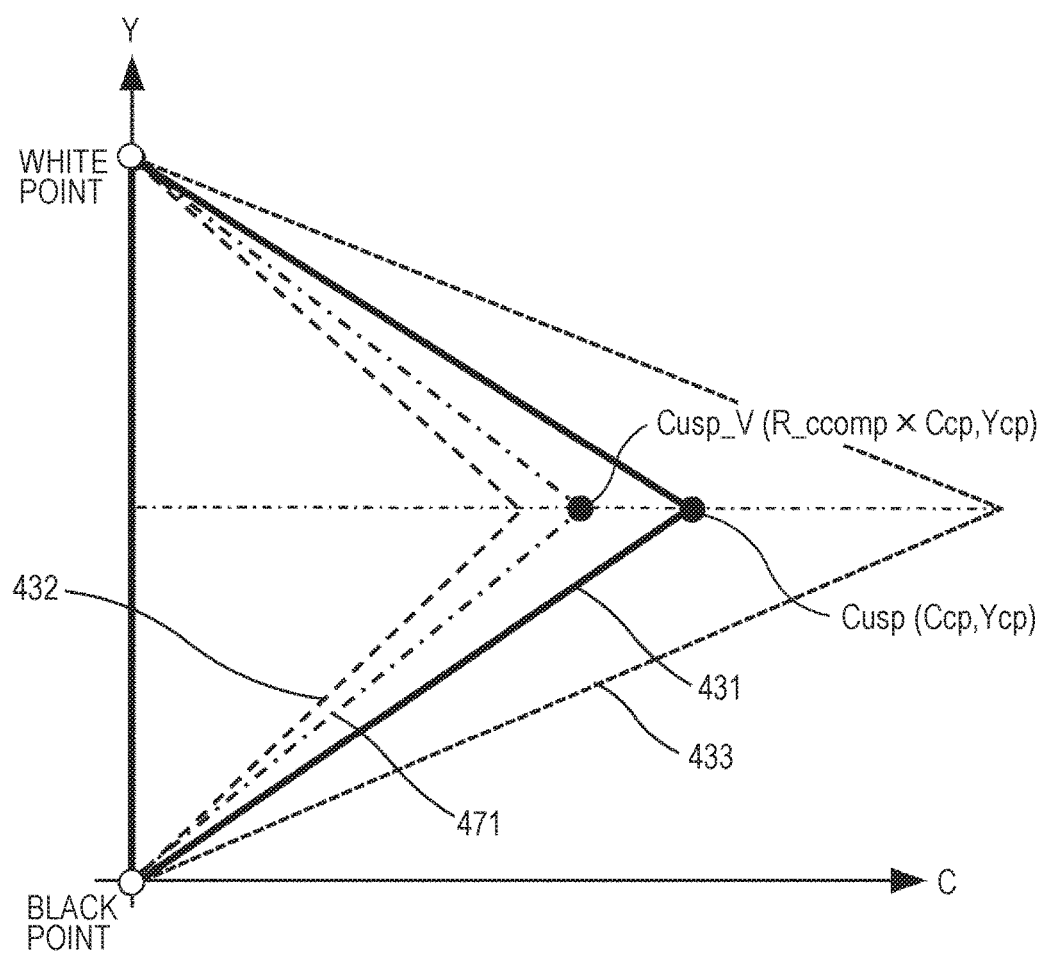
FIG. 30 is a diagram illustrating an example of a hypothetical clip border.

The virtual clip border (V-boundary) 471 is determined from the YC coordinates of the clip point Cusp_V. For example, the virtual clip border (V-boundary) 471 of the Cusp Point is made up of a line segment having the clip point Cusp_V and the white point as both ends, and a line segment having the clip point Cusp_V and the black point as both ends, as shown in FIG. 30.

That is to say, this V-boundary 471 is determined by the above-described conversion function and the ratio of the distance to the L-boundary 433 of the processing target pixel and distance to the U-boundary 432 (p:q). In other words, processing target pixels having the same ratio (p:q) of the distance to the L-boundary 433 and distance to the U-boundary 432 share the V-boundary 471.

Returning to FIG. 24, in step S506, the gamut conversion processing unit 164 performs mapping processing.

Figure 31:
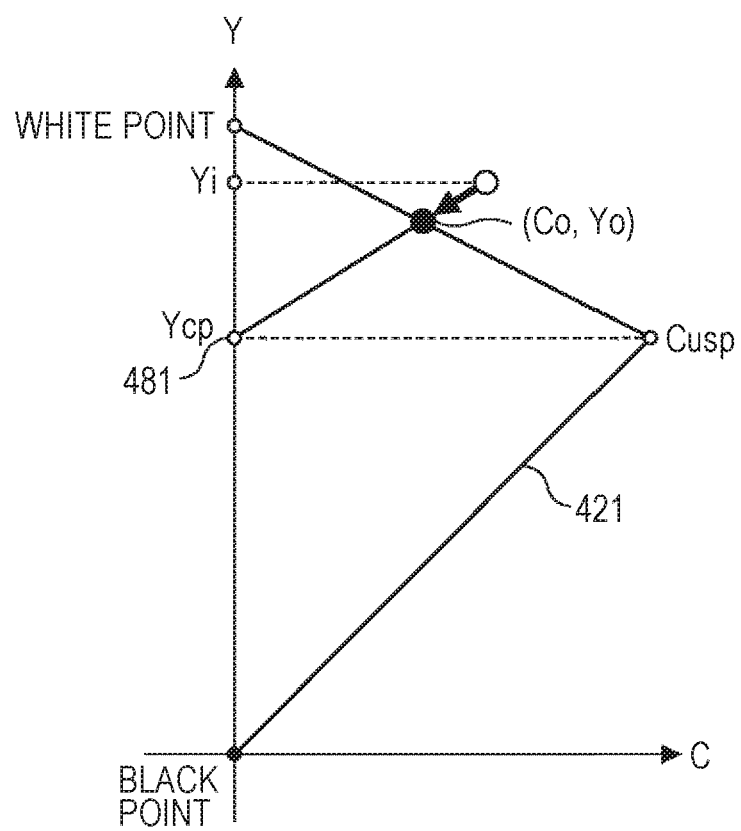
FIG. 31 is a diagram illustrating a state of gamut conversion mapping.

FIG. 31 is a diagram showing an example of the state of the gamut conversion mapping. With the mapping, as shown in FIG. 31 for example, an isobestic point in the clip direction is set on the Y-axis, and mapping is performed in the direction facing the isosbestic point thereof on the virtual clip border (V-boundary) 471.

In the case of the example in FIG. 31, a point having the same luminance as the luminance Ycp of the Cusp on the Y-axis is set as the isobestic point, and mapping is performed in the direction (arrow) facing the isosbestic point thereof.

It goes without saying that in which direction to clip on the virtual clip border (V-boundary) 471 is optional, and the position of the isosbestic point is also optional. Also, multiple isosbestic points may be set. In this case, for example, mapping is performed in a direction wherein the directions facing the various isosbestic points are synthesized at a predetermined ratio.

With such clipping, the final mapping point (Co, Yo) is determined.

Returning to FIG. 24, in step S507 the gamut conversion processing unit 164 converts the form of the output content data. If the CY coordinates of the final mapping point obtained with the processing in step S506 are (Co, Yo), the gamut conversion processing unit 164 performs conversion from the YCH coordinate system to the YCC coordinate system as shown in Expression (6) through Expression (8) below, and calculates the YCC coordinates Pout (Yo, Cbo, Cro) of the final mapping point.

$$Ho=Hi \qquad \text{[Mathematical Expression 4]}$$

Accordingly, $$Yo=Yo \qquad (6)$$

$$Cbo=Co \cdot \cos(Ho) \qquad (7)$$

$$Cro=Co \cdot \sin(Ho) \qquad (8)$$

Upon the YCC coordinates of the final mapping point having been computed, the gamut conversion processing is ended.

[Metadata]

Next, a configuration of the gamut metadata and restoration metadata will be described in detail. The gamut metadata is made up of data showing a gamut conversion target range. For example, a Cusp table (graph 421-1 and graph 421-2, or table 422) such as shown in FIG. 23 is added to the image data subjected to gamut conversion as the gamut metadata.

Also, restoration metadata generated by the restoration metadata generating unit 155 (FIG. 3) may include any sort of data as long as this is data referenced in the event of restoration processing, but for example, has the following three types of data.

The first data type is data indicating a gamut conversion target range. For example, this is a LU table 441 shown in FIG. 26. That is to say, by referencing the LU table 441, how far the data before gamut conversion had spread, or where the data region not subjected to gamut conversion is, can be confirmed. Note that the format of the LU table 441 is optional. For example, the saturation ratio of the L-boundary and U-boundary for each representative hue (e.g., every 10 degrees) may be formed into a table. In this case, the saturation ratio of the L-boundary and U-boundary of the intermediate hues between representative hues may be computed by performing interpolation processing using the saturation ratio of the L-boundary and U-boundary of the representative hues.

Figure 32:
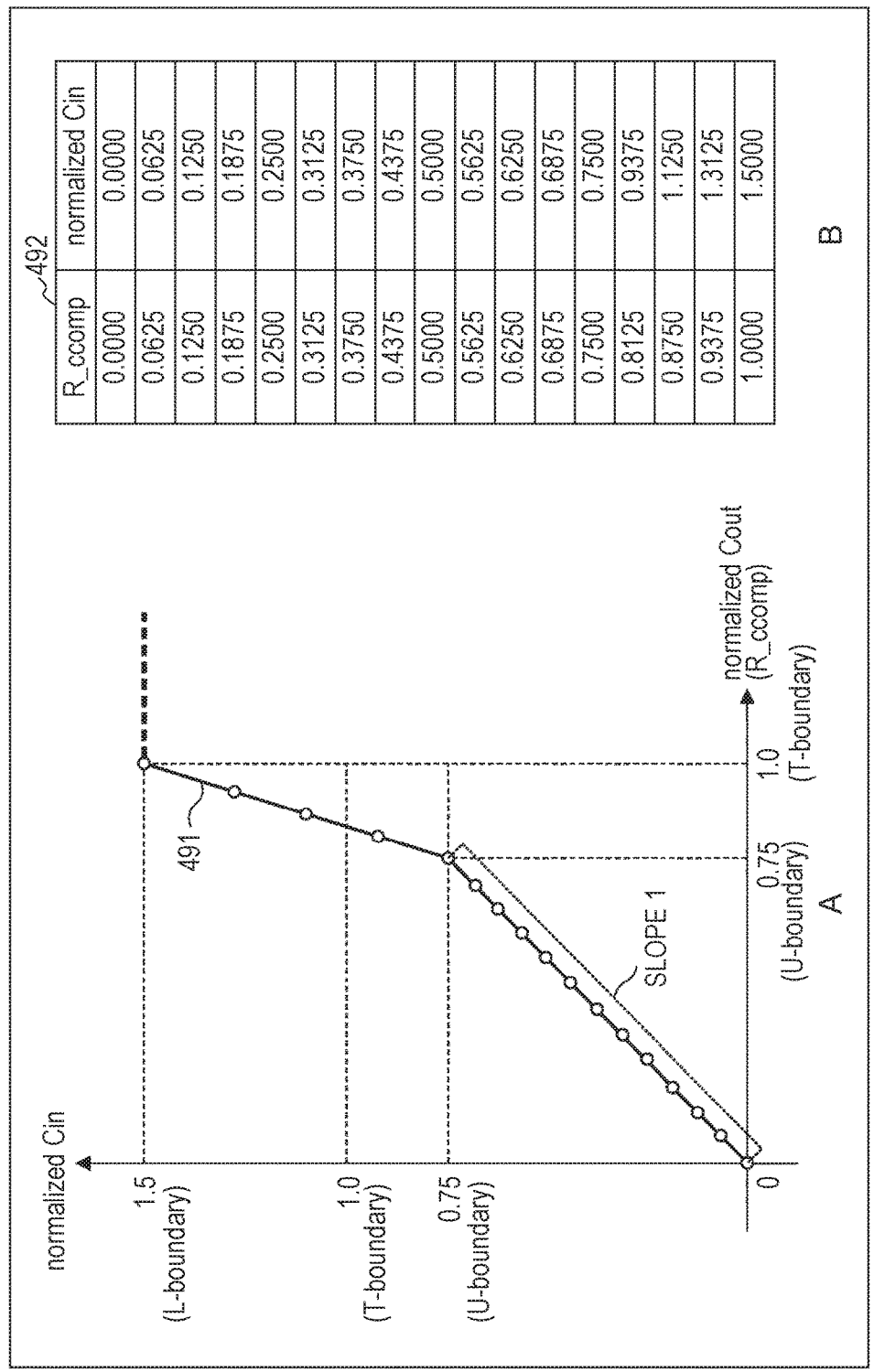
FIG. 32 is a diagram illustrating an example of a restoration function.

The second type of data is data indicating the degree of gamut conversion (restoration). For example, this is an inverse function (restoration function) of the gamut conversion function shown in FIG. 27. FIG. 32 is a diagram showing an example of the restoration function. FIG. 32A shows the restoration functions in a graph, and FIG. 32B shows the restoration function in a table of representative points.

A curve 491 in the graph shown in FIG. 32A is the inverse function of the curve 451 in FIG. 27 (in the case of solid line 451A) in the 0 through T-boundary range on the horizontal axis (normalized Cout) (0 through L-boundary range on the vertical axis (normalized Cin)).

However, points in the portion greater than the T-boundary on the horizontal axis is clipped to the T-boundary in the event of gamut conversion processing, so restoration is impossible. Accordingly, the curve 491 which is a restoration function in FIG. 32A does not include portions greater than the T-boundary.

A table 492 in FIG. 32B is a table of values (e.g., dispersion data of input (normalized Cout (R-ccomp)) in spacing increments of 0.0625) on the vertical axis (normalized Cin) for the representative points on the curve 491 in FIG. 32A. Intermediate points not on the table can be obtained by interpolation processing, so the table 492 can be seen as equivalent to the curve 491 shown in FIG. 32A.

Thus, the restoration function indicates the pixels in which portions are compressed or expanded by what amount. The format of the data showing the restoration function herein is optional, and other than the above-descriptions, for example a mathematical expression or the like may be used.

Figure 33:
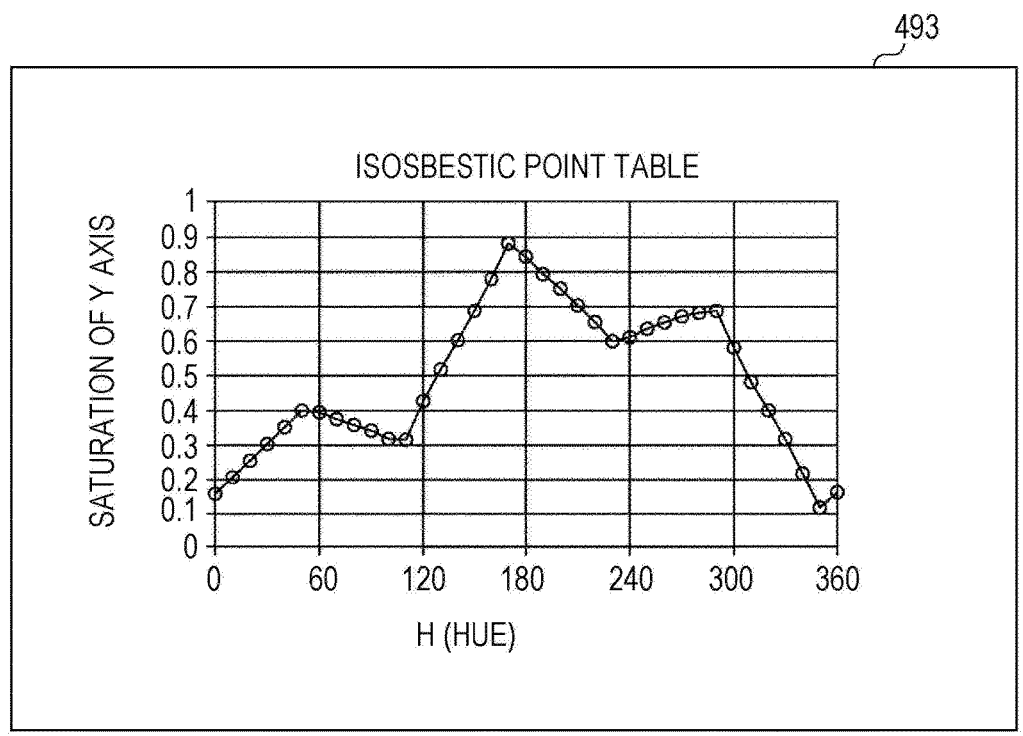
FIG. 33 is a diagram illustrating an example of an isosbestic point table.

The third type of data is data indicating the direction of gamut conversion (restoration). For example, this may be the isosbestic table used in the event of gamut conversion. With the above descriptions, the isosbestic point for each hue is described as the point on the Y-axis of the luminance Ycp of the Cusp for each hue. Accordingly, in this case, for example as in graph 493 shown in FIG. 33, the isosbestic point table is the same as the Cusp luminance Ycp table.

It goes without saying that the isosbestic point can be set to an optional position, so the isosbestic point table is independently set, and will not necessarily be the same as the Cusp luminance Ycp table.

Also, the format of the isosbestic point table is also optional as with the restoration function and LU table and so forth, and may be expressed with any format such as a graph, table of representative points, mathematical expression or the like.

[Recording Format]

The image data thus subjected to gamut conversion is saved on an optical disc 110 as a data length 16-bit image in a Tiff file format, for example. In this case, the gamut metadata and restoration metadata having data such as described above is embedded in the image data as a Tiff "Private Tag", for example.

FIG. 34 is a diagram showing an example of a recording format of the gamut metadata. The gamut metadata prepares a tag (Tag) called "GamutMeta" in the Tiff "Private Tag", for example, and can be stored in the "GamutMeta Tag" thereof.

A Tiff "Directory Entry" of the "GamutMeta Tag" is in a configuration as shown on the left side in FIG. 34. The form of the variable making up the tag (Tag) is set as "7", indicating "Undefined". As for the number of variables, the Cusp information table is held for each of Y and C, so "2" is set. If the offset address to "Value" stored in an actual table is "α", then "Value" becomes a configuration as shown on the right side in FIG. 34, for example. In the example in FIG. 34, the Cusp tables for each of Y and C are defined by 37 tables in increments of hues of 10 degrees.

FIG. 35 is a diagram showing an example of a recording format of the restoration metadata. The restoration metadata prepares a tag (Tag) called "ReprocMeta" in the Tiff "Private Tag", for example, and can be stored in the "ReprocMeta Tag" thereof.

The Tiff Directory Entry of the "ReprocMeta Tag" is in a configuration such as shown on the left side of FIG. 20. In this case also, the form of the variable making up the tag (Tag) is set to "7", indicating "Undefined". However, as to the number of variables, "4" is set, since the types of restoration metadata are a total of four types: two types of LU tables, a restoration function, and an isosbestic point table. If the offset address to "Value" stored in an actual table is "α", then "Value" becomes a configuration as shown on the right side in FIG. 35, for example.

In the example in FIG. 35, the two types of tables of the L-boundary and U-boundary (L table data and U table data) and the isosbestic point table (Conv table data) are defined by 37 double-form tables in increments of 10 degrees. Also, the restoration function (Reproc func data) is defined as 17 double-form tables in increments of 0.0625.

In the case of a Tiff format, the image data and various metadata are recorded on the optical disc 110 in a format such as described above. It goes without saying that the storage location of the image data and various metadata is optional, and may be a location other than the example described above. Also, the image data format may be other than Tiff.

[Output Gamut]

Note that in the case of displaying the image on the monitor 402, the digital still camera 401 obtains gamut information of the monitor 402 via the HDI cable 403 beforehand. In this case, an exchange of connection information using an EDID (Extended Display Identification Data) is performed in the negotiation at time of connections. At this time, the gamut information of the monitor 402 is written into the EDID. Thus, the digital still camera 401 can obtain the gamut information of the monitor 402 at the time of connections with the monitor 402.

Figure 36:
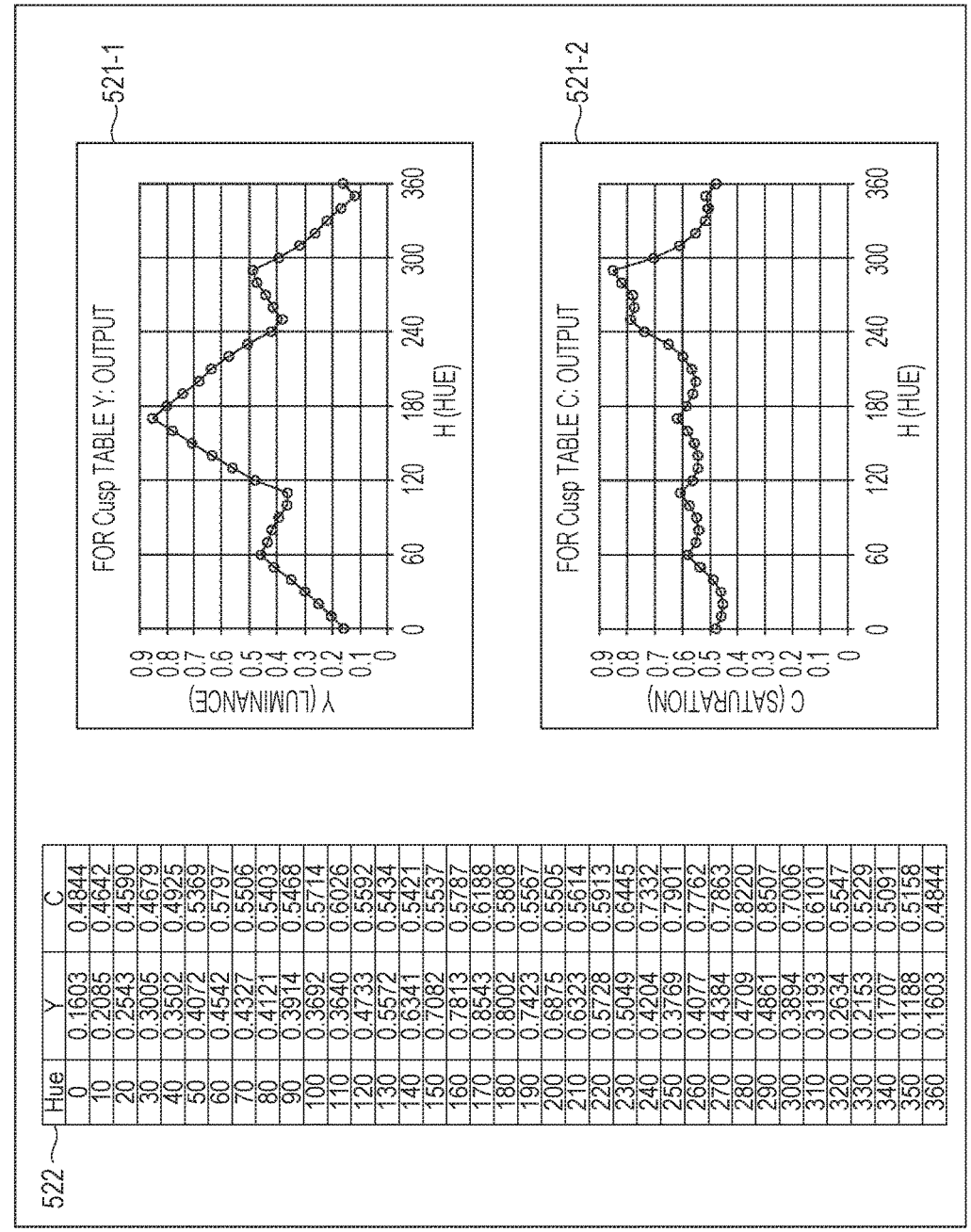
FIG. 36 is a diagram illustrating an example of the gamut of an output device.

The gamut information (output gamut) of the monitor 402) may be information of any sort of format, but for example, may be a Cusp table as shown in FIG. 36.

FIG. 36 is a diagram showing an example of the output gamut. Graph 521-1 is a graph of the luminance (Y) of the Cusp points for each hue (H). Graph 521-2 is a graph of the saturation (C) of the Cusp points for each hue (H). Also, table 522 is a table of the values of the luminance (Y) and saturation (C) of the representative hues (H). That is to say, similar to the case in FIG. 23, the Cusp table only has to show at least the YC coordinates of the Cusp points for each representative hue, and the format thereof is optional.

[Control of Restoration and Compression]

Figure 37:
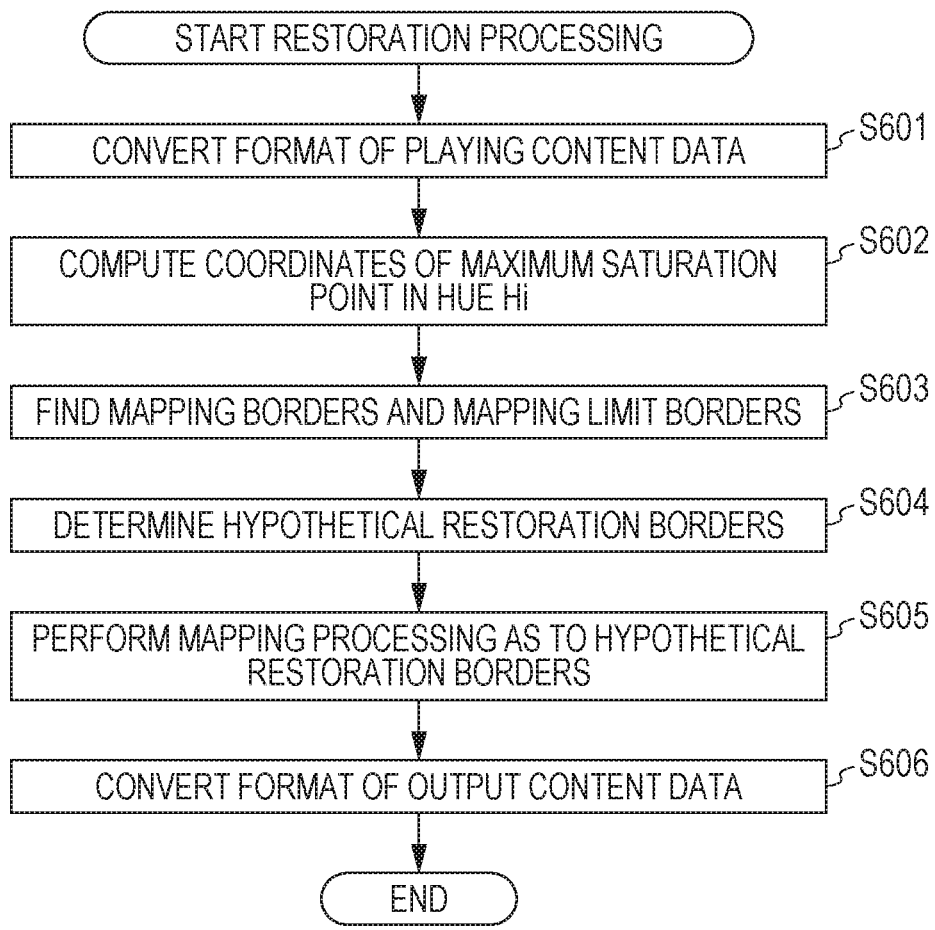
FIG. 37 is a flowchart describing an example of the flow of restoration processing.

Next, a specific example of restoration processing will be described. An example of the flow of restoration processing executed with the restoration processing unit 163 will be described with reference to the flowchart in FIG. 37.

Upon the restoration processing starting, in step S601 the restoration processing unit 163 converts the format of the playing content data, which is various types of data such as image data read out from the optical disc 110 and so forth, from YCC (Yi, Cbi, Cri) to YCH (Yi, Ci, Hi). The conversion herein is performed as shown in Expression (1) through Expression (3), similar to the case of the time of recording, for example.

In step S602, the restoration processing unit 163 computes the coordinates of the maximum saturation point (Cusp point) of the gamut of each hue Hi. The gamut information of the image data of the playing content data is provided in the Cusp table described with reference to FIG. 23. Accordingly, the restoration processing unit 163 calculates the CY coordinates of the Cusp point of the processing target hue Hi, with a similar method as the case of gamut conversion at the time of recording.

Figure 38:
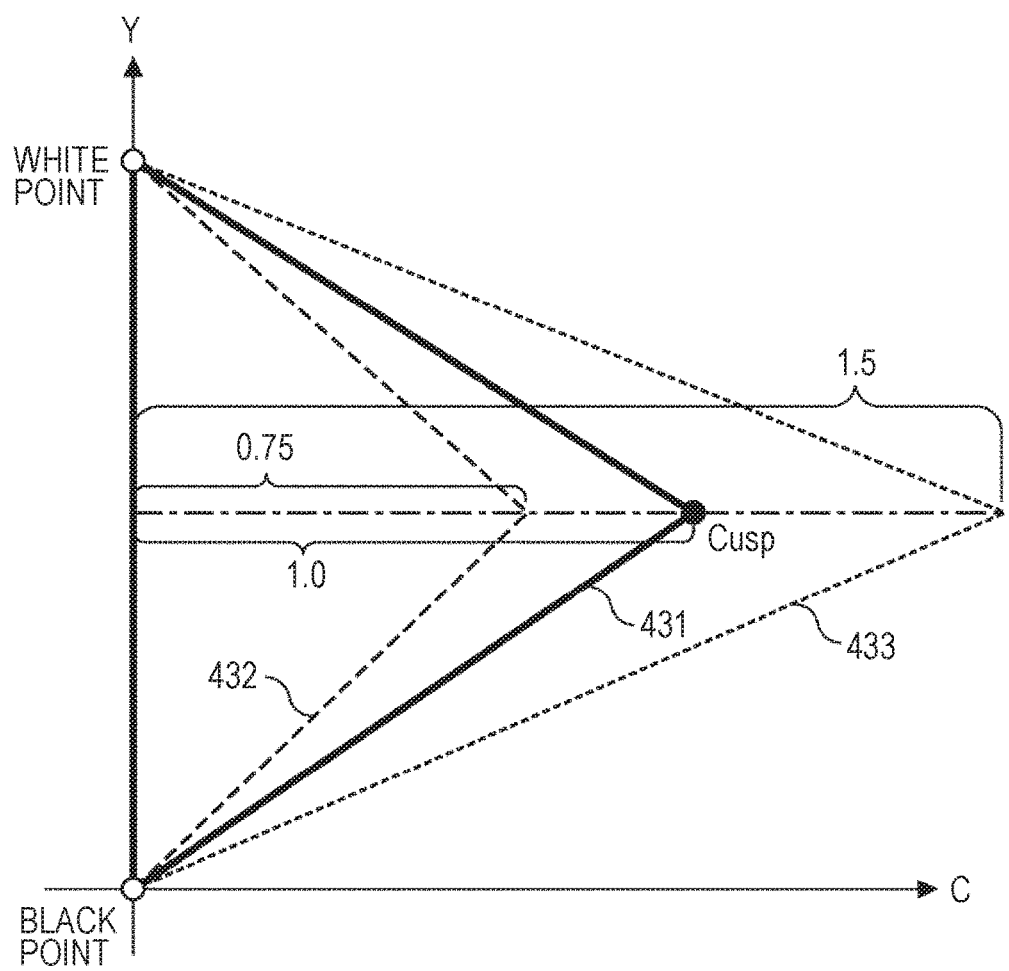
FIG. 38 is a diagram illustrating a decision state of a restoration range.

In step S603 the restoration processing unit 163 obtains the non-mapping border (U-boundary 432) and mapping limit border (L-boundary 433) such as shown in FIG. 38 with a saturation ratio, for example. With temporary compression, the gamut between the U-boundary 432 and L-boundary 433 is converted to the gamut between the U-boundary 432 and T-boundary. That is to say, by obtaining the U-boundary 432 and L-boundary 433, the restoration processing unit 163 obtains the range subjected to gamut conversion. In other words, the restoration processing unit 163 obtains the restoration range which is a range wherein the gamut before temporary compression is restored.

Since an LU table (FIG. 26) is included in the restoration metadata, the restoration processing unit 163 can readily obtain the U-boundary 432 and L-boundary 433 of the hue Hi by referencing the LU table.

Figure 39:
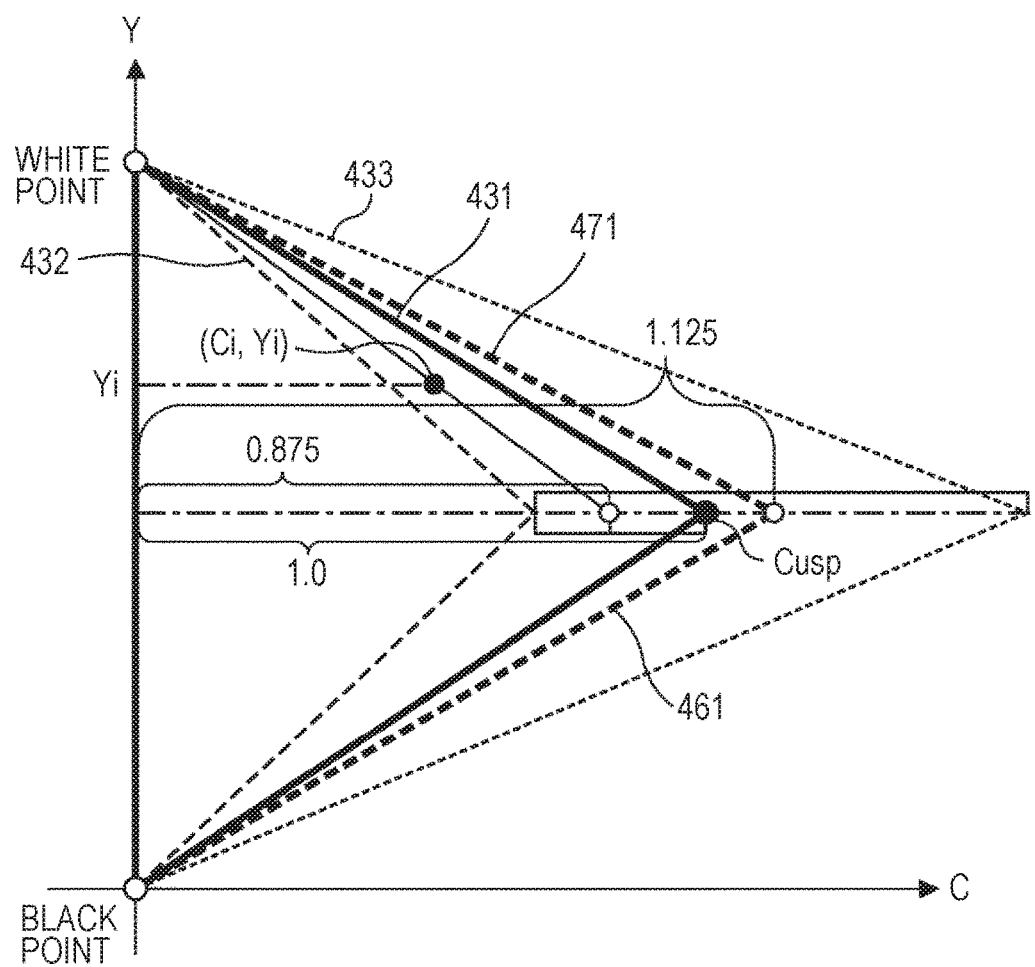
FIG. 39 is a diagram describing an example of a decision state of a hypothetical restoration border.

In step S604 the restoration processing unit 163 references the restoration function (FIG. 32) include in the restoration metadata, and as shown in FIG. 39, determines the virtual restoration border (V-boundary) 471 corresponding to the saturation Ci of the processing target pixel (Ci, Yi).

In step S605 the restoration processing unit 163 subjects the processing target pixel to restoration mapping on the V-boundary 471 obtained by the processing in step S604. The restoration processing unit 163 references the isosbestic point table (FIG. 33) included in the restoration metadata tables, and determines the isosbestic point of the processing target hue Hi.

Figure 40:
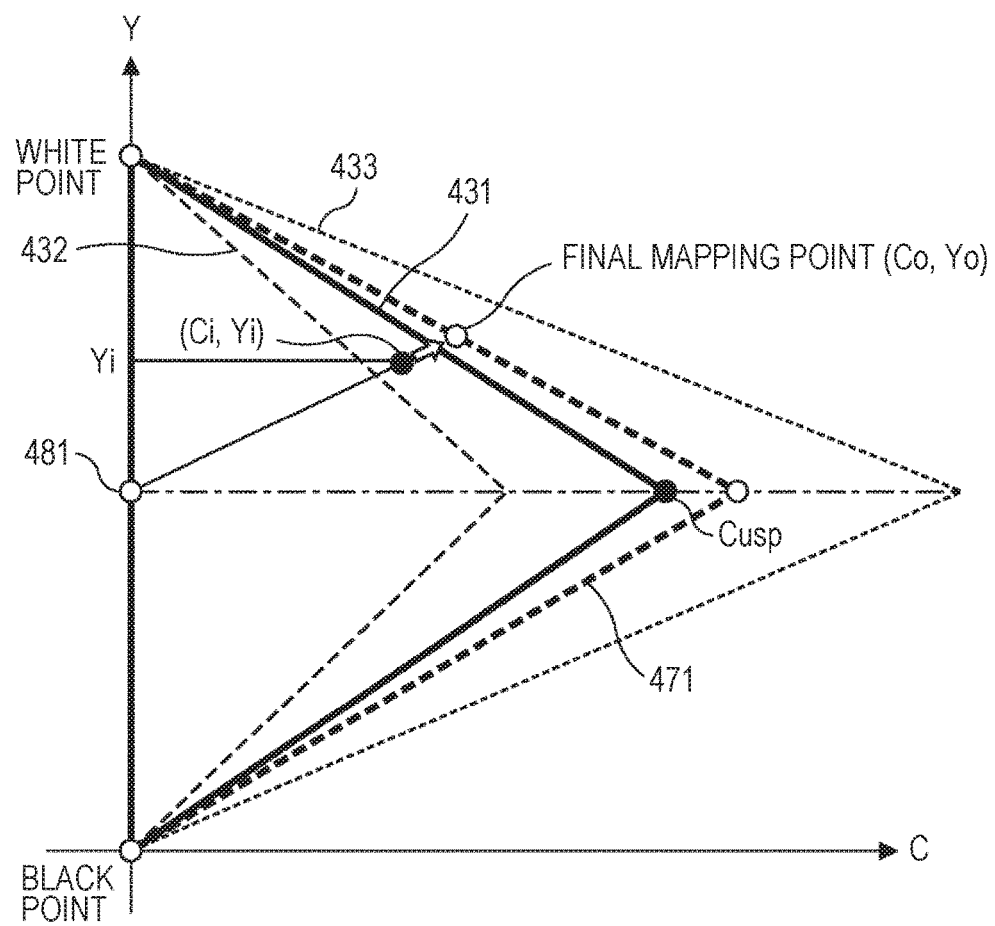
FIG. 40 is a diagram describing an example of a state of restoration mapping.

The restoration processing subjects the processing target pixel to restoration mapping from the isosbestic point towards the direction facing the processing target pixel, as shown in FIG. 40, for example. That is to say, the processing target pixel is moved (restoration mapping) to the intersection (final mapping point (Co, Yo)) between a line linking the isosbestic point and the processing target pixel and the V-boundary 471.

In step S606 the restoration processing unit 163 converts and outputs the format of the output content data which is image data subjected to restoration processing and so forth as described above, from YCH (Yi, Ci, Hi) to YCC (Yi, Cbi, Cri), and ends the restoration processing.

As described above, for example the gamut conversion processing unit 164 performs a second gamut conversion (main compression) as described above, as to the image data for which the gamut is restored to before the temporary compression.

As described above, in the event that the digital still camera 401 records image data on the optical disc 110, restoration metadata is generated, and added to the image data and recorded on the optical disc 110, whereby the digital still camera and monitor 402 can readily perform restoration processing as described above.

6. Sixth Embodiment

[Personal Computer]

The above-described series of processing can be executed with hardware, or can be executed with software. In this case, for example, a configuration may be that of a personal computer such as shown in FIG. 41.

Figure 41:
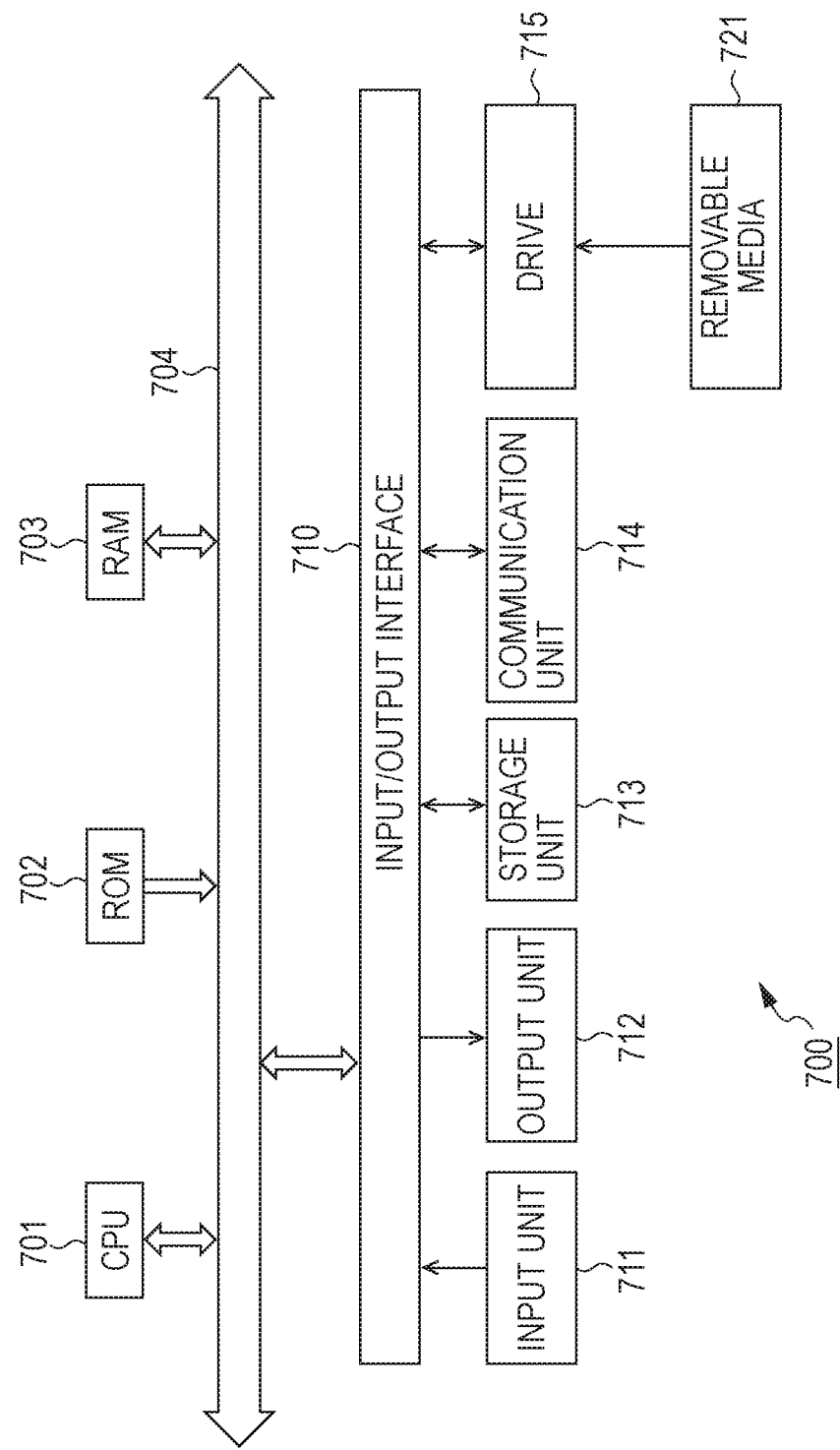
FIG. 41 is a block diagram illustrating a primary configuration example of a personal computer to which the present invention has been applied.

In FIG. 41, a CPU (Central Processing Unit) 701 of a personal computer 700 executes various types of processing according to a program stored in a ROM (Read Only Memory) 702 or a program loaded in a RAM (Random Access Memory) from a storage unit 713. The RAM 703 also has data and so forth stored therein necessary for the CPU 701 to execute various types of processing.

The CPU 701, ROM 702, and RAM 703 are mutually connected via a bus 704. This bus 704 is also connected to an input/output interface 710.

The input/output interface 710 is connected to an input unit 711 made up of a keyboard, mouse, and the like, an output unit 712 made up of a display made up of a CRT (Cathode Ray Tube) or LCD (Liquid Crystal Display) or the like and a speaker or the like, a storage unit 713 made up of a hard disk or the like, and a communication unit 714 made up of a modem or the like. The communication unit 714 performs communication processing via a network which includes the Internet.

The input/output interface 710 also is connected to a drive 715 as needed, and a removable medium 721 such as a magnetic disk, optical disk, magneto-optical disk, or semiconductor memory is mounted as appropriate, and a computer program read out there from is installed in the storage unit 713 as needed.

In the case of executing the above-described series of processing with software, a program making up the software thereof is installed from a network or recording medium.

This recording medium is made up, separately from the device main unit, not only of a removable media 721 made up of a magnetic disk in which a program is recorded (including a flexible disk), optical disc (including CD-ROM (Compact Disc-Read Only Memory) and DVD (Digital Versatile Disc)), magneto-optical disc (includes MD (Mini Disc)), or semiconductor memory, distributed in order to distribute the program to users, but is also made up of a ROM 702 or a hard disk included in the storage unit 713 in which a program is recorded, so as to distribute to users in the state of being built into the device main unit beforehand.

Note that the program that the computes executes may be a program for processing to be performed in a time-series manner in the sequence described in the present specification, or may be a program for processing to be performed in parallel or at a necessary timing such as upon call-up.

Also, according to the present Specification, it goes without saying that the steps describing the program recorded in the recording medium include processing performed in a time-series manger according to the described sequence, but even if not necessarily processed in a time-series manner, also includes processing that is executed in parallel or individually.

Also, according to the present Specification, the system indicates the entirety of equipment made up of multiple devices (apparatuses).

Also, with the above description, the configuration described as one device (or processing unit) may be configured as multiple devices (or processing units). Conversely, a configuration described above as multiple devices (or processing units) may be configured so as to be integrated into one device (or processing unit). Also, a configuration other than that described above may be added to the configuration of the various devices (or various processing units). Further, as long as the overall system configuration and operations are practically the same, a portion of a configuration of a certain device (or processing unit) may be included in the configuration of another device (or other processing unit). That is to say, embodiments of the present invention are not limited to the embodiments described above, and various types of modifications may be made without departing of the essence of the present invention.

REFERENCE SIGNS LIST 100 information processing system
101 recording device
102 playing device
103 output device
151 imaging unit
152 user specification accepting unit
153 gamut conversion control unit
154 gamut conversion processing unit
155 restoration metadata generating unit
156 recording unit
161 playing unit
162 restoration gamut conversion control unit
163 restoration processing unit
164 gamut conversion processing unit
165 communication unit
171 restoration conversion state confirming unit
172 information exchange unit
173 determining unit
181 communication unit
182 information providing unit
183 restoration processing unit
184 gamut conversion processing unit
185 output unit
212 information providing unit
222 restoration gamut conversion control unit
231 restoration conversion state confirming unit
232 information exchange unit
233 determining unit

The invention claimed is:

1. An information processing device comprising:
   circuitry configured to control:
      confirming a determining condition for controlling execution of restoration processing that returns at least a portion of a gamut of an input image to a state before the input image is subjected to gamut conversion such that the gamut of the input image is narrower than a gamut of an image before the gamut conversion; and
      executing said restoration processing, based on a confirmation result from the confirming, according to metadata associated with the input image and used by a color mapping process which maps each pixel of the input image so that a gamut of a mapped image after the color mapping process to the input image is wider than that of the input image,
   wherein the color mapping process includes non-linear operation to a saturation of the output image, and
   wherein the non-linear operation involves compressing a first region surrounded by a limited boundary and an uncompressed boundary into a second region surrounded by the uncompressed boundary and a target boundary, in which a third region within the uncompressed boundary is not mapped, and in which the third region is different from the first and second regions.

2. The information processing device according to claim 1, wherein the circuitry is configured to control confirming whether or not, as said determining condition, said information processing device itself and other information processing device are each able to execute said restoration processing.

3. The information processing device according to claim 2, wherein the circuitry is configured to control, in a case that only said information processing device itself is confirmed as able to execute said restoration processing, causing said information processing device itself to execute said restoration processing.

4. The information processing device according to claim 2, wherein the circuitry is configured to control, in a case that only said other information processing device is confirmed as able to execute said restoration processing, causing said other information processing device to execute said restoration processing.

5. The information processing device according to claim 2, wherein the circuitry is configured to control, in a case that both of said information processing device itself and said other information processing device are confirmed as unable to execute said restoration processing, omitting said restoration processing.

6. The information processing device according to claim 2, wherein the circuitry is configured to control, in a case that both of said information processing device itself and said other information processing device are confirmed as able to execute said restoration processing, confirming a selection condition for selecting a favorable device to perform said restoration processing.

7. The information processing device according to claim 6,
   wherein the circuitry is configured to control:
   confirming whether or not, as said selection condition, a manufacturing source of said other information processing device matches said information processing device;
   in a case confirmation is made that the manufacturing source of said other information processing device matches said information processing device, causing said other information processing device to execute said restoration processing; and
   in a case confirmation is made that the manufacturing source of said other information processing device does not match said information processing device, causing said information processing device itself to execute said restoration processing.

8. The information processing device according to claim 6,
   wherein the circuitry is configured to control:
   confirming whether or not, as said selection condition, an algorithm of said restoration processing of said other information processing device is newer than an algorithm of said restoration processing of said information processing device;

in a case confirmation is made that the algorithm of said restoration processing of said other information processing device is newer than the algorithm of said restoration processing of said information processing device, causing said other information processing device to execute said restoration processing; and in a case confirmation is made that the algorithm of said restoration processing of said other information processing device is not newer than the algorithm of said restoration processing of said information processing device, causing said information processing device itself to execute said restoration processing.

9. The information processing device according to claim 6, wherein the circuitry is configured to control:

confirming whether or not, as said selection condition, said other information processing device is able to execute said restoration processing as to a high-tone image that is higher than a predetermined tone;

in a case confirmation is made that said other information processing device is able to execute said restoration processing as to said high-tone image, causing said other information processing device to execute said restoration processing; and in a case confirmation is made that said other information processing device is not able to execute said restoration processing as to said high-tone image, causing said information processing device itself to execute said restoration processing.

10. The information processing device according to claim 6, wherein the circuitry is configured to control:

confirming whether or not, as said selection condition, the metadata exists; and in a case confirmation is made that said metadata exists, causing said information processing device itself or said other information processing device to execute said restoration processing.

11. The information processing device according to claim 1, wherein the circuitry is configured to control:

second confirming which confirms a selection condition to select a favorable device for performing gamut conversion processing to convert the gamut of said image to a desired gamut;

executing said gamut conversion processing, based on a confirmation result from said second confirming.

12. The information processing device according to claim 11, wherein the circuitry is configured to control:

performing communication of the input image subjected to the gamut conversion between other information processing devices;

confirming whether or not, as said selection condition, a manufacturing source of said other information processing device matches that of said information processing device, whether or not an algorithm of said gamut conversion processing of said other information processing device is newer than an algorithm of said gamut conversion processing of said information processing device, or whether or not said other information processing device is able to execute said gamut conversion processing as to a high-tone image that is higher than a predetermined tone;

in a case confirmation is made that the manufacturing source of said other information processing device matches that of said information processing device, in a case confirmation is made that the algorithm of said gamut conversion processing of said other information processing device is newer than the algorithm of said gamut conversion processing of said information processing device, or in a case confirmation is made that said other information processing device is able to execute said gamut conversion processing as to said high-tone image, causing said other information processing device to execute said gamut conversion processing; and in a case confirmation is made that the manufacturing source of said other information processing device does not match that of said information processing device, in a case confirmation is made that the algorithm of said gamut conversion processing of said other information processing device is not newer than the algorithm of said gamut conversion processing of said information processing device, or in a case confirmation is made that said other information processing device is unable to execute said gamut conversion processing as to said high-tone image, causing said information processing device itself to execute said gamut conversion processing.

13. The information processing device according to claim 1, wherein the circuitry is configured to control:

performing communication of the input image subjected to the gamut conversion between other information processing devices;

reading out said input image from a recording medium;

a second confirming which confirms a determining condition for controlling execution of said restoration processing as to said input image read out from said recording medium;

the execution of said restoration processing as to said input image read out from said recording medium, based on a confirmation result from the second confirming; and transmitting said input image read out from said recording medium or an image subjected to said restoration processing, to said other information processing device.

14. The information processing device according to claim 1, wherein the circuitry is configured to control:

performing communication of the input image subjected to the gamut conversion between other information processing devices;

outputting said input image, receiving said input image transmitted from said other information processing device;

a second confirming which confirms determining conditions for controlling execution of said restoration processing as to said input image received;

executing said restoration processing as to said input image received, based on a confirmation result from the second confirming; and outputting said input image received or said input image subjected to said restoration processing.

15. The information processing device of claim 1, wherein the circuitry is configured to control performing communication of the input image subjected to the gamut conversion between other information processing devices.

16. The information processing device according to claim 1, wherein the metadata comprises parameters of an isosbestic point table used by the color mapping process.

17. An information processing method comprising:
controlling, by a processing device,
confirming determining a condition for controlling execution of restoration processing which returns at least a portion of a gamut of an input image to a state before the input image is subjected to gamut conversion such that the gamut of the input image is narrower than a gamut of an image before the gamut conversion; and
executing said restoration processing, based on a confirmation result from the confirming, according to metadata associated with the input image and used by a color mapping process which maps each pixel of the input image so that a gamut of a mapped image after the color mapping process to the input image is wider than that of the input image,
wherein the color mapping process includes non-linear operation to a saturation of the output image, and
wherein the non-linear operation involves compressing a first region surrounded by a limited boundary and an uncompressed boundary into a second region surrounded by the uncompressed boundary and a target boundary, in which a third region within the uncompressed boundary is not mapped, and in which the third region is different from the first and second regions.

18. The information processing method according to claim 17, wherein the metadata comprises parameters of an isosbestic point table used by the color mapping process.

19. A non-transitory recording medium configured to store a program executable by a computer, the program comprising:
confirming determining a condition for controlling execution of restoration processing which returns at least a portion of a gamut of an input image to a state before the input image is subject to gamut conversion such that the gamut of the input image is narrower than a gamut of an image before the gamut conversion; and
executing said restoration processing, based on a confirmation result from the confirming, according to metadata associated with the input image and used by a color mapping process which maps each pixel of the input image so that a gamut of a mapped image after the color mapping process to the input image is wider than that of the input image,
wherein the color mapping process includes non-linear operation to a saturation of the output image, and
wherein the non-linear operation involves compressing a first region surrounded by a limited boundary and an uncompressed boundary into a second region surrounded by the uncompressed boundary and a target boundary, in which a third region within the uncompressed boundary is not mapped, and in which the third region is different from the first and second regions.

20. The non-transitory recording medium according to claim 19, wherein the metadata comprises parameters of an isosbestic point table used by the color mapping process.

* * * * *